US012431613B2

(12) United States Patent
Kim

(10) Patent No.: US 12,431,613 B2
(45) Date of Patent: Sep. 30, 2025

(54) VEHICLE-MOUNTED ANTENNA SYSTEM

(71) Applicant: LG ELECTRONICS INC., Seoul (KR)

(72) Inventor: Changil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 140 days.

(21) Appl. No.: 18/561,671

(22) PCT Filed: May 17, 2021

(86) PCT No.: PCT/KR2021/006128
§ 371 (c)(1),
(2) Date: Nov. 17, 2023

(87) PCT Pub. No.: WO2022/244894
PCT Pub. Date: Nov. 24, 2022

(65) Prior Publication Data

US 2024/0243462 A1 Jul. 18, 2024

(51) Int. Cl.
*H01Q 1/32* (2006.01)
*H01Q 13/10* (2006.01)

(52) U.S. Cl.
CPC ........... *H01Q 1/3275* (2013.01); *H01Q 13/10* (2013.01)

(58) Field of Classification Search
None
See application file for complete search history.

(56) References Cited

U.S. PATENT DOCUMENTS

2018/0175484 A1* 6/2018 Tsai ..................... H04B 1/3827
2019/0348754 A1* 11/2019 Apostolos .............. H01Q 21/29

FOREIGN PATENT DOCUMENTS

| | | |
|---|---|---|
| CN | 102368575 | 3/2021 |
| KR | 1020070054435 | 5/2007 |
| KR | 1020190090870 | 8/2019 |
| KR | 1020200058115 | 5/2020 |

OTHER PUBLICATIONS

PCT International Application No. PCT/KR2021/006128, International Search Report dated Feb. 15, 2022, 3 pages.

* cited by examiner

*Primary Examiner* — Crystal L Hammond
(74) *Attorney, Agent, or Firm* — LEE, HONG, DEGERMAN, KANG & WAIMEY

(57) ABSTRACT

A vehicle-mounted antenna system according to an embodiment is provided. The antenna system comprises: a PCB on which an antenna element and electronic components are arranged; a bottom cover arranged under the PCB, and including a metal plate having a slot region formed in a region corresponding to the region in which the antenna element is arranged; and a top cover fastened to the bottom cover to accommodate the PCB therein, wherein the antenna element and the metal plate having the slot region can operate as a radiator.

17 Claims, 40 Drawing Sheets

(a) scenario 1

(b) scenario 2

(c) scenario 3

(d) scenario 4

(e) scenario 5

(f) scenario 6

(a)

(b)

(a)

(b)

(a)

(b)

(c)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(c)

(a)

(b)

| POSITION | TOTAL EFFICIENCY [%] | TOTAL EFFICIENCY [dB] | DELTA |
|---|---|---|---|
| Ref. POINT | 39.0 | -4.1 | - |
| 1 | 23.0 | -6.4 | -2.3 |
| 2 | 13.0 | -8.9 | -4.8 |
| 3 | 26.0 | -5.9 | -1.8 |
| 4 | 14.0 | -8.5 | -4.4 |
| 5 | 22.0 | -6.6 | -2.5 |

(a)

(b)

(a)

(b)

VEHICLE-MOUNTED ANTENNA SYSTEM

CROSS-REFERENCE TO RELATED APPLICATION(S)

This application is the National Stage filing under 35 U.S.C. 371 of International Application No. PCT/KR2021/006128 filed on May 17, 2021, the contents of which are all incorporated by reference herein in its entirety.

TECHNICAL FIELD

The present disclosure relates to an antenna system mounted on a vehicle. One particular implementation relates to an antenna system having a broadband antenna that is capable of operating in various communication systems, and to a vehicle having the same.

BACKGROUND ART

Electronic devices may be classified into mobile/portable terminals and stationary terminals according to mobility. With commercialization of wireless communication systems that use LTE communication technologies, in recent years, the electronic devices have provided various services. In the near future, it is also expected that the electronic devices can provide various services, with commercialization of wireless communication systems that use 5G communication technologies. Meanwhile, some of LTE frequency bands may be allocated for 5G communication services.

In this regard, mobile terminals may be configured to provide 5G communication services in various frequency bands. Recently, attempts have been made to provide 5G communication services using a Sub6 band that is a band of 6 GHz or less. In the future, however, it is also expected to provide 5G communication services by using a millimeter-wave (mmWave) band in addition to the Sub6 band for a faster data rate.

Recently, the need to provide these communication services through a vehicle has been increased. Regarding communication services, there has also appeared a need for 5G communication services that are next-generation services, as well as for existing communication services, such as Long Term Evolution (LTE) services.

On the other hand, there is a problem in that a vehicle body and a vehicle roof are formed of a metallic material to block radio waves. Accordingly, a separate antenna structure may be disposed on a top of the vehicle body or the vehicle roof. Or, when the antenna structure is disposed on a bottom of the vehicle body or roof, a portion of the vehicle body or roof corresponding to a region where the antenna structure is disposed may be formed of a non-metallic material.

However, in terms of design, the vehicle body or roof needs to be integrally formed. In this case, the exterior of the vehicle body or roof may be formed of a metallic material. This may cause antenna efficiency to be drastically lowered due to the vehicle body or roof.

DISCLOSURE OF INVENTION

Technical Problem

The present disclosure is directed to solving the aforementioned problems and other drawbacks. Another aspect of the present disclosure is to maintain antenna performance at a predetermined level even in case where the exterior of a vehicle body or roof is made of a metallic material.

Another aspect of the present disclosure is to utilize a ground region (area) of a body, which configures an antenna module, as an antenna.

Another aspect of the present disclosure is to improve antenna performance of an antenna system while maintaining a height of the antenna system at a predetermined level or less.

Another aspect of the present disclosure is to provide a structure for mounting an antenna system, which is capable of operating in a broad frequency band to support various communication systems, to a vehicle.

Solution to Problem

To achieve these and other advantages and in accordance with the purpose of this specification, as embodied and broadly described herein, there is provided an antenna assembly mounted on a vehicle. The antenna system may include: a printed circuit board (PCB) on which an antenna element and electronic components are disposed; a bottom cover disposed on a bottom of the PCB and configured as a metal plate having a slot region in a region corresponding to a region where the antenna element is disposed; and a top cover fastened to the bottom cover and configured to accommodate the PCB therein. The antenna element and the metal plate having the slot region operate as a radiator.

According to an embodiment, the antenna system may further include a metal structure extending from an outer side of the bottom cover forming the slot region, and formed at a predetermined angle with respect to the bottom cover, the antenna element disposed at an inner side of the metal structure may feed a signal to the slot region through the PCB.

According to an embodiment, the antenna element may include a feed connection portion formed perpendicularly on one point of a conductive pattern, and a ground connection portion perpendicularly formed on another point of the conductive pattern.

According to an embodiment, the feed connection portion may be connected to a feed path of the PCB, and the feed path of the PCB may be disposed in the slot region such that the bottom cover operates as a slot antenna.

According to an embodiment, the PCB may have a dielectric region, from which a metal pattern is removed such that the antenna element is disposed, and a length of a first metal portion formed at an outer side of the PCB, compared to the antenna element, may be shorter than or equal to a length of a second metal part formed at an inner side of the PCB. The dielectric region may be defined as a region between the first metal portion and the second metal portion.

According to an embodiment, a first type component and a second type component may be disposed on one side of the PCB, and the antenna element may be disposed on another side of the PCB. A length of a first metal portion formed at an outer side of the slot region may be longer than or equal to a length of a second metal portion formed at an inner side of the slot region, such that the slot region operates as an open slot antenna in a length direction. The slot region may be defined as a region between the first metal portion and the second metal portion.

According to an embodiment, a first type component and a second type component may be disposed on one side and another side of the PCB, and the antenna element may be disposed between the first and second type components. A length of a first metal portion formed at an outer side of the slot region may be shorter than or equal to a length of a second metal part formed at an inner side of the slot region.

According to an embodiment, a first type component and a second type component may be disposed on one side and another side of the PCB, and the antenna element may be disposed between the first and second type components. The PCB may have a dielectric region, from which a metal pattern is removed such that the antenna element is disposed. The dielectric region may be formed in a rectangular shape, and the antenna element may be disposed in the dielectric region having the rectangular shape.

According to an embodiment, the antenna element may include: a ground connection portion connected to a ground of the PCB; a feed connection portion connected to a signal line of the PCB; a first conductive pattern having one end portion connected to the ground connection portion and another end portion connected to the feed connection portion; and a second conductive pattern having one end portion connected to the ground connection portion, and another end portion extending to both sides.

According to an embodiment, the antenna system may further include an antenna substrate operably coupled to the PCB through at least one side area, and a plurality of antennas may be disposed on different regions of the antenna substrate, which correspond to outer regions of an outer side of the PCB.

According to an embodiment, a telematics unit configured by the bottom cover and the top cover may be disposed on a bottom of a roof of the vehicle, and a radiator configured by the antenna element and the metal plate having the slot region may radiate a signal in a horizontal direction and a downward direction with respect to the roof of the vehicle.

According to an embodiment, the antenna system may further include an antenna structure configured such that at least a portion thereof is exposed to a top of a roof of the vehicle. The antenna structure may be configured to be coupled to the top cover, and configured to transmit a signal received through an antenna disposed therein to a telematics unit on a bottom of the roof.

An antenna system mounted on a vehicle according to another aspect of the present disclosure may include: a printed circuit board (PCB) provided with electronic components disposed therein and electrically connected to an antenna element; a bottom cover disposed on a bottom of the PCB and configured as a metal plate; a top cover fastened to the bottom cover to accommodate the PCB therein; and a metal sheet attached on the top cover and disposed on a bottom of a roof of the vehicle, so as to improve radiation efficiency of a signal radiated from the antenna element.

According to an embodiment, the metal sheet may be configured such that a front surface thereof is attached on a rear surface of a roof structure made of a metallic material. A current of a first direction may be generated on the antenna element, and a current of a second direction opposite to the first direction may be generated on the metal sheet to be canceled by a current of the first direction generated on the roof structure.

According to an embodiment, the metal sheet may include: a planar portion attached onto the top cover; and a ground connection portion connected to a ground of the PCB at one point of the planar portion. The ground connection portion may be disposed within a predetermined gap inward from the antenna element disposed at an outer side of the PCB.

According to an embodiment, the metal sheet may be disposed such that one side of the planar portion overlaps the antenna element in a lengthwise direction of the antenna element. The metal sheet may have a coupling slot region, from which a metal region is removed, such that an antenna structure is disposed on a top of the roof to be coupled to the antenna system.

According to an embodiment, the bottom cover may have a slot region formed in a region corresponding to a region where the antenna element is disposed, and the antenna element and the metal plate having the slot region my operate as a radiator.

According to an embodiment, the antenna element may be disposed in a space between the PCB and the metal sheet attached on the top cover and may be configured as a conductive pattern on a side area of the PCB.

According to another aspect of the subject matter disclosed herein, there is provided a vehicle having an antenna system. The vehicle may include: a telematics module disposed on a bottom of a roof of the vehicle, and configured to perform communication with at least one of an adjacent vehicle, a Road Side Unit (RSU), and a base station through a processor; and an antenna structure configured such that at least a portion thereof is exposed to a top of the roof of the vehicle. The telematics module may include: a printed circuit board (PCB) on which an antenna element and electronic components are disposed; a bottom cover disposed on a bottom of the PCB and configured as a metal plate having a slot region in a region corresponding to a region where the antenna element is disposed; and a top cover fastened to the bottom cover to accommodate the PCB therein. The antenna element and the metal plate having the slot region may operate as a radiator.

According to an embodiment, the telematics module may further include a metal structure extending from an outer side of the bottom cover forming the slot region, and formed at a predetermined angle with respect to the bottom cover. The antenna element disposed at an inner side of the metal structure may feed a signal to the slot region through the PCB. A radiator configured by the antenna element and the metal plate having the slot region may radiate a signal in a horizontal direction and a downward direction with respect to the roof of the vehicle.

According to an embodiment, the antenna element may include a feed connection portion perpendicularly formed on one point of a conductive pattern, and a ground connection portion perpendicularly formed on another point of the conductive pattern. The feed connection portion may be connected to a feed path of the PCB, and the feed path of the PCB may be disposed in the slot region such that the bottom cover operates as a slot antenna.

Advantageous Effects of Invention

Hereinafter, technical effects of an antenna system mounted on a vehicle and the vehicle having the antenna system will be described.

According to the present disclosure, antenna efficiency can be improved by using a radiator that is configured by nan antenna pattern and a slot region of a ground.

According to the present disclosure, an antenna can be decreased in size by using the antenna pattern and the slot region of the ground as the radiator.

According to the present disclosure, by disposing a metal sheet on an antenna structure attached on a bottom of a roof of a vehicle, reduction in antenna efficiency due to the roof made of a metallic material can be suppressed.

According to the present disclosure, even when an antenna disposed on a top of the roof of the vehicle does not operate, communication can be performed through an antenna in a module disposed on the bottom of the roof of the vehicle.

According to the present disclosure, even when multiple input/multiple output (MIMO) antennas in an antenna module do not normally operate, communication can be performed through a backup antenna.

Further scope of applicability of the present disclosure will become apparent from the foregoing detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

MODE FOR THE INVENTION

Figure 1A:
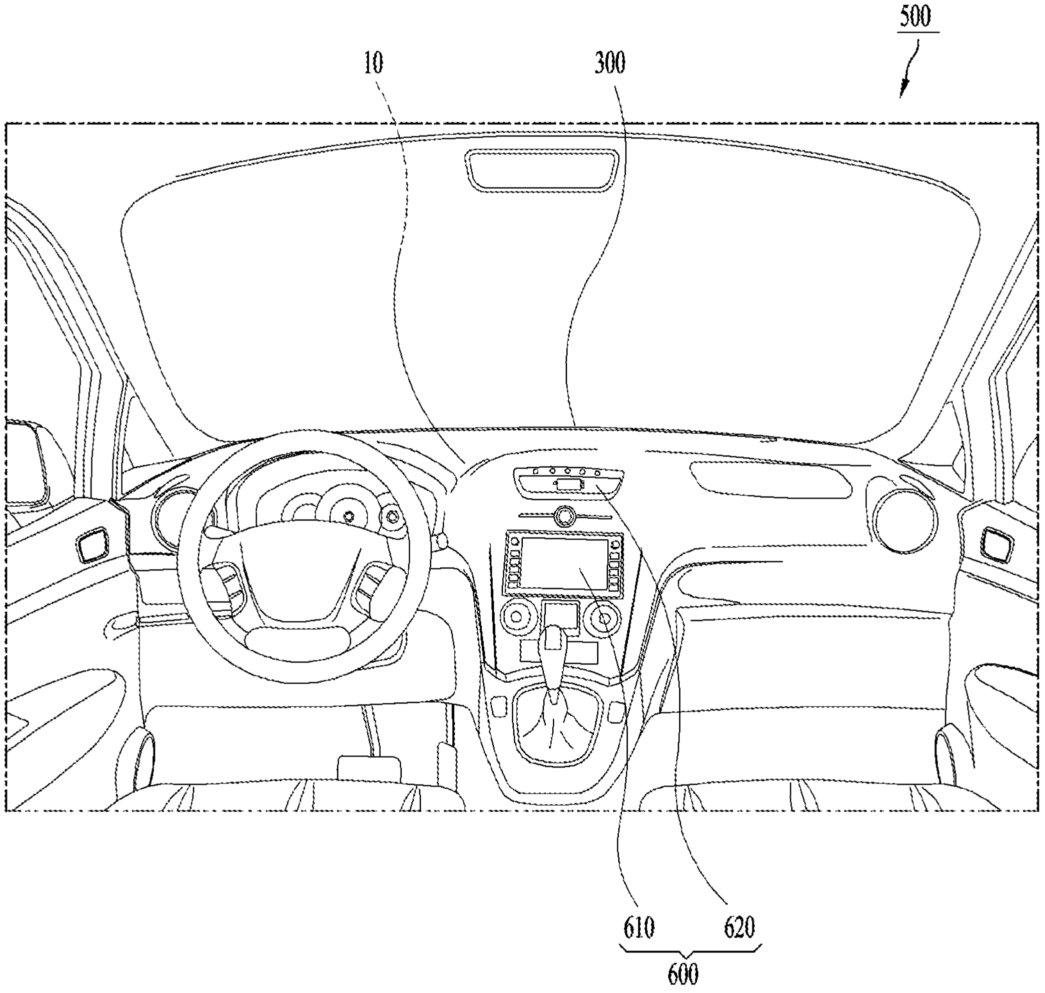
FIG. 1A is a diagram illustrating an internal configuration of a vehicle in accordance with one example.

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

An electronic device described herein may include a vehicle in addition to a mobile terminal. Therefore, wireless communication through the electronic device described herein may include wireless communication through the vehicle in addition to wireless communication through the mobile terminal.

Configuration and operations according to implementations described herein may also be applied to the vehicle in addition to the mobile terminal. Configurations and operations according to implementations may also be applied to a communication system, namely, an antenna system, mounted in the vehicle. In this regard, the antenna system mounted in the vehicle may include a plurality of antennas, and a transceiver circuit and a processor that control the plurality of antennas.

The antenna system for vehicle-mounting that is mentioned in the present disclosure mostly refers to an antenna system mounted on the outside of the vehicle, but examples of the antenna system may include a mobile terminal (electronic device) mounted inside the vehicle or carried by a user who gets in the vehicle.

Figure 1B:
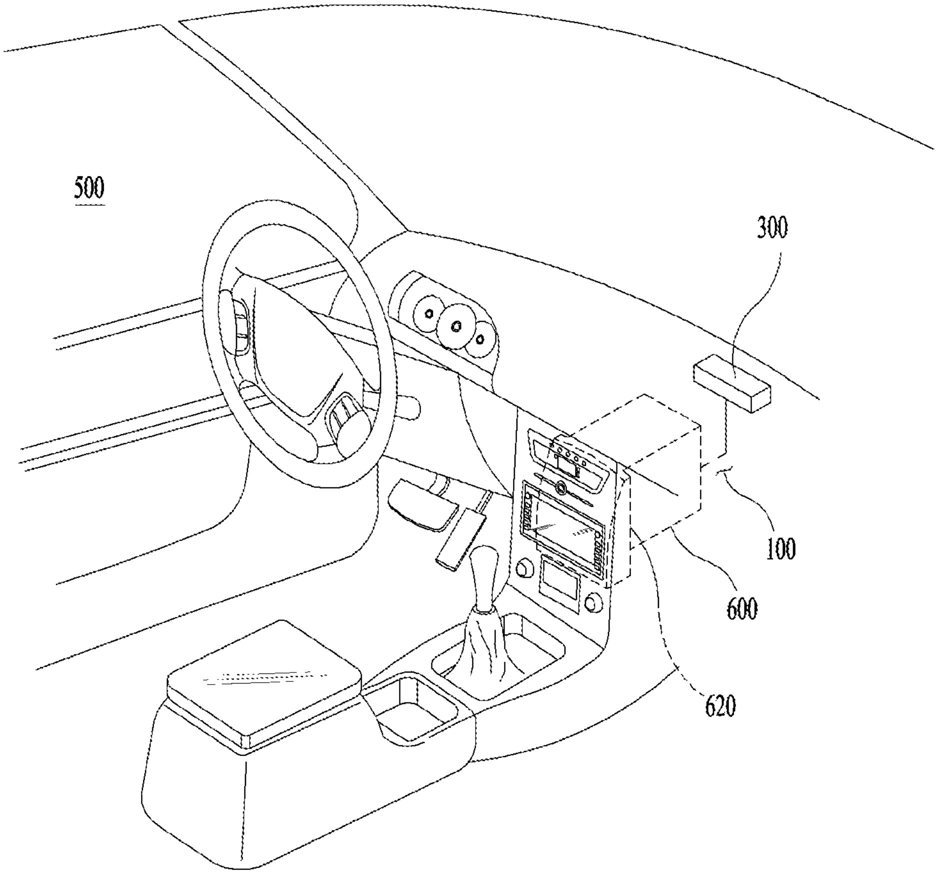
FIG. 1B is a lateral view illustrating the vehicle interior in accordance with the one example.

FIG. 1A is a diagram illustrating an internal configuration of a vehicle in accordance with one example. FIG. 1B is a lateral view illustrating the vehicle interior in accordance with the one example.

As illustrated in FIGS. 1A and 1B, the present disclosure describes an antenna unit (i.e., an internal antenna system) 300 capable of transmitting and receiving signals through GPS, 4G wireless communication, 5G wireless communication, Bluetooth, or wireless LAN. Therefore, the antenna unit (i.e., the antenna system) 300 capable of supporting these various communication protocols may be referred to as an integrated antenna module 300.

The present disclosure also describes a vehicle 500 having the antenna unit 300. The vehicle 500 may include a dashboard and a housing 10 including the antenna unit 300, and the like. In addition, the vehicle 500 may include a mounting bracket for mounting the antenna unit 300.

The vehicle 500 according to the present disclosure may include the antenna module 300 corresponding to the antenna unit and a telematics unit (TCU) 600 configured to be connected to the antenna module 300. In one example, the telematics unit 600 may be configured to include the antenna module 300. The telematics unit 600 may include a display 610 and an audio unit 620.

<V2X (Vehicle-to-Everything)>

Vehicle-to-everything (V2X) communication includes communication between a vehicle and each of all entities, such as vehicle-to-vehicle (V2V) communication which refers to communication between vehicles, vehicle-to-Infrastructure (V2I) communication which refers to communication between a vehicle and an eNB or a road side unit (RSU), vehicle-to-pedestrian (V2P) communication which refers to communication between a vehicle and a terminal carried by a person (a pedestrian, a cyclist, a vehicle driver, or a passenger), vehicle-to-network (V2N) communication, and the like.

V2X communication may have the same meaning as V2X sidelink or NR V2X or may have, in a broader sense, a meaning including V2X sidelink or NR V2X.

V2X communication can be applied to various services, for example, forward collision warning, an automatic parking assist system, cooperative adaptive cruise control (CACC), control-loss warning, traffic queuing warning, safety warning, traffic vulnerable-area safety warning, emergency vehicle warning, curved-road driving speed warning, and traffic flow control.

V2X communication may be provided through a PC5 interface and/or a Uu interface. In this case, specific network entities for supporting communications between a vehicle and all entities may exist in a wireless communication system supporting V2X communication. For example, the network entity may include a base station (eNB), a Road Side Unit (RSU), a terminal, or an application server (e.g., a traffic safety server).

In addition, a terminal performing V2X communication may refer to not only a general handheld UE but also a vehicle (V-UE), a pedestrian UE, an RSU of an eNB type, an RSU of a UE type, a robot equipped with a communication module, and the like.

V2X communication may be performed directly between terminals or may be performed through the network entity (entities). V2X operation modes may be classified according to a method of performing such V2X communication.

Terms used in V2X communication may be defined as follows.

A Road Side Unit (RSU) is a V2X service enabled device that can transmit and receive data to and from a moving vehicle using V2I service. The RSU also serves as a stationary infrastructure entity that supports V2X application programs, and may exchange messages with other entities that support V2X application programs. The RSU is a term frequently used in existing ITS specifications, and the reason for employing the term RSU in association with the 3GPP specifications is to read relevant documents in an easier manner in the ITS industry. The RSU is a logical entity that combines a V2X application logic with the functionality of an eNB (referred to as an eNB-type RSU) or a UE (referred to as a UE-type RSU).

A V2I Service is a type of V2X service, where one party is a vehicle whereas the other party is an entity belonging to an infrastructure. A V2P Service is also a type of V2X service, where one party is a vehicle and the other party is a device carried by a person (e.g., a portable terminal carried by a pedestrian, a cyclist, a driver, or an occupant other than the driver). A V2X Service is a type of 3GPP communication service that involves a transmitting or receiving device on a vehicle. The V2X service may further be divided into a V2V service, a V2I service, and a V2P service according to which partner is involved in communication for the V2X service.

V2X enabled UE is a UE that supports V2X service. The V2V Service is a type of V2X service, where both parties involved in communication are vehicles. V2V communication range is a direct communication range between two vehicles involved in the V2V service.

Figure 2A:
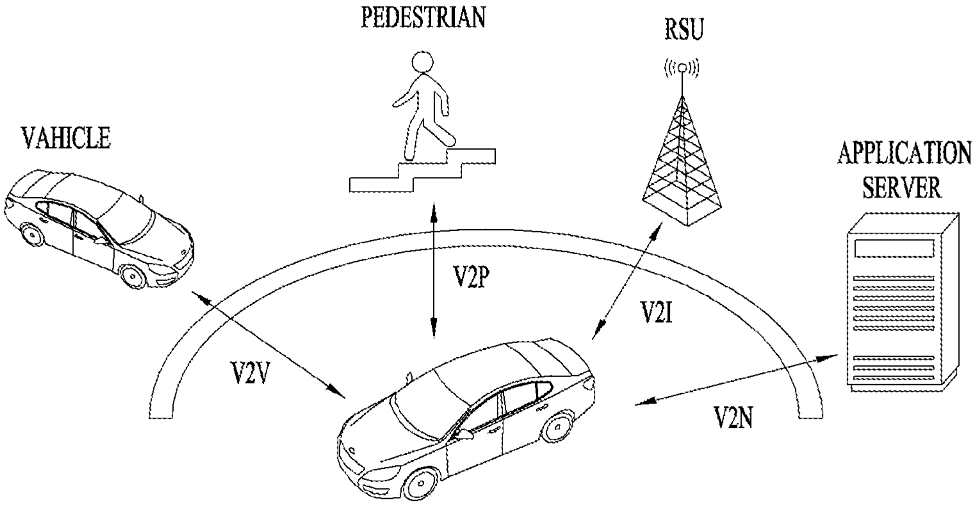
FIG. 2A is a view illustrating a type of V2X application.

Four types of V2X applications called Vehicle-to-Everything (V2X), as described above, include (1) vehicle-to-vehicle (V2V), (2) vehicle-to-infrastructure (V2I), (3) vehicle-to-network (V2N), (4) vehicle-to-pedestrian (V2P). FIG. 2A illustrates types of V2X applications. Referring to FIG. 2A, the four types of V2X applications may use “cooperative awareness” to provide more intelligent services for end-users.

This means that, in order to provide more intelligent information, such as cooperative collision warning or autonomous traveling, entities, such as vehicles, roadside-based facilities, application servers and pedestrians, may collect knowledge of involved local environments (e.g., information received from nearby vehicles or sensor equipment) to process and share the corresponding knowledge.

<NR V2X>

In 3GPP Releases 14 and 15, support of the V2V and V2X services in LTE has been introduced in order to extend the 3GPP platform to the automotive industry.

Requirements for support of enhanced V2X use cases are largely organized into four use case groups.

(1) Vehicles Platooning enables the vehicles to dynamically form a platoon traveling together. All the vehicles in the platoon obtain information from the leading vehicle to manage this platoon. These information allow the vehicles to drive closer than normal in a coordinated manner, going to the same direction and traveling together.

(2) Extended Sensors enable the exchange of raw or processed data gathered through local sensors or live video images among vehicles, road site units, devices of pedestrians and V2X application servers. The vehicle can recognize an environment much more than through detection by its sensor and can recognize a local situation as a whole in a more extensive manner. A high data transmission rate is one of primarily features of the extended sensor.

(3) Advanced Driving enables semi-automated or full-automated driving. The advanced driving enables each vehicle and/or each RSU to share self-recognition data obtained from a local sensor with a nearby vehicle and to synchronize and adjust a trajectory or a maneuver. Each vehicle shares its intention to drive with a nearby vehicle.

(4) Remote driving serves to enable a remote driver or a V2X application program to drive a remotely-located vehicle in a dangerous environment by him/herself or itself or instead of an occupant who cannot drive the remotely-located vehicle. In a case where a traffic environment is limitedly changed and a vehicle driving path is predictable such as in public transportation, driving based on cloud computing may be available. High reliability and low latency are main requirements for the remote driving.

A description to be given below may be applicable to all of NR SL (sidelink) and LTE SL, and when no radio access technology (RAT) is indicated, the NR SL is meant. Six operational scenarios considered in NR V2X may be considered as follows. In this regard, FIG. 2B illustrates a standalone scenario supporting V2X SL communication and an MR-DC scenario supporting V2X SL communication.

In particular, 1) in Scenario 1, gNB provides control/configuration for UE’s V2X communication in both LTE SL and NR SL. 2) In Scenario 2, ng-eNB provides control/configuration for UE’s V2X communication in both LTE SL and NR SL. 3) In Scenario 3, eNB provides control/configuration for UE’s V2X communication in both LTE SL and NR SL. On the other hand, 4) in Scenario 4, the UE’s V2X communication in the LTE SL and the NR SL is controlled/configured by Uu while the UE is configured with EN-DC. 5) In Scenario 5, the UE’s V2X communication in the LTE SL and the NR SL is controlled/configured by Uu while the UE is configured in NE-DC. 6) In Scenario 6, the UE’s V2X communication in the LTE SL and the NR SL is controlled/configured by Uu while the UE is configured in NGEN-DC.

Figure 2B:
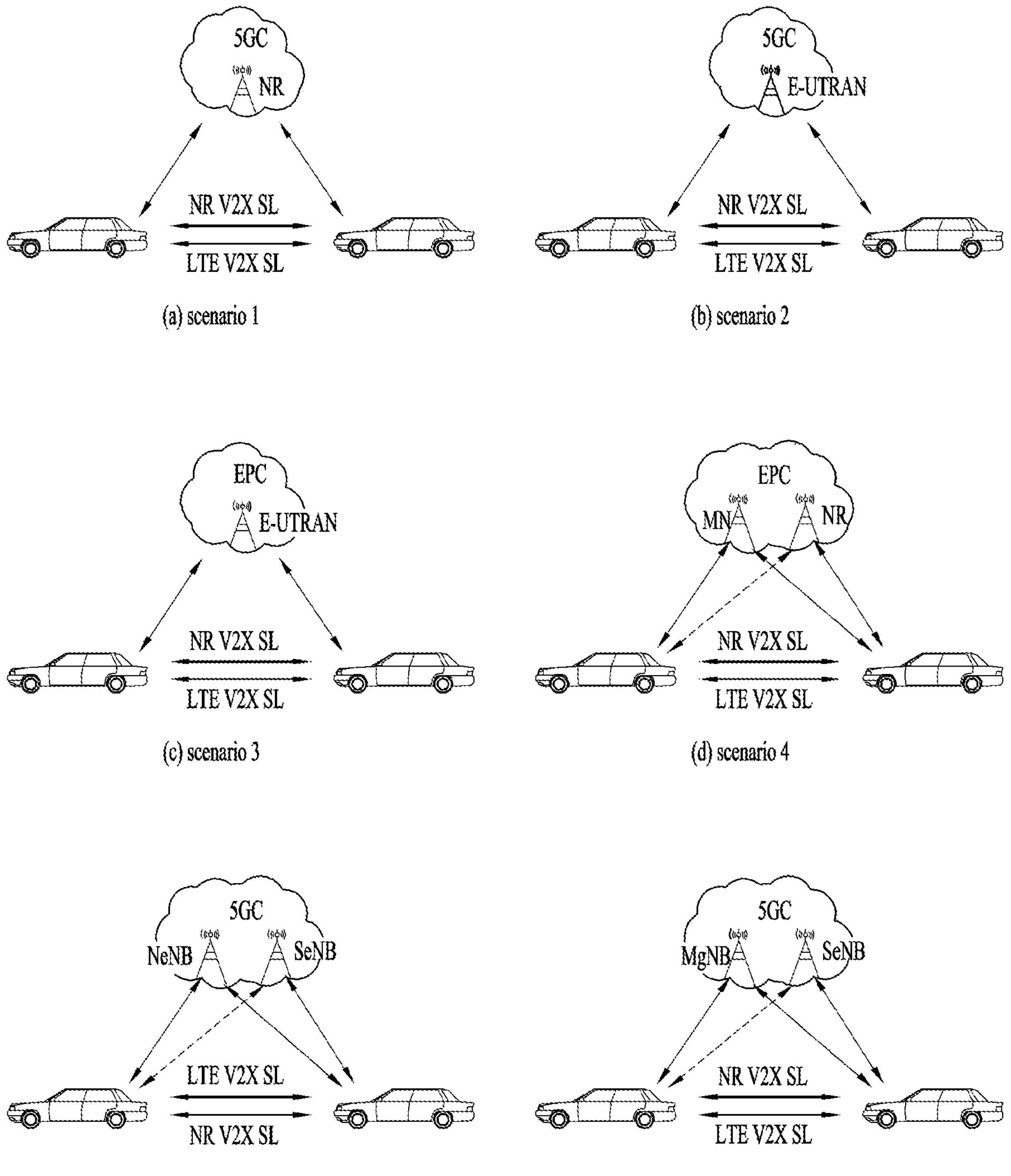
FIG. 2B illustrates a standalone scenario supporting V2X SL communication and an MR-DC scenario supporting V2X SL communication.

In order to support the V2X communication, as illustrated in FIGS. 2A and 2B, the vehicle may perform wireless communication with eNB and/or gNB through an antenna system. In this regard, the antenna system may be implemented as an external antenna system as illustrated in FIGS. 3A to 3C as well as being configured as an internal antenna system as illustrated in FIGS. 1A and 1B.

Figure 3A:
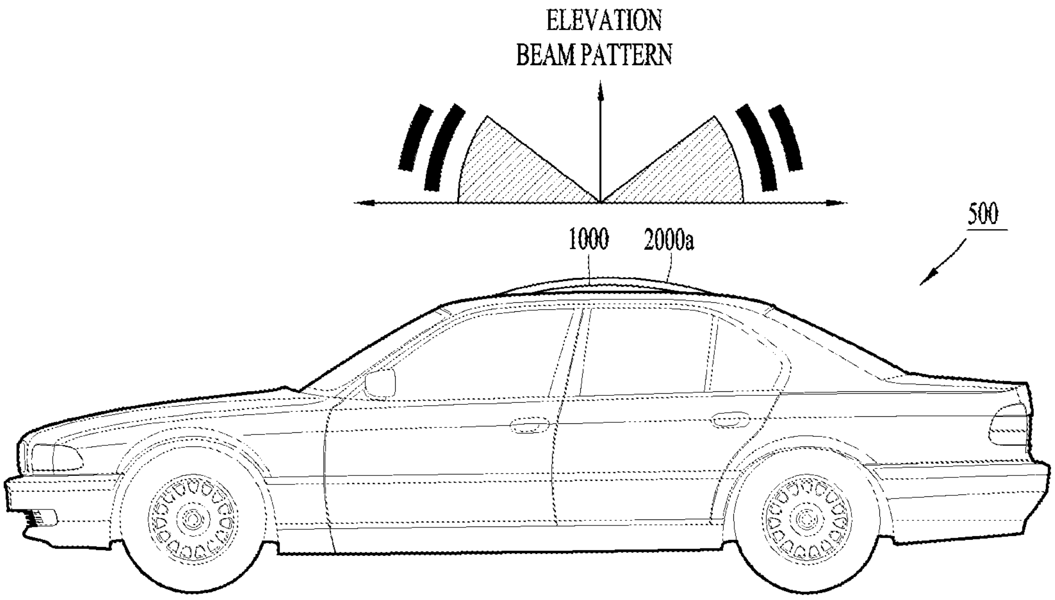
FIGS. 3A to 3C are views illustrating a structure for mounting an antenna system in a vehicle, to which the antenna system is mounted.
Figure 3B:
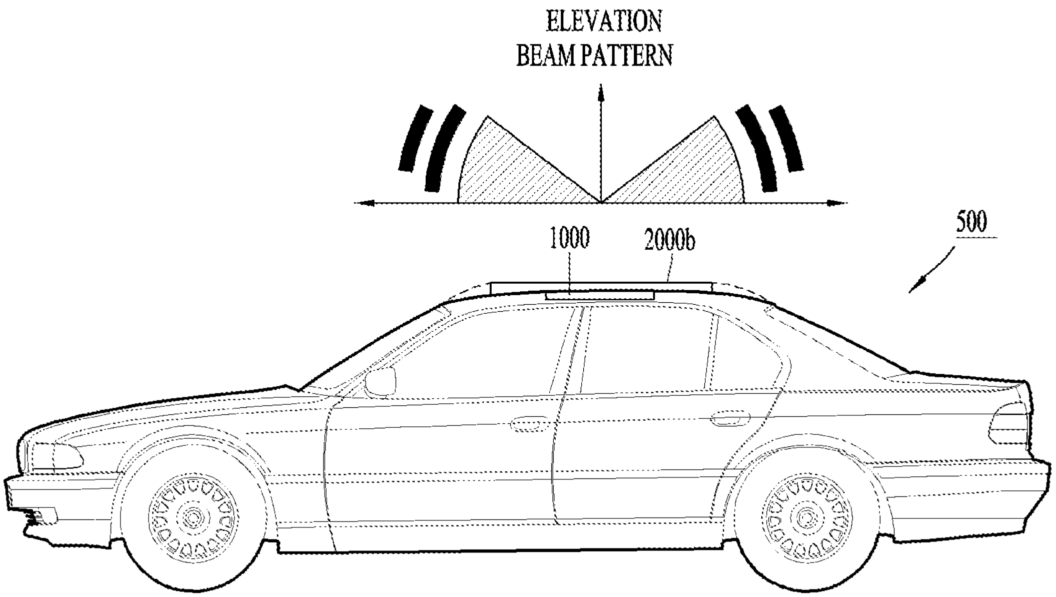
Figure 3C:
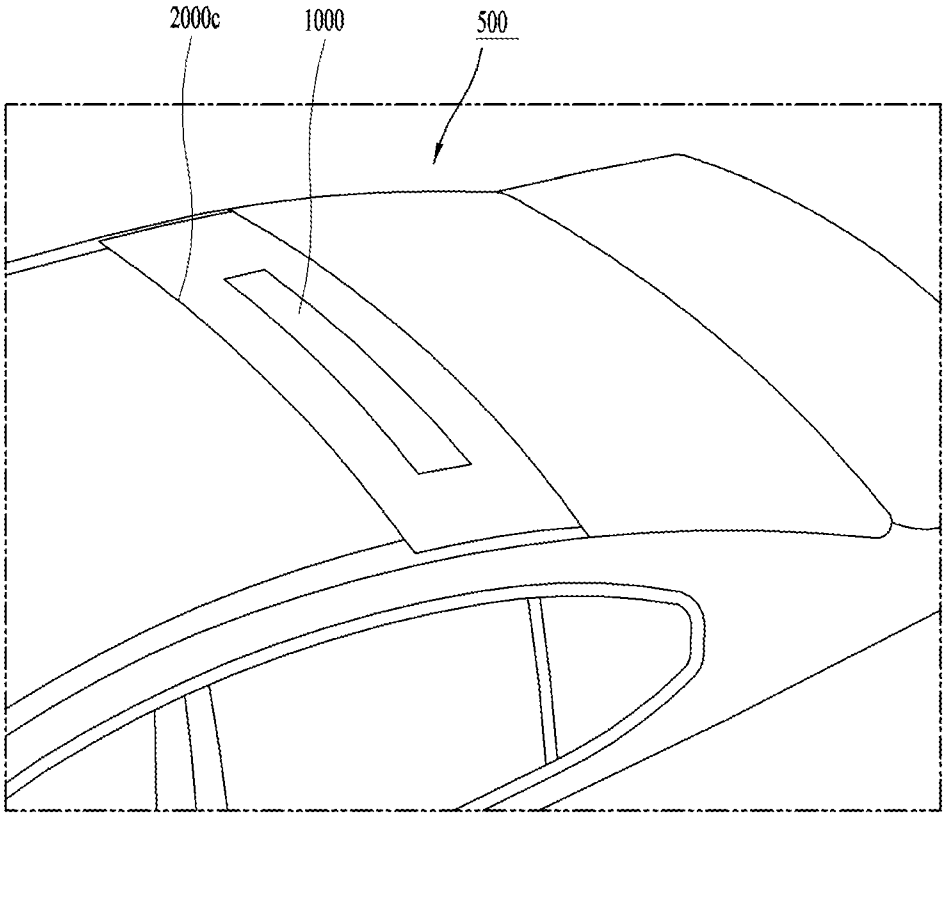

FIGS. 3A to 3C are views illustrating an example of a structure for mounting an antenna system in a vehicle, in the vehicle including the antenna system mounted in the vehicle according to the present disclosure. In this regard, FIGS. 3A and 3B illustrate a configuration in which an antenna system 1000 is mounted on or in a roof of a vehicle. Meanwhile, FIG. 3C illustrates a structure in which the antenna system 1000 is mounted on a roof of the vehicle and a roof frame of a rear mirror.

Referring to FIGS. 3A to 3C, an existing shark fin antenna is proposed to be replaced with a non-protruding flat antenna, in order to improve the appearance of the vehicle and to preserve a telematics performance when a collision takes place. In addition, the present disclosure proposes an integrated antenna of an LTE antenna and a 5G antenna considering fifth generation (5G) communication while providing the existing mobile communication service (e.g., LTE).

Referring to FIG. 3A, the antenna system 1000 may be disposed on the roof of the vehicle. In FIG. 3A, a radome 2000$a$ for protecting the antenna system 1000 from an external environment and external impacts while the vehicle travels may cover the antenna system 1000. The radome 2000$a$ may be made of a dielectric material through which radio signals are transmitted/received between the antenna system 1000 and a base station.

Referring to FIG. 3B, the antenna system 1000 may be disposed within a roof structure 2000*b* of the vehicle, and at least a portion of the roof structure 2000*b* may be made of a non-metallic material. At this time, the at least portion of the roof structure 2000*b* of the vehicle may be realized as the non-metallic material, and may be made of a dielectric material through which radio signals are transmitted/received between the antenna system 1000 and the base station.

Also, referring to 3C, the antenna system 1000 may be disposed within a roof frame 2000*c* of the vehicle, and at least part of the roof frame 200*c* may be made of a non-metallic material. In this case, the at least part of the roof frame 2000*c* of the vehicle 500 may be realized as the non-metallic material, and may be made of a dielectric material through which radio signals are transmitted/received between the antenna system 1000 and the base station.

Meanwhile, referring to FIGS. 3A to 3C, a beam pattern by an antenna disposed in the antenna system 1000 mounted in the vehicle needs to be formed on an upper region at a predetermined angle with respect to a horizontal region.

In this regard, a peak of an elevation beam pattern of the antenna disposed in the antenna system 1000 does not need to be formed at boresight. Therefore, the peak of the elevation beam pattern of the antenna needs to be formed on an upper region at a predetermined angle with respect to the horizontal region. For example, the elevation beam pattern of the antenna may be formed in a hemispheric shape as illustrated in FIGS. 2A to 2C.

As aforementioned, the antenna system 1000 may be installed on the front or rear surface of the vehicle other than the roof structure or roof frame of the vehicle, depending on applications. In this regard, the antenna system 1000 may correspond to an external antenna.

Meanwhile, the vehicle 500 may include only an antenna unit (i.e., internal antenna system) 300 corresponding to an internal antenna without the antenna system 1000 corresponding to an external antenna. In addition, the vehicle 500 may include both the antenna system 1000 corresponding to the external antenna and the antenna unit (i.e., the internal antenna system) 300 corresponding to the internal antenna.

Figure 4A:
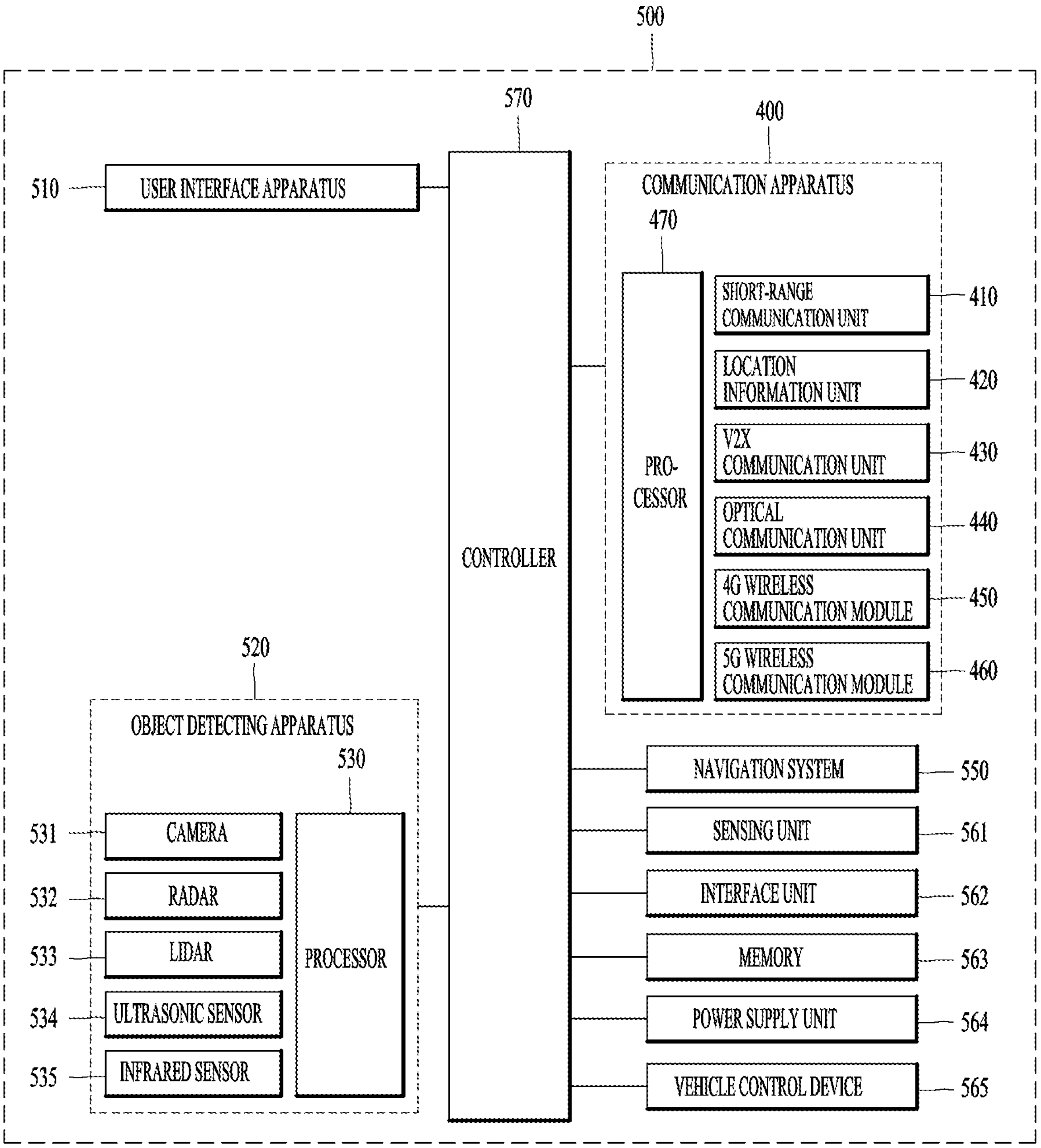
FIG. 4A is a block diagram illustrating a vehicle and an antenna system mounted to the vehicle in accordance with one embodiment.

FIG. 4 is a block diagram illustrating a vehicle and an antenna system mounted on the vehicle in accordance with an implementation.

The vehicle 500 may be an autonomous (driving) vehicle. The vehicle 500 may be switched into an autonomous driving mode or a manual mode (a pseudo driving mode) based on a user input. For example, the vehicle 500 may be switched from the manual mode into the autonomous mode or from the autonomous mode into the manual mode based on a user input received through a user interface apparatus 510.

In relation to the manual mode and the autonomous driving mode, operations such as object detection, wireless communication, navigation, and operations of vehicle sensors and interfaces may be performed by the telematics control unit mounted on the vehicle 500. Specifically, the telematics control unit mounted on the vehicle 500 may perform the operations in cooperation with the antenna module 300, the object detecting apparatus 520, and other interfaces. In some examples, the communication apparatus 400 may be disposed in the telematics control unit separately from the antenna system 300 or may be disposed in the antenna system 300.

The vehicle 500 may be switched into the autonomous mode or the manual mode based on driving environment information. The driving environment information may be generated based on object information provided by the object detecting apparatus 520. For example, the vehicle 500 may be switched from the manual mode into the autonomous driving mode or from the autonomous driving mode into the manual mode based on driving environment information generated in the object detecting apparatus 520.

For example, the vehicle 500 may be switched from the manual mode into the autonomous driving mode or from the autonomous driving mode into the manual mode based on driving environment information received through the communication apparatus 400. The vehicle 500 may be switched from the manual mode into the autonomous driving mode or from the autonomous driving mode into the manual mode based on information, data or signal provided by an external device.

When the vehicle 500 travels in the autonomous mode, the autonomous vehicle 500 may travel under the control of an operation system. For example, the autonomous vehicle 500 may travel based on information, data or signal generated in a driving system, a parking exit (parking-lot leaving system, and a parking system. When the vehicle 500 is driven in the manual mode, the autonomous vehicle 500 may receive a user input for driving through a driving control apparatus. The vehicle 500 may travel based on the user input received through the driving control apparatus.

The vehicle 500 may include a user interface device 510, an object detection device 520, a navigation system 550, and a communication device 400. The vehicle may further include a sensing unit 561, an interface unit 562, a memory 563, a power supply unit 564, and a vehicle control device 565 in addition to the aforementioned apparatuses and devices. According to embodiments the vehicle 500 may include more components in addition to components to be explained in this specification or may not include some of those components to be explained in this specification.

The user interface apparatus 510 may be an apparatus for communication between the vehicle 500 and a user. The user interface apparatus 510 may receive a user input and provide information generated in the vehicle 500 to the user. The vehicle 500 may implement user interfaces (UIs) or user experiences (UXs) through the user interface apparatus 200.

The object detecting apparatus 520 may be a device for detecting an object located at outside of the vehicle 500. The object may be a variety of things associated with driving (operation) of the vehicle 500. In some examples, objects may be classified into moving objects and fixed (stationary) objects. For example, the moving objects may include other vehicles and pedestrians. The fixed objects may conceptually include traffic signals, roads, and structures, for example. The object detecting apparatus 520 may include a camera 521, a radar 522, a LiDAR 523, an ultrasonic sensor 524, an infrared sensor 525, and a processor 530. In some implementations, the object detecting apparatus 520 may further include other components in addition to the components described, or may not include some of the components described.

The processor 530 may control an overall operation of each unit of the object detecting apparatus 520. The processor 530 may detect an object based on an acquired image, and track the object. The processor 530 may execute operations, such as computing of a distance to the object, computing of a relative speed with respect to the object and the like, through an image processing algorithm.

According to an embodiment, the object detecting apparatus 520 may include a plurality of processors 530 or may not include any processor 530. For example, each of the camera 521, the radar 522, the LiDAR 523, the ultrasonic sensor 524 and the infrared sensor 525 may include the processor in an individual manner.

When the processor 530 is not included in the object detecting apparatus 520, the object detecting apparatus 520 may operate according to the control of a processor of an apparatus within the vehicle 500 or the controller 570.

The navigation system 550 may provide location information related to the vehicle based on information obtained through the communication apparatus 400, in particular, a location information unit 420. Also, the navigation system 550 may provide a path (or route) guidance service to a destination based on current location information related to the vehicle. In addition, the navigation system 550 may provide guidance information related to surroundings of the vehicle based on information obtained through the object detecting apparatus 520 and/or a V2X communication unit 430. In some examples, guidance information, autonomous driving service, etc. may be provided based on V2V, V2I, and V2X information obtained through a wireless communication unit operating together with the antenna system 1000.

The communication device 400 may be a device for performing communication with an external device. Here, the external device may be another vehicle, a mobile terminal, or a server. The communication apparatus 400 may perform the communication by including at least one of a transmitting antenna, a receiving antenna, and radio frequency (RF) circuit and RF device for implementing various communication protocols. The communication device 400 may include a short-range communication unit 410, a location information unit 420, a V2X communication unit 430, an optical communication unit 440, a broadcast transceiver 450 and a processor 470. According to an embodiment, the communication apparatus 400 may further include other components in addition to the components described, or may not include some of the components described.

The short-range communication unit 410 is a unit for facilitating short-range communications. The short-range communication unit 410 may construct short-range wireless area networks to perform short-range communication between the vehicle 500 and at least one external device. The location information unit 420 may be a unit for acquiring location information related to the vehicle 500. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit in which protocols for communication with an infrastructure (V2I), communication between vehicles (V2V), and communication with a pedestrian (V2P) are executable. The optical communication unit 440 may be a unit for performing communication with an external device through the medium of light. The optical communication unit 440 may include an optical transmission part for converting an electric signal into an optical signal and transmitting the optical signal to the outside, and an optical reception part for converting the received optical signal into the electric signal. In some implementations, the light-emitting diode may be integrated with lamps provided on the vehicle 500.

The wireless communication unit 460 is a unit that performs wireless communication with one or more communication systems through one or more antenna systems. The wireless communication unit 460 may transmit and/or receive a signal to and/or from a device in a first communication system through a first antenna system. In addition, the wireless communication unit may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

In some examples, the antenna module 300 disposed in the vehicle 500 may include a wireless communication unit. In this regard, the vehicle 500 may be an electric vehicle (EV) or a vehicle that can be connected to a communication system independently of an external electronic device. In this regard, the communication apparatus 400 may include at least one of the short-range communication unit 410, the location information unit 420, the V2X communication unit 430, the optical communication unit 440, a 4G wireless communication module 450, and a 5G wireless communication module 460.

The 4G wireless communication module 450 may perform transmission and reception of 4G signals with a 4G base station through a 4G mobile communication network. In this case, the 4G wireless communication module 450 may transmit at least one 4G transmission signal to the 4G base station. In addition, the 4G wireless communication module 450 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 460 may perform transmission and reception of 5G signals with a 5G base station through a 5G mobile communication network. Here, the 4G base station and the 5G base station may have a Non-Stand-Alone (NSA) architecture. The 4G base station and the 5G base station may be disposed in the Non-Stand-Alone (NSA) architecture. Alternatively, the 5G base station may be disposed in a Stand-Alone (SA) architecture at a separate location from the 4G base station. The 5G wireless communication module 460 may perform transmission and reception of 5G signals with a 5G base station through a 5G mobile communication network. In this case, the 5G wireless communication module 460 may transmit at least one 5G transmission signal to the 5G base station. In addition, the 5G wireless communication module 460 may receive at least one 5G reception signal from the 5G base station. In this instance, a 5G frequency band that is the same as a 4G frequency band may be used, and this may be referred to as LTE re-farming. In some examples, a Sub6 frequency band, which is a range of 6 GHz or less, may be used as the 5G frequency band. In contrast, a millimeter-wave (mmWave) band may be used as the 5G frequency band to perform wideband high-speed communication. When the mmWave band is used, the electronic device may perform beamforming for coverage expansion of an area where communication with a base station is possible.

Regardless of the 5G frequency band, in the 5G communication system, Multi-Input Multi-Output (MIMO) may be supported to be performed multiple times, in order to improve a transmission rate. In this instance, UL MIMO may be performed by a plurality of 5G transmission signals transmitted to a 5G base station. In addition, DL MIMO may be performed by a plurality of 5G reception signals received from the 5G base station.

In some examples, the wireless communication unit 110 may be in a Dual Connectivity (DC) state with the 4G base station and the 5G base station through the 4G wireless communication module 450 and the 5G wireless communication module 460. As such, the dual connectivity to the 4G base station and the 5G base station may be referred to as EUTRAN NR DC (EN-DC). When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 450 and the 5G wireless communication module 460, respectively. Short-range communication between electronic devices (e.g., vehicles) may be performed between electronic devices (e.g., vehicles) using the 4G wireless communication module 450 and the 5G wireless communication module 460. In one embodiment, after resources are allocated, vehicles may perform wireless communication in a V2V manner without a base station.

Meanwhile, for transmission rate improvement and communication system convergence, Carrier Aggregation (CA) may be carried out using at least one of the 4G wireless communication module 450 and the 5G wireless communication module 460 and a WiFi communication module. In this regard, 4G+WiFi CA may be performed using the 4G wireless communication module 450 and the Wi-Fi communication module. Or, 5G+WiFi CA may be performed using the 5G wireless communication module 460 and the Wi-Fi communication module 113.

Meanwhile, the communication apparatus 400 may implement a display apparatus for a vehicle together with the user interface apparatus 510. In this instance, the display apparatus for the vehicle may be referred to as a telematics apparatus or an Audio Video Navigation (AVN) apparatus.

Figure 4B:
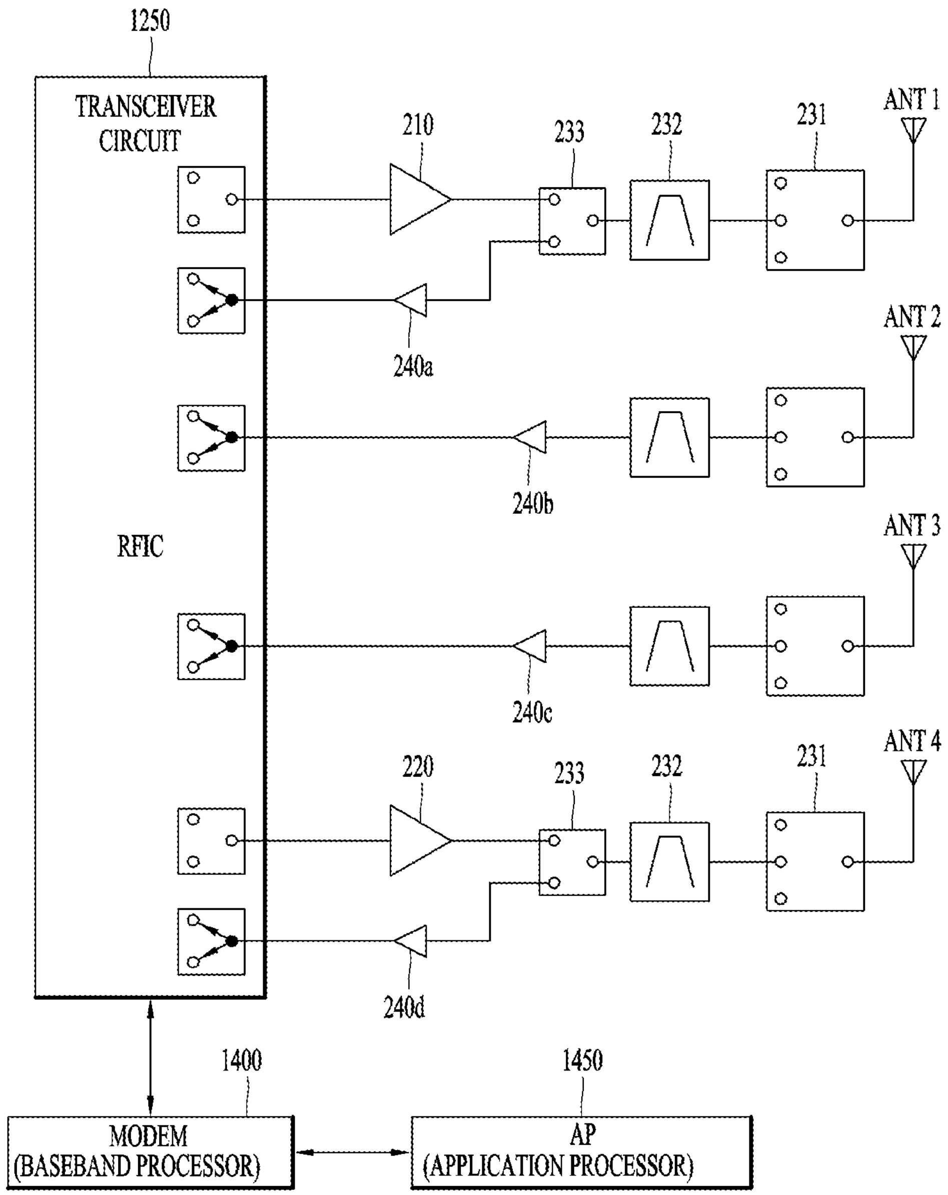
FIG. 4B is a block diagram illustrating an exemplary configuration of a wireless communication unit of a vehicle that can operate in a plurality of wireless communication systems.

FIG. 4B is a block diagram illustrating an exemplary configuration of a wireless communication unit of a vehicle that can operate in a plurality of wireless communication systems. Referring to FIG. 4B, the vehicle may include a first power amplifier 210, a second power amplifier 220, and an RFIC 1250. In addition, the vehicle may further include a modem 1400 and an application processor (AP) 1450. Here, the modem 1400 and the application processor (AP) 1450 may be physically integrated into a single chip, to be logically and functionally separated from each other. However, the modem 1400 and the AP 1450 are not limited thereto and may be realized in the form of chips that are separated physically from each other, depending on application.

Meanwhile, the vehicle may include a plurality of low noise amplifiers (LNAs) 210*a* to 240*a* in the reception unit. Here, the first power amplifier 210, the second power amplifier 220, the RFIC 1250, and the plurality of low noise amplifiers 210*a* to 240*a* may all operate in the first communication system and the second communication system. In this case, the first communication system and the second communication system may be a 4G communication system and a 5G communication system, respectively.

As illustrated in FIG. 4, the RFIC 1250 may be integrally configured to serve for 4G and 5G, but may not be limited thereto. The RFIC 250 may be configured to be separable into two parts, one for 4G and the other for 5G, depending on application. When the RFIC 1250 is integrally configured to serve for 4G and 5G, this configuration may be advantageous in terms of synchronization between 4G and 5G circuits as well as simplification of control signaling by the modem 1400.

On the other hand, when the RFIC 1250 is separable into two parts for 4G and 5G, respectively, these two parts may be referred to as a 4G RFIC and a 5G RFIC, respectively. In particular, when there is a great difference between the 5G band and the 4G band, such as when the 5G band is configured as a millimeter wave band, the RFIC 1250 may be configured to be separable into two parts for 4G and 5G, respectively. Even when the RFIC 1250 is separable into two parts for 4G and 5G, the 4G RFIC and the 5G RFIC may be logically and functionally separated from each other but physically integrated, as SoC (System on Chip), into one chip. On the other hand, the application processor (AP) 1450 may be configured to control the operation of each component of the electronic device. Specifically, the application processor (AP) 1450 may control the operation of each component of the electronic device through the modem 1400.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems. On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented with one antenna using an antenna that serves for both transmission and reception by integrating a transmission unit and a reception unit. In this case, 4×4 MIMO may be implemented using four antennas as illustrated in FIG. 2. At this time, 4×4 DL MIMO may be performed through downlink (DL).

Meanwhile, when the 5G band is a Sub6 band, first to fourth antennas ANT1 to ANT4 may be configured to operate in both the 4G band and the 5G band. On the contrary, when the 5G band is the millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band. Meanwhile, 2×2 MIMO may be implemented using two antennas connected to the first power amplifier 210 and the second power amplifier 220 among the four antennas. In this case, 2×2 UL MIMO (2 Tx) may be performed through uplink (UL).

In addition, the vehicle that is operable in the plurality of wireless communication systems according to an implementation may further include a duplexer 231, a filter 232, and a switch 233. The duplexer 231 may be configured to separate signals into a signal in a transmission band and a signal in a reception band. In this case, the signals in the transmission band that are transmitted through the first and second power amplifiers 210 and 220 are applied to the first and fourth antennas ANT1 and ANT4, respectively, through a first output port of the duplexer 231. On the contrary, the signals in the reception band that are received through the first and fourth antennas ANT1 and ANT4 are received into the low noise amplifiers 210*a* and 240*a*, respectively, through a second output portion of the duplexer 231. The filter 232 may be configured to allow a signal in the transmission band or the reception band to pass through and to block a signal in a band other than the transmission band and the reception band. The switch 233 may be configured to transmit only one of a transmission signal and a reception signal.

The vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit. The modem 1400 may perform control and signal processing for signal transmission and reception through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the vehicle can be allocated resources or maintain a connected state through the eNB or gNB. In addition, the vehicle may perform at least one of V2V communication, V2I communication, and V2P communication with other entities using the allocated resources.

Meanwhile, referring to FIGS. 1A to 4B, the antenna system mounted to the vehicle may be disposed inside the vehicle, on the roof of the vehicle, inside the roof, or inside the roof frame. In this regard, the antenna system disclosed herein may be configured to operate in a low band (LB), mid band (MB), and high band (HB) of a 4G LTE system and a SUB6 band of a 5G NR system.

Figure 5A:
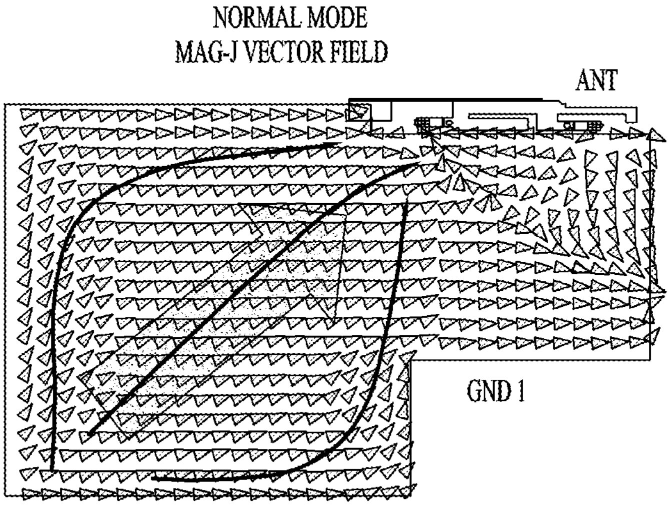
FIG. 5A is a view of comparing an operation principle of a ground boosting antenna of an antenna system according to the present disclosure with that of an antenna in a normal mode.
Figure 5A:
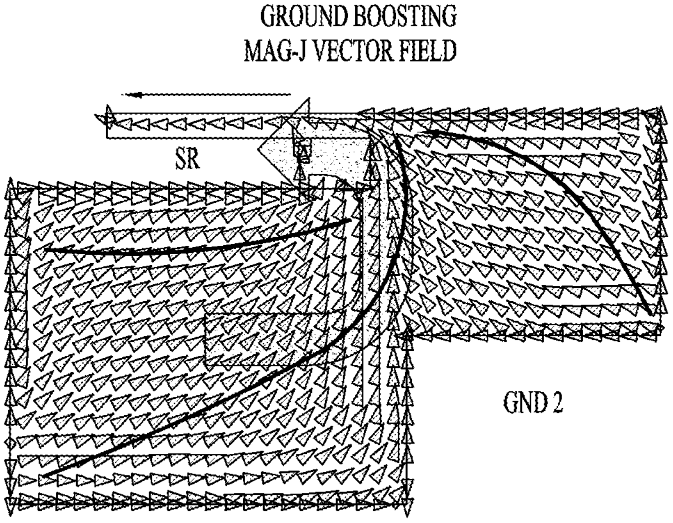

FIG. 5A is a view of comparing an operation principle of a ground boosting antenna of an antenna system according to the present disclosure with that of an antenna in a normal mode. Referring to (a) of FIG. 5A, a current distribution formed in a ground GND1 when an antenna ANT operates in a normal mode is shown. When the antenna ANT operates in the normal mode, current distribution intensity is highest in a region adjacent to the antenna ANT. Therefore, the current is formed in the ground GND1 toward a region where the antenna ANT is disposed. Accordingly, the antenna ANT operates as a main radiator and the ground GND1 operates as a ground for the antenna.

On the other hand, referring to (b) of FIG. 5A, a current distribution formed in a ground GND2 when the antenna ANT operates in a ground boosting mode is shown. When operating in the ground boosting mode, the largest current distribution appears in a slot region SR formed in the ground GND2. When the antenna ANT operates in the ground boosting mode, current distribution intensity is highest in a region adjacent to the slot region SR. Therefore, the current is formed in the ground GND2 toward a region where the slot region SR is disposed. Accordingly, the slot region SR operates as a main radiator, and a feed antenna feeding the slot region SR operates as an auxiliary radiator. As a current path is formed toward the region adjacent to the slot region SR, the length of the current path may increase, thereby increasing antenna efficiency in the low band. In addition, since the length of the current path increases, the size of the antenna can be reduced.

In this regard, when an antenna pattern is disposed in a limited space inside a Telemetric Control Unit (TCU) of the vehicle, it is difficult to secure antenna performance due to the limitation of the disposition space. In this regard, a communication system supported by the vehicle is expanded, and the number of components mounted on a PCB inside the TCU increases. Accordingly, a disposition space of antennas that may be disposed inside the TCU is reduced. A ground boosting antenna according to the present disclosure is involved in an antenna technology that utilizes not only an antenna pattern but also a ground body as antenna radiators.

Figure 5B:
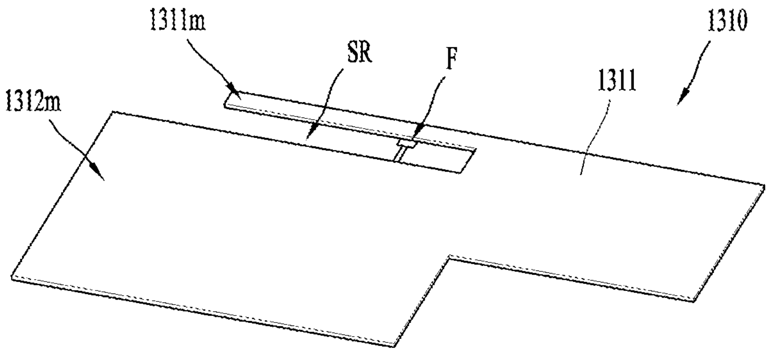
FIG. 5B is a view illustrating different structures of radiators each made of a metal plate with a slot region.
Figure 5B:
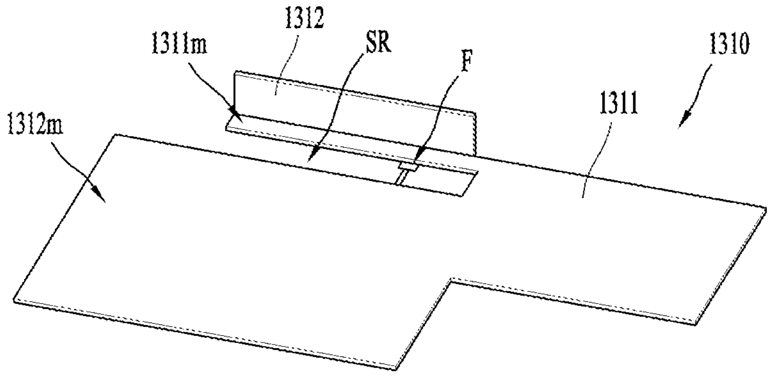

FIG. 5B is a view illustrating different structures of radiators each made of a metal plate with a slot region. (a) of FIG. 5B is a view illustrating a structure of a radiator that includes a metal plate 1311 having a slot region. Referring to (a) of FIG. 5B, a ground radiator may be implemented in the slot region SR through a feeder F. The ground radiator may be a bottom cover 1310 of the antenna system, but is not limited thereto.

(b) of FIG. 5B shows a metal structure 1312 extending from an outer side of the metal plate 1311 forming the slot region. Referring to (b) of FIG. 5B, a resonance frequency of the ground radiator corresponding to the antenna can be adjusted by extending a wall made of a metal around the slot region of the ground. Since the ground region is expanded by the metal structure 1312, the resonance frequency may move to a low frequency band. The metal structure 1312 may be a vertical metal structure formed vertical to the metal plate 1311, but is not limited thereto. The metal structure 1312 may be formed at a predetermined angle with the metal plate 1311. Accordingly, the metal structure 1312 may be referred to as a vertical metal structure 1312 or a bent portion 1312.

Referring to FIG. 5B, the slot region SR may be defined as a region between a first metal portion 1311*m* and a second metal portion 1312*m*. A length of the first metal portion 1311*m* formed outside the slot region SR may be shorter than or equal to a length of the second metal portion 1312*m* formed inside the slot region SR1, but is not limited thereto. For example, the length of the first metal portion 1311*m* may be substantially the same as a length of the metal structure 1312. The length of the metal structure 1312 may be substantially equal to or longer than a length of an antenna element.

Figure 5C:
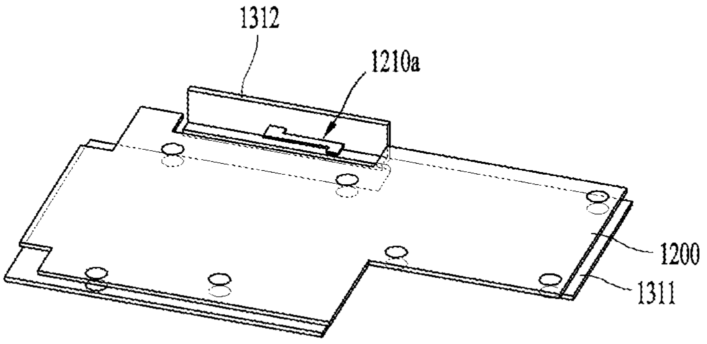
FIG. 5C is a view illustrating a structure according to a shape of a feed path defined in a PCB 1200 disposed on a top of a metal plate 1311, and a structure with an upper ground 1400.
Figure 5C:
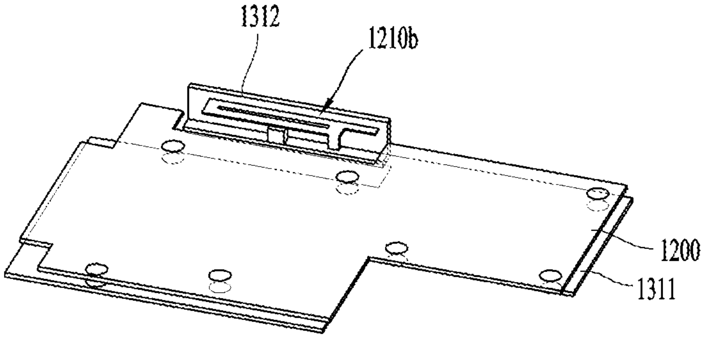
Figure 5C:
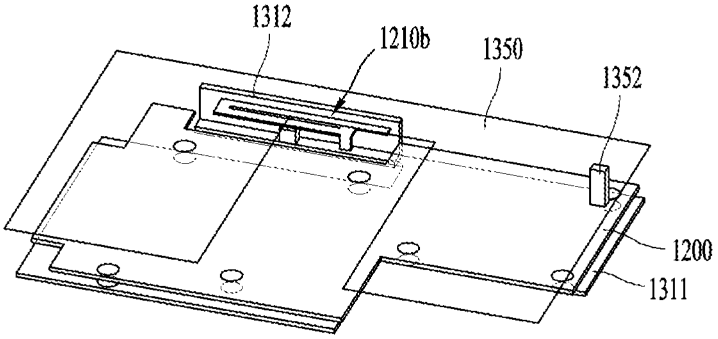

FIG. 5C is a view illustrating a structure according to a shape of a feed path defined in a PCB 1200 disposed on a top of a metal plate 1311, and a structure with an upper ground 1400. (a) of FIG. 5C shows an antenna element 1210*a* implemented as a feeder on a PCB 1200 disposed on a top of the metal plate 1311. In this regard, the antenna element 1210*a* may operate as a first radiator and the metal plate 1311 having the slot region may operate as a second radiator. The antenna element 1210*a* may be formed in a planar structure. Accordingly, the antenna element 1210*a* may be disposed on a plane without being formed in a three-dimensional structure on a separate dielectric carrier. Accordingly, the antenna element 1210*a* may alternatively be configured as a conductive pattern and disposed on the PCB 1200.

(b) of FIG. 5C shows an antenna element 1210*b* formed on a dielectric carrier DC on the PCB 1200 disposed on the top of the metal plate 1311. In this regard, the antenna element 1210*b* may operate as a first radiator and the metal plate 1311 having the slot region may operate as a second radiator.

(c) of FIG. 5C shows a structure in which a metal sheet 1350 is disposed on a top of the PCB 1200 disposed on the top of the metal plate 1311. In order to optimize antenna efficiency and resonance frequency characteristics by the metal sheet 1350, the metal sheet 1350 may be electrically connected to the ground through a ground connection portion 1352. For example, the metal sheet 1350 may be electrically connected to the ground of the PCB 1200 through the ground connection portion 1352. The antenna element 1210*b* is illustrated as being formed on the dielectric carrier DC on the PCB 1200, but is not limited thereto. As illustrated in (a) of FIG. 5C, the antenna element 1210*a* may be formed to be coupled to the PCB 1200 disposed on the top of the metal plate 1311.

Meanwhile, the antenna elements of (a) and (b) of FIG. 5C may be referred to as a first type antenna element 1210*a* and a second type antenna element 1210*b*, respectively. The first type antenna element 1210*a* may have a radiation portion implemented with a single conductive pattern. On the other hand, the second type antenna element 1210*b* may be implemented with a plurality of conductive patterns in which radiating portions are spaced apart at predetermined distances. Accordingly, the second type antenna element 1210*b* may be disposed within a limited area of the PCB 1200, compared to the first type antenna element 1210*a*.

Referring to FIGS. 5B and 5C, the radiator that operates as the antenna may include the antenna element 1210*a*, 1210*b* that includes the slot region SR of a feed connection portion F and a ground, and the conductive pattern. A slot mode radiator operated by current formed in the slot region SR of the ground mainly operates in a band less than 1 GHz. On the other hand, the radiator operated by current formed in the conductive pattern of the antenna element 1210*a*, 1210*b* generates an additional resonance mode in a band of 1 GHz or higher.

Figure 6A:
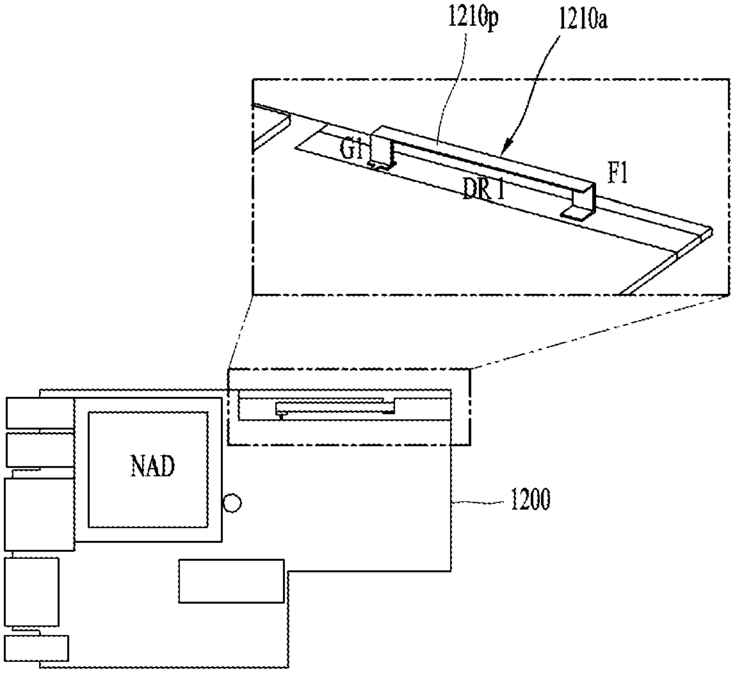
FIGS. 6A and 6B are front, rear, and exploded perspective views illustrating an antenna module in which a first type antenna element 1210*a* is disposed in a slot region SR1 with one end portion open.
Figure 6A:
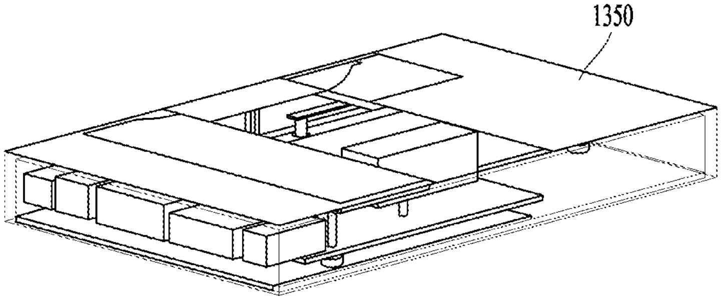
Figure 6B:
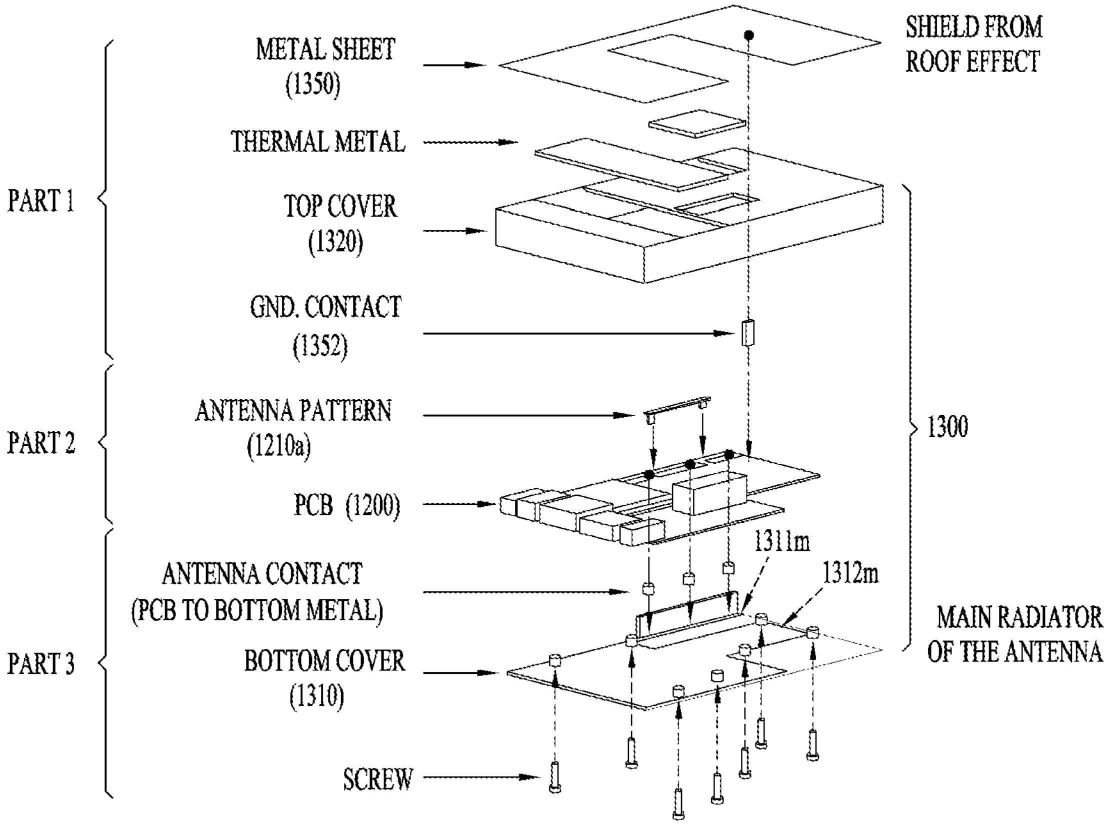
Figure 7A:
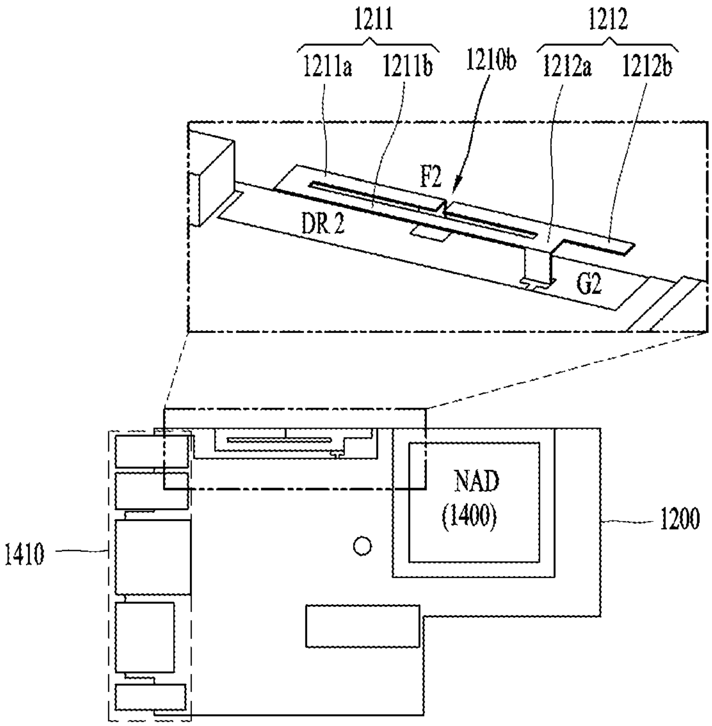
FIGS. 7A and 7B are front, rear, and exploded perspective views illustrating an antenna module in which a second type antenna element 1210*b* is disposed in a slot region SR2 with one end portion open.
Figure 7A:
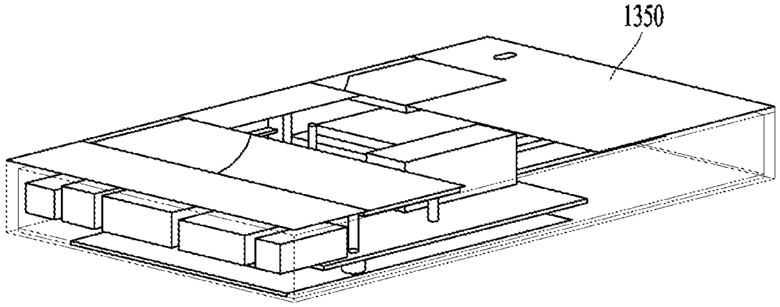
Figure 7B:
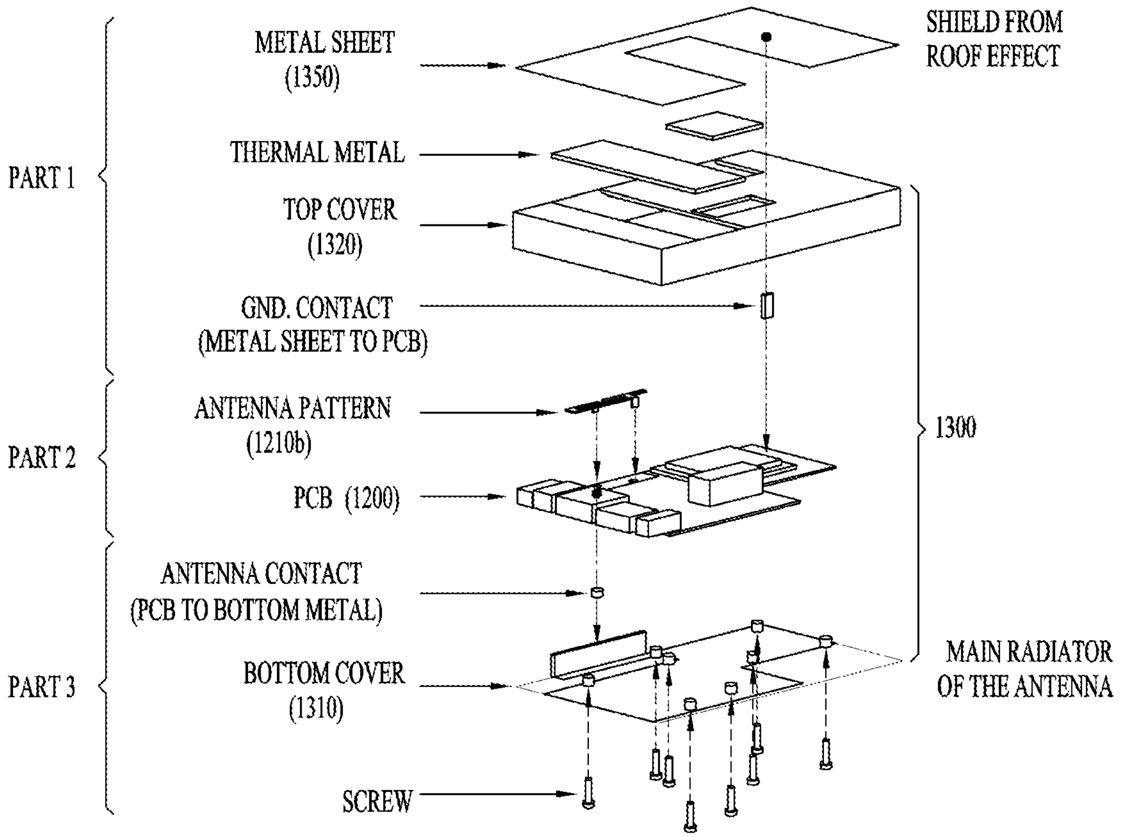

Hereinafter, an antenna system to which a ground boosting antenna is applied according to the present disclosure will be described. In this regard, FIGS. 6A and 6B are front, rear, and exploded perspective views illustrating an antenna module in which a first type antenna element 1210*a* is disposed in a slot region SR1 with one end portion open. On the other hand, FIGS. 7A and 7B are front, rear, and exploded perspective views illustrating an antenna module in which a second type antenna element 1210*b* is disposed in a slot region SR2 with one end portion open.

In this regard, an antenna module may be disposed inside a roof of a vehicle. The antenna module performs vehicle communication, and thus may be referred to as a telematics unit. Also, since the antenna module may perform communication through a plurality of communication systems in addition to a plurality of communication modules, it may be referred to as an antenna system.

Referring to FIGS. 6A to 7B, the antenna element 1210*a*, 1210*b* corresponding to the backup antenna BUA is disposed on the PCB 1200. The antenna element 1210*a*, 1210*b* is an auxiliary antenna that performs an e-call (emergency call) function. In FIGS. 6A to 7B, since a network access device (NAD) corresponding to a processor is disposed on the PCB 1200, the PCB 1200 may correspond to a telematics unit. The PCB 1200 corresponding to the telematics unit may be coupled to another PCB corresponding to an antenna module through a side area. A side area coupling structure will be described in detail later with reference to FIG. 8C.

Referring to FIGS. 5B to 7B, the antenna system 1000 mounted on a vehicle may include a PCB 1200, a bottom cover 1310, and a top cover 1320. The antenna system 1000 may further include a metal sheet 1350.

The PCB 1200 may be configured such that the antenna element 1210*a*, 1210*b* and electronic components are disposed. The bottom cover 1310 may include a metal plate 1311, which is disposed below the PCB 1200 and has a slot region SR1, SR2 formed in a region corresponding to a region where the antenna element 1210*a*, 1210*b* is disposed. The top cover 1320 may be fastened to the bottom cover 1310 to accommodate the PCB 1200 therein. In a ground boosting antenna according to the present disclosure, the antenna element 1210*a*, 1210*b* and the metal plate 1311 on which the slot region SR1, SR2 is formed may configure a radiator.

Meanwhile, the antenna element 1210*a*, 1210*b* may be disposed in a space between the bottom cover 1310 and the top cover 1320 and the antenna system 1000 may be mounted inside the roof of the vehicle. The bottom cover 1310 and the top cover 1320 may configure a cover 1300 defining appearance of the antenna system, and components including the antenna element 1210*a*, 1210*b* disposed in the cover 1300 may be disposed inside the roof of the vehicle.

Therefore, the antenna element 1210*a*, 1210*b* may be used as an auxiliary antenna, compared to other antennas disposed outside the roof of the vehicle. Accordingly, the antenna element 1210*a*, 1210*b* disposed in the space between the bottom cover 1310 and the top cover 1320 may be referred to as a backup antenna (BUA). Also, since the antenna element 1210*a*, 1210*b* is used as the auxiliary antenna, compared to other communication antennas, for example, a MIMO antenna, it may be referred to as the backup antenna (BUA). In addition, since the antenna element 1210*a*, 1210*b* performs an emergency call (e-call) when communications through other antennas are not performed, it may be referred to as the backup antenna (BUA).

A metal structure 1312 may extend from an outer side of the bottom cover 1310 defining the slot region SR1, SR2. The metal structure 1312 may be formed at a predetermined angle with the bottom cover 1310. For example, the metal structure 1312 may be a vertical metal structure that is formed at an angle perpendicular to the bottom cover 1310. The vertical metal structure may be referred to as a metal wall. A resonance frequency of an antenna may be tuned by the metal structure 1312 corresponding to a metal region that is expanded in the vicinity of the slot region SR1, SR2 of a ground. The antenna element 1210*a*, 1210*b* disposed inside the metal structure 1312 may feed a signal to the slot region SR1, SR2 through the PCB 1200.

The first type antenna element 1210*a* may include a feed connection portion F1 vertically formed at one point of the conductive pattern and a ground connection portion G1 vertically formed at another point of the conductive pattern. Depending on applications, the positions of the feed connection portion F1 and the ground connection portion G1 may change. The second type antenna element 1210*b* may include a feed connection portion F2 vertically formed at one point of the conductive pattern and a ground connection portion G2 vertically formed at another point of the conductive pattern. Depending on applications, the positions of the feed connection portion F2 and the ground connection portion G2 may change. The ground connection portion G1, G2 may be configured to be connected to the ground of the PCB 1200. The feed connection portion F1, F2 may be configured to be connected to a signal line of the PCB 1200.

The first type antenna element 1210*a* may have a radiation portion implemented with a single conductive pattern 1210*p*. On the other hand, the second type antenna element 1210*b* may be implemented with a plurality of conductive patterns in which radiating portions are spaced apart at predetermined distances. Specifically, the second type antenna element 1210*b* may include a first conductive pattern 1211 and a second conductive pattern 1212.

The first conductive pattern 1211 may have one end portion connected to the ground connection portion G2 and another end portion connected to the feed connection portion F2. The first conductive pattern 1211 connected to the ground connection portion G2 and the feed connection portion F2 may be formed in a bending structure and disposed within a limited area of the PCB 1200. The first conductive pattern 1211 may include a first sub pattern 1211*a* and a second sub pattern 1211*b* disposed in parallel. The first sub pattern 1211*a* may have a first length, and the second sub pattern 1211*b* may have a second length longer than the first length.

The second conductive pattern 1212 may include a connection part 1212*a* formed on one end portion thereof and connected to the ground connection portion G2, and an extension part 1212*b* extending from another end portion thereof to both sides. One end portion of the connection part 1212*a* of the second conductive pattern 1212 may be connected to the ground connection portion G2 and another end portion may be connected to the extension part 1212*b*. The extension part 1212*b* of the second conductive pattern 1212 may be disposed adjacent to the second sub pattern 1211*b* of the first conductive pattern 1211 at a predetermined distance. Accordingly, the second type antenna element 1210*b* may be disposed within a limited area of the PCB 1200, compared to the first type antenna element 1210*a*.

The feed connection portion F1, F2 may be configured to apply signals to the slot region SR1, SR2 so that the bottom cover 1310 operates as a slot antenna. The feed connection portion F1, F2 may be connected to a feed path of the PCB 1200, and the feed path of the PCB 1200 may be disposed in the slot region SR1, SR2. According to the configuration of the feed connection portion F1, F2 disposed in the slot region SR1, SR2, the bottom cover 1310 may be configured to operate as a slot antenna.

Referring to FIGS. 6A and 6B, the first type antenna element 1210*a* may be disposed in an antenna system of TYPE 1 structure (telematics unit). On the other hand, Referring to FIGS. 7A and 7B, the second type antenna element 1210*b* may be disposed in an antenna system of TYPE 2 structure (telematics unit). Referring to FIGS. 6A to 7B, a dielectric region DR1, DR2 from which a metal pattern is removed may be formed on the PCB 1200, such that the antenna element 1210*a*, 1210*b* is disposed.

Referring to FIGS. 6A and 6B, the PCB 1200 may include a first metal portion 1210*m*, a second metal portion 1220*m*, and a dielectric region DR1. The dielectric region DR1 may be defined as a region between the first metal portion 1210*m* and the second metal portion 1220*m*. A length of the first metal portion 1210*m* that is formed on the PCB more outward than the antenna element 1210*a* may be less than a length of the second metal portion 1220*m* formed on an inner side of the PCB.

Figure 8A:
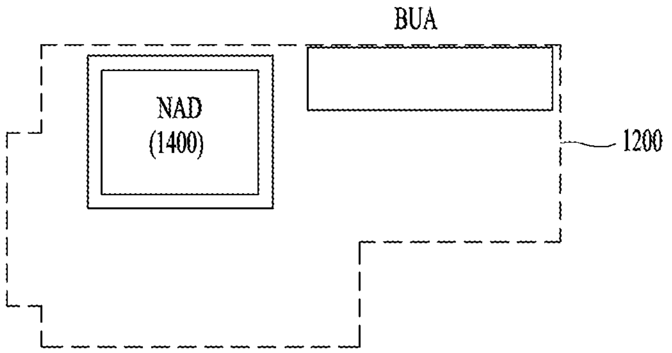
FIG. 8A illustrates a component disposition structure including a backup antenna in a first type telematics unit.
Figure 8A:
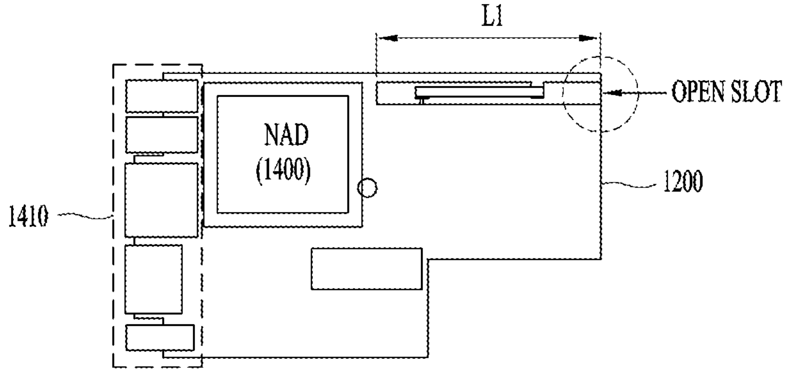

Referring to FIGS. 6A and 6B, in TYPE 1 structure, the antenna element 1210*a* may be disposed on one side of the PCB 1200, which is different from an area where a first type component 1400 and a second type component 1410 are disposed. On the other hand, the first type component 1400 and the second type component 1410 may be disposed on another side of the PCB 1200. In this regard, FIG. 8A illustrates a component disposition structure including a backup antenna in a first type telematics unit. (a) of FIG. 8A illustrates a configuration in which a backup antenna BUA and a network access device (NAD) are disposed on one side and another side of the PCB 1200 corresponding to the telematics unit. On the other hand, (b) of FIG. 8A illustrates a configuration in which the first type component 1400 and the second type component 1410 are disposed on one side of the PCB 1200.

Referring to FIGS. 5B, 6A, 6B, and 8A, the first type component 1400 and the second type component 1410 may be disposed on another side of the PCB 1200, and the antenna element 1210*b* may be disposed on one side of the PCB 1200. A length of the first metal portion 1311*m* formed at the outer side of the slot region SR may be longer than or equal to a length of the second metal portion 1312*m* formed at the inner side of the slot region SR1. The slot region SR may be defined as a region between the first metal portion 1311*m* and the second metal portion 1312*m*. Meanwhile, the dielectric region DR1 may extend up to an end portion of the one side of the PCB 1200. Accordingly, the slot region SR1 may operate as an open slot antenna in a length direction. The dielectric region DR1 where the antenna element 1210*a* is disposed may have a length set to L1.

Figure 8B:
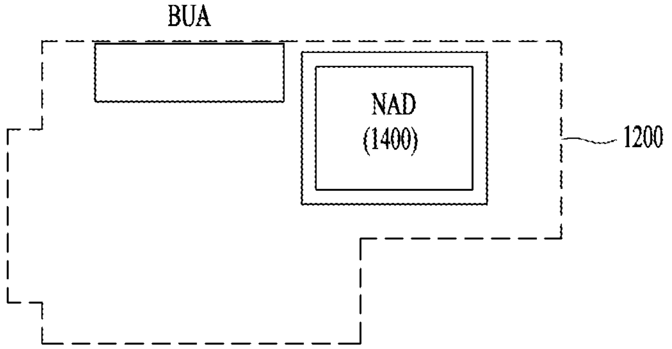
FIG. 8B illustrates a component disposition structure including a backup antenna in a first type telematics unit.
Figure 8B:
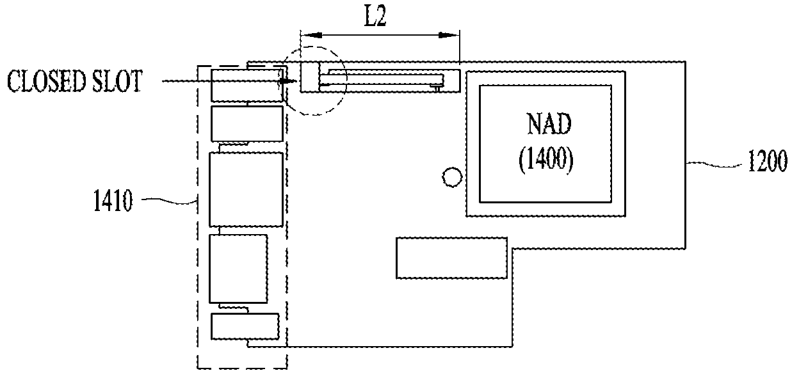

Referring to FIGS. 7A and 7B, in TYPE 2 structure, the first type component 1400 and the second type component 1410 may be disposed on one side and another side of the PCB 1200, respectively. The antenna element 1210*b* may be disposed between the first type component 1400 and the second type component 1410. In this regard, FIG. 8B illustrates a component disposition structure including a backup antenna in a first type telematics unit. (a) of FIG. 8B illustrates a configuration in which the network access device (NAD) and the backup antenna (BUA) are disposed on one side and another side of the PCB 1200 corresponding to the telematics unit, respectively. On the other hand, (b) of FIG. 8B illustrates a configuration in which the first type component 1400 and the second type component 1410 are disposed on one side and another side of the PCB 1200, respectively.

Referring to FIGS. 8A and 8B, the antenna disposition space in TYPE 2 is reduced by about 30%, compared to that in TYPE 1. Accordingly, compared to the antenna having the open slot structure as illustrated in (b) of FIG. 8A, antenna performance may be lowered in the closed slot structure, in which ends of the slot are closed, as illustrated in (b) of FIG. 8B. Therefore, the antenna performance can be maintained by disposing the second type antenna element 1210*b*, as illustrated in FIGS. 7A and 7B, inside a limited space like the dielectric region DR2.

Referring to FIGS. 7A, 7B, and 8B, the first type component 1400 may be disposed on one side of the PCB 1200 and the second type component 1410 may be disposed on another side. The antenna element 1210*b* may be disposed between the first type component 1400 and the second type component 1410. A length of the first metal portion 1311*m* formed at the outer side of the slot region SR may be shorter than or equal to a length of the second metal portion 1312*m* formed at the inner side of the slot region SR1. The slot region SR may be defined as a region between the first metal portion 1311*m* and the second metal portion 1312*m*.

Meanwhile, the dielectric region DR1 does not extend up to an end portion of the another side of the PCB 1200. This results from that the first type component 1400 is disposed on the end portion of the another side of the PCB 1200. Therefore, a metal pattern may be disposed on the end portion of the another side of the PCB 1200, and thus the slot region SR2 may operate as a closed slot antenna in the length direction. The dielectric region DR2 where the antenna element 1210*b* is disposed may have a length set to L2 shorter than L1. Accordingly, the second type antenna element 1210*b* may be disposed within a limited region of the PCB 1200, compared to the first type antenna element 1210*a*.

Referring to FIGS. 6A to 8B, as aforementioned, the antenna element 1210*a*, 1210*b* corresponding to the backup antenna BUA is disposed on the PCB 1200. The antenna element 1210*a*, 1210*b* is an auxiliary antenna that performs an e-call (emergency call) function. In FIGS. 6A to 8B, since an NAD corresponding to a processor is disposed on the PCB 1200, the PCB 1200 may correspond to a telematics unit. The PCB 1200 corresponding to the telematics unit may be coupled to another PCB corresponding to an antenna module through a side area. In this regard, FIG. 8C illustrates a configuration of a telematics unit and an antenna module that are coupled in a side area.

Figure 8C:
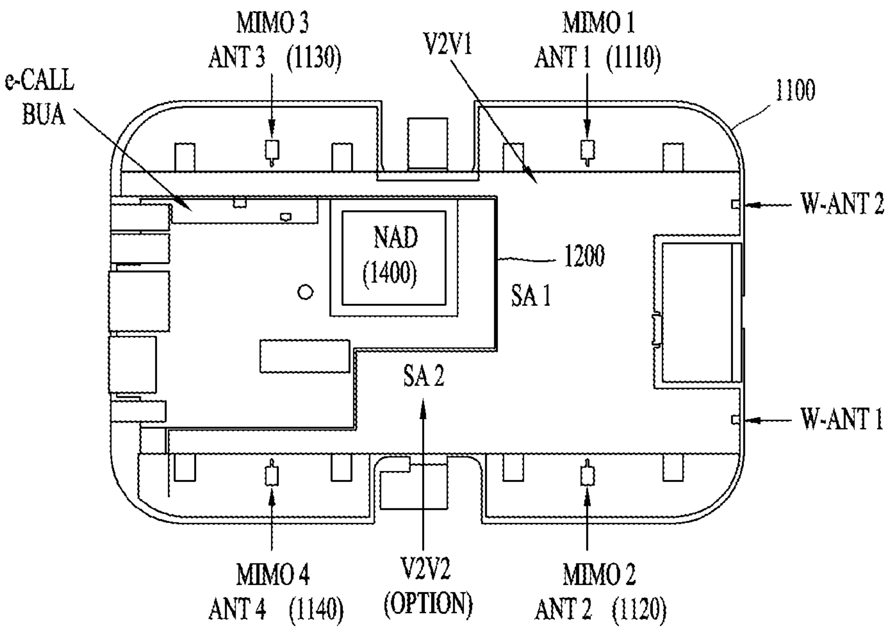
FIG. 8C illustrates a configuration of a telematics unit and an antenna module that are coupled in a side area.

Referring to FIG. 8C, the PCB 1200 corresponding to the telematics unit may be operably coupled to the antenna module 1100 such that an outer side of the PCB 1200 is surrounded. The PCB 1200 corresponding to the telematics unit may be operably coupled to the antenna module 1100 through at least one side area. For example, the NAD 1400 disposed on the PCB 1200 may be operably coupled to the antenna module 1100 through a first side area SA1. To this end, the NAD 1400 may be electrically connected to the antenna module 1100 through an input/output interface formed on the first side area SA1. Also, other components disposed on the PCB 1200 may be operably coupled to the antenna module 1100 through a second side area SA2. To this end, components disposed on the PCB 1200 may be electrically connected to the antenna module 1100 through an input/output interface, for example, a connector, disposed on the second side area SA2.

Referring to FIGS. 5B to 8C, in addition to the antenna element 1210*a*, 1210*b* corresponding to the auxiliary antenna, a plurality of antennas 1110 to 1140 may be disposed on the antenna substrate 1100 corresponding to the antenna module. The plurality of antennas 1110 to 1140 may be disposed on different areas of the antenna substrate 1100 corresponding to areas outside the outer side of the PCB 1200.

The other antennas 1110 to 1140 disposed on the antenna substrate 1100 may be disposed to perform MIMO in an LTE band or a 5G SUB6 band. To reduce interference between the first antenna (ANT1) 1110 to the fourth antenna (ANT4) 1140, the first antenna (ANT1) 1110 to the fourth antenna (ANT4) 1140 may be disposed on different areas of the antenna substrate 1100. For example, the antennas (ANT1 to ANT4) 1110 to 1140 may be disposed on an upper right side, a lower right side, an upper left side, and a lower left side, respectively, but may not be limited thereto.

Meanwhile, first and second WiFi antennas W-ANT1 and W-ANT2 configured to perform WiFi communication may be disposed adjacent to a side surface portion of the antenna substrate 1100. In addition, V2V antennas V2V1 and V2V2 configured to perform V2V communication (or V2X communication) may be disposed on different areas of the antenna substrate 1100.

Meanwhile, in a ground boosting antenna structure according to the present disclosure, antenna elements may be implemented in various shapes. Also, in the ground boosting antenna structure according to the present disclosure, antenna performance can be improved by a metal sheet 1350 disposed on the top cover 1320. Also, the ground boosting antenna structure according to the present disclosure may be configured as a metal structure 1312 formed at a predetermined angle with respect to the bottom cover 1310.

Figure 9A:
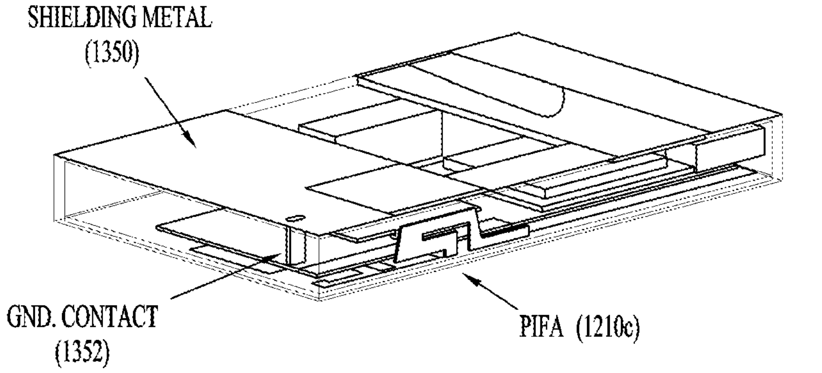
FIG. 9A compares antenna system structures according to presence or absence of a metal structure that is formed at a predetermined angle with respect to a bottom cover.
Figure 9A:
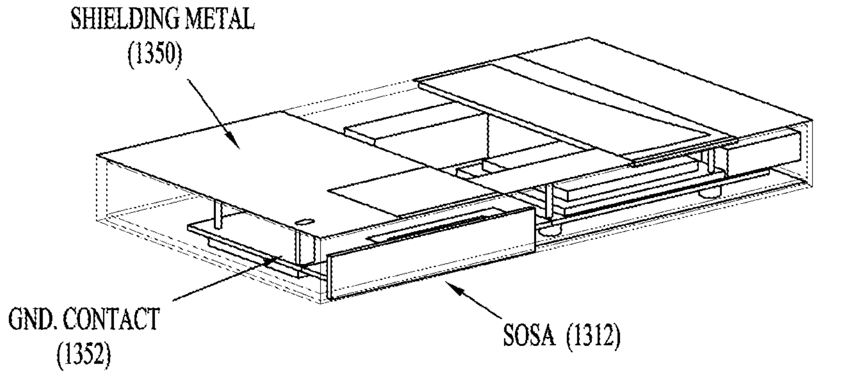

In relation to the technical features, FIG. 9A compares antenna system structures according to presence or absence of a metal structure that is formed at a predetermined angle with respect to a bottom cover. (a) of FIG. 9A illustrates a structure in which an antenna element 1210*c* is disposed in a side area without a metal structure. In this regard, it may be considered that the metal structure 1312 is replaced with a planar inverted-F antenna (PIFA) formed on a side surface.

Figure 9B:
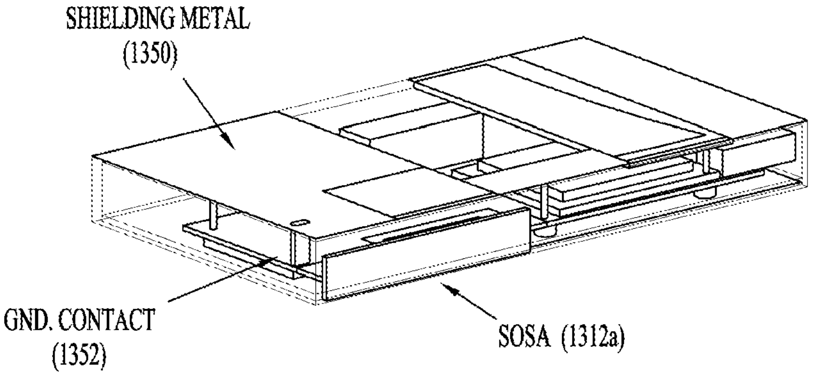
FIG. 9B compares a configuration in which metal structures are disposed in different side areas of an antenna structure.
Figure 9B:
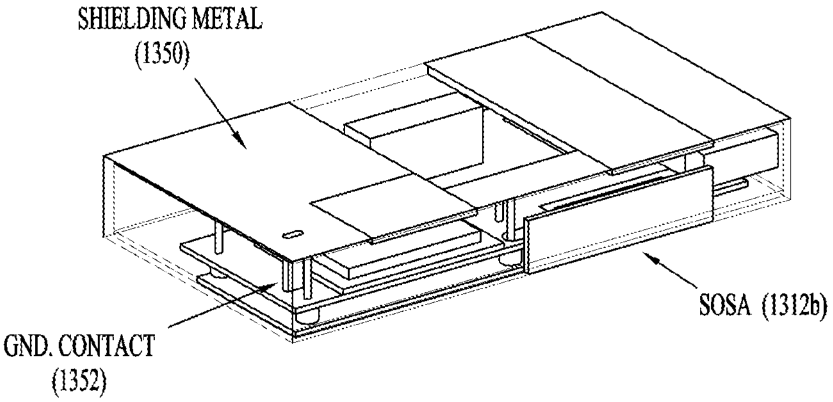

(b) of FIG. 9B illustrates a structure in which the metal structure 1312 formed at the predetermined angle with the bottom cover 1310 is disposed on a side surface. As such, the antenna structure, in which the metal structure is attached on the side surface of a structure constituting the antenna system, may also be referred to as a stepped open slot antenna (SOSA). An antenna resonance frequency can shift to a lower frequency by the side metal structure 1312, and the antenna performance can be improved at the low band (LB).

In FIGS. 6A to 7B, and (a) and (b) of FIG. 9A, when the antenna system is disposed on the bottom of the roof of the vehicle, the metal sheet 1350 may be disposed on the top cover 1320 to offset current components induced on the roof. This can improve radiation efficiency of a slot antenna formed in the ground boosting structure.

Meanwhile, FIG. 9B compares a configuration in which metal structures disposed in different side areas of an antenna structure. (a) of FIG. 9B corresponds to a structure, in which the first type BUA 1210*a* is disposed on one side of the PCB 1200 and the NAD 1400 is disposed on another side of the PCB 1200, as illustrated in (a) of FIG. 8A. Referring to (a) of FIG. 8A and (a) of FIG. 9B, a metal structure 1312*a* is disposed on a side area corresponding to the one side of the PCB 1200 where the first type BUA 1210*a* is disposed. On the other hand, (b) of FIG. 9B corresponds to a structure, in which the NAD 1400 is disposed on one side of the PCB 1200 and the second type BUA 1210*b* is disposed on another side of the PCB 1200, as illustrated in (a) of FIG. 8B. Referring to (a) of FIG. 8B and (b) of FIG. 9B, a metal structure 1312*b* is disposed on a side area corresponding to the another side of the PCB 1200 where the second type BUA 1210*b* is disposed. Meanwhile, since the length of the second type BUA 1210*b* is shorter, the length of the second metal structure 1312*b* may be shorter than the length of the first metal structure 1312*a*.

With regard to this, the metal structure 1312*a*, 1312*b* mainly affects LB performance of the ground boosting antenna. On the other hand, the decrease in lengths of the dielectric region and the slot region in the first and second type structures may affect mid-band (MB) performance of the ground boosting antenna. Therefore, the change of the LB performance of the ground boosting antenna according to the changes of the positions and lengths of the metal structured 1312*a* and 1312*b* according to (a) and (b) of FIG. 9B hardly occurs.

Figure 10A:
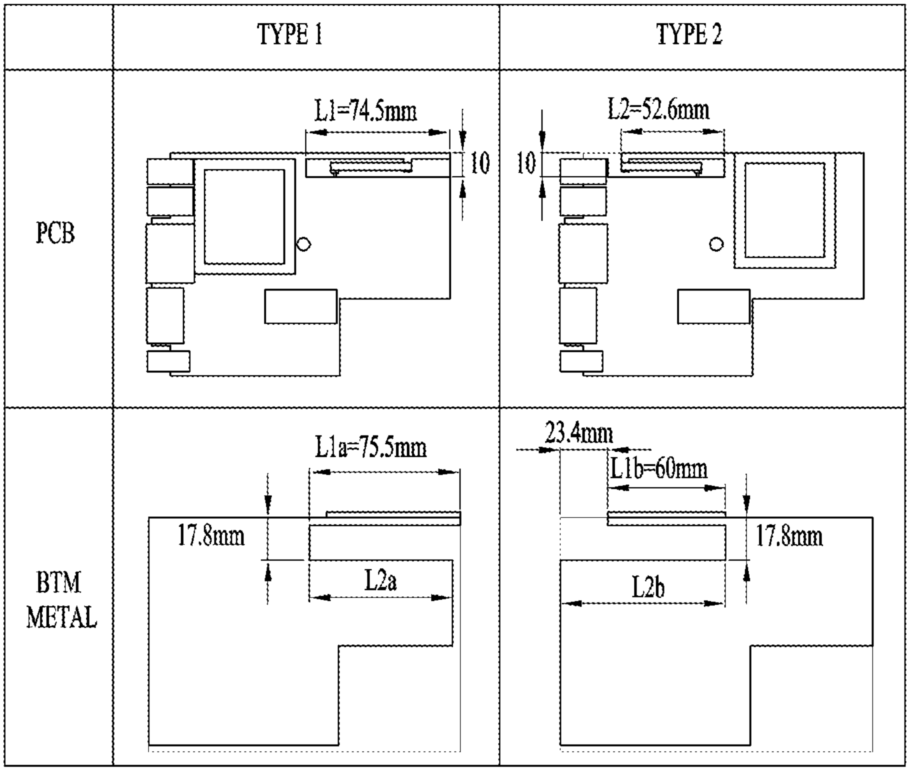
FIG. 10A illustrates shapes of PCBs and bottom cover metal structures of ground boosting antennas with structures of TYPE 1 and TYPE 2.
Figure 10B:
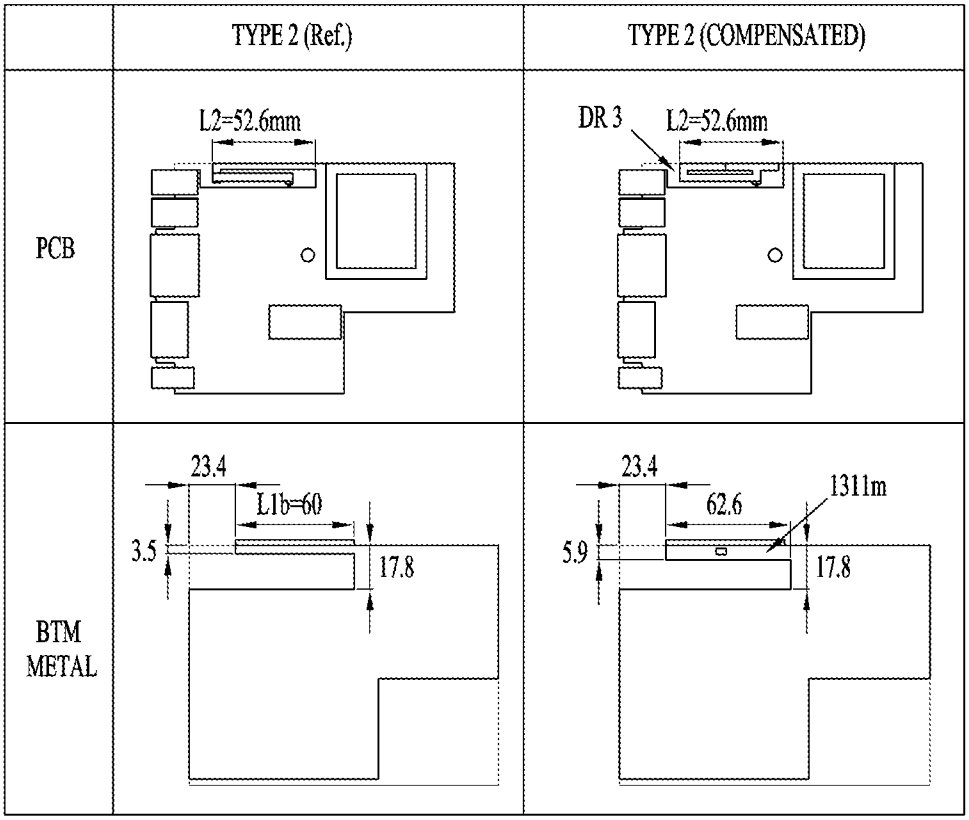
FIG. 10B compares shapes of PCBS and bottom cover metal structures for a reference structure and a compensated structure for MB performance improvement in the ground boosting antenna with the structure of TYPE 2.

Meanwhile, the ground boosting antennas of TYPE 1 and TYPE 2 structures according to the present disclosure may be formed in an open slot structure and a closed slot structure. In this regard, FIG. 10A illustrates shapes of PCBs and bottom cover metal structures of ground boosting antennas with TYPE 1 and TYPE 2 structures, respectively. On the other hand, FIG. 10B compares shapes of PCBs and bottom cover metal structures for a reference structure and a compensated structure for MB performance improvement in the ground boosting antenna with Type 2 structure.

Referring to (b) of FIG. 8A, (a) of FIG. 9B, and FIG. 10A, the length of the dielectric region DR1 in TYPE 1 structure may be set to L1 and the ground boosting antenna may operate as the open slot antenna. On the other hand, referring to (b) of FIG. 8B and FIG. 10A, the length of the dielectric region DR2 in TYPE 2 structure may be set to L2 and the ground boosting antenna may operate as the closed slot antenna.

Referring to (b) of FIG. 8A, (b) of FIG. 9B, and FIG. 10A, a length L1*a* of the first metal portion 1311*m* formed at the outer side of the slot region SR1 may be longer than or equal to a length L2*a* of the second metal portion 1312*m* formed at the inner side of the slot region SR1. On the other hand, referring to (b) of FIG. 8B and FIG. 10A, a length L1*b* of the first metal portion 1311*m* formed at the outer side of the slot region SR1 may be shorter than or equal to a length L2*b* of the second metal portion 1312*m* formed at the inner side of the slot region SR1. Accordingly, a slot length may be limited by the first type component 1400 in TYPE 2 structure. Therefore, the length L1*b* of the first metal portion 1311*m* in TYPE 2 is shorter than the length L1*a* of the metal structure 1312*b* in TYPE 1. Similar to this, the length of the second metal structure 1312*b* is shorter than the length of the first metal structure 1312*a*.

Meanwhile, in the ground boosting antenna structure with the structure of TYPE 2 may partially change in metal disposition structure of the PCB for improvement of MB performance. In this regard, FIG. 10B illustrates a PCB disposition structure and a bottom cover metal structure, in which different types of antenna elements are disposed.

Referring to FIG. 10B, in the reference structure of TYPE 2, the first type antenna element 1210*a* may be disposed on the dielectric region DR2. On the other hand, in the compensated structure of TYPE 2, the second type antenna element 1210*b* may be disposed on the dielectric region DR3. The dielectric region DR3 has a shape in which a metal portion at the outer side of the PCB is removed, compared to the dielectric region DR2. Meanwhile, the metal shape structures of the bottom cover that have the reference structure of TYPE 2 and the compensated structure of TYPE 2 may be configured similarly. The first metal portion 1311*m* of the bottom cover in the compensated structure may have a greater width than that in the reference structure.

Figure 11A:
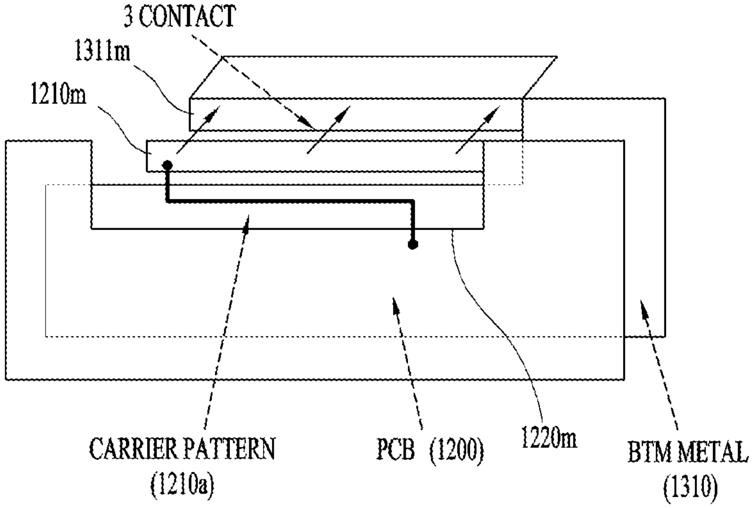
FIG. 11A compares structures according to a change of a PCB metal pattern corresponding to a slot region in which an antenna element is located.
Figure 11A:
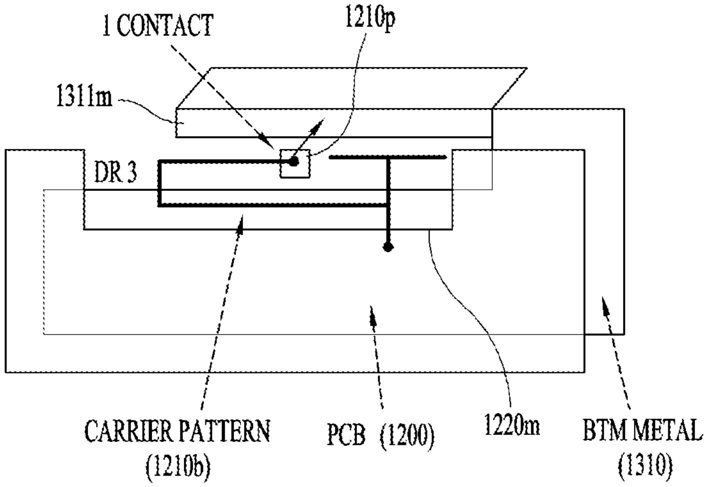

FIG. 11A compares structures according to a change of a PCB metal pattern corresponding to a slot region in which an antenna element is located. (a) of FIG. 11A illustrates a first configuration in which the antenna element 1210*a* is connected to the first metal portion 1210*m* and the second metal portion 1220*m* of the PCB 1200. The feed connection portion F1 of the antenna element 1210*a* may be connected to the first metal portion 1210*m*. The ground connection portion G1 of the antenna element 1210*a* may be connected to the second metal portion 1220*m*. Meanwhile, the first metal portion 1210*m* of the PCB 1200 and the first metal portion 1311*m* of the bottom cover 1310 may be connected in a contact manner at a plurality of points.

(b) of FIG. 11A illustrates a second configuration in which the antenna element 1210*b* is connected to a feeding pad 1210*p* and the second metal portion 1210*p* of the PCB 1200. Referring to FIGS. 7A and 7B and (b) of FIG. 11A, the feed connection portion F2 of the antenna element 1210*b* may be connected to the first metal portion 1311*m* of the bottom cover 1310 through the feeding pad 1210*p*. The ground connection portion G2 of the antenna element 1210*b* may be connected to the second metal portion 1220*m*. The dielectric region DR3 from which a metal pattern is removed may be formed on the PCB 1200 to dispose the antenna element 1210*b* thereon.

The dielectric region DR3 may be formed in a rectangular shape and the antenna element 1210*b* may be disposed in the rectangular dielectric region DR3. Therefore, MB performance of the antenna can be improved by partially changing the dielectric region on the PCB 1200, partially change the metal pattern of the bottom cover 1310, and partially changing the metal pattern of the antenna element. The dielectric region DR1, DR2, DR3 is a region where the antenna element 1210*a*, 1210*b* is disposed, and a width of the dielectric region DR1, DR2, DR3 may be defined as clearance. As one example, the clearance corresponding to the width of the dielectric region DR3 may be set to at least 10 mm or more.

The antenna element 1210*b* may include a ground connection portion G2, a feed connection portion F2, and a plurality of conductive patterns 1211 and 1212. The ground connection portion G2 may be connected to the ground of the PCB 1200 and the feed connection portion F2 may be connected to a signal line of the PCB 1200. The first conductive pattern 1211 may have one end portion connected to the ground connection portion G2 and another end portion connected to the feed connection portion F2. The first conductive pattern 1211 may include first and second sub patterns 1211*a* and 1211*b* that are connected at end portions thereof and disposed in parallel to each other in the dielectric region DR2, DR3. The second conductive pattern 1212 may include an extension part 1212*b* that is connected to the ground connection portion G2 at one end portion thereof and extends from another end portion to both sides. The second conductive pattern 1212 may include a connection part 1212*a* and the extension part 1212*b*.

Figure 11B:
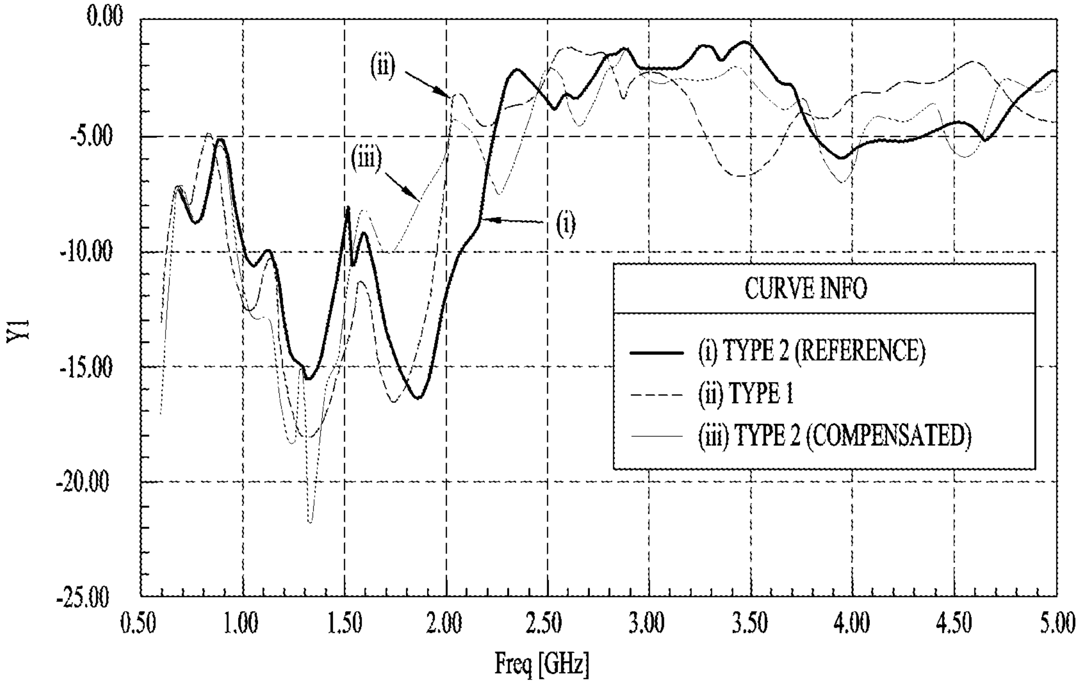
FIG. 11B illustrates antenna gain characteristics for each frequency in relation to the structure of TYPE 1, a reference structure of TYPE 2, and a compensated structure of TYPE 2.

FIG. 11B illustrates antenna gain characteristics for each frequency in relation to the structure of TYPE 1, a reference structure of TYPE 2, and a compensated structure of TYPE 2. Referring to FIG. 11B, items (i), (ii), and (iii) show antenna gain characteristics of the reference structure of TYPE 2, the structure of TYPE 1, and the compensated structure of TYPE 2. In relation to the compensated structure of TYPE 2, the dielectric region on the PCB 1200 may partially change, the metal pattern of the bottom cover 1310 may partially change, and the metal pattern of the antenna element may partially change. This can improve MB performance of the antenna in the compensated structure of TYPE 2.

Referring to (i), (ii), and (iii) of FIG. 11B, LB antenna peak gains exhibit almost equivalent levels. At bands ranging from 1.7 to 2.0 GHz corresponding to MB, the antenna gain characteristic of the compensated structure of TYPE 2 has been improved more than that of the reference structure of TYPE 2. Referring to (ii) and (iii) of FIG. 11B, a gain peak frequency is about 2.0 GHz, and the compensated structure of TYPE 2 exhibits substantially similar performance to the structure of TYPE 1. The compensated structure of TYPE 2 has a lower peak gain value at the gain peak frequency than the structure of TYPE 1. However, at most of frequencies ranging from 1.7 GHz which is lower than 2.0 GHz to 2.0 GHz, the compensated structure of TYPE 2 has a higher gain value than the structure of TYPE 1.

Figure 12A:
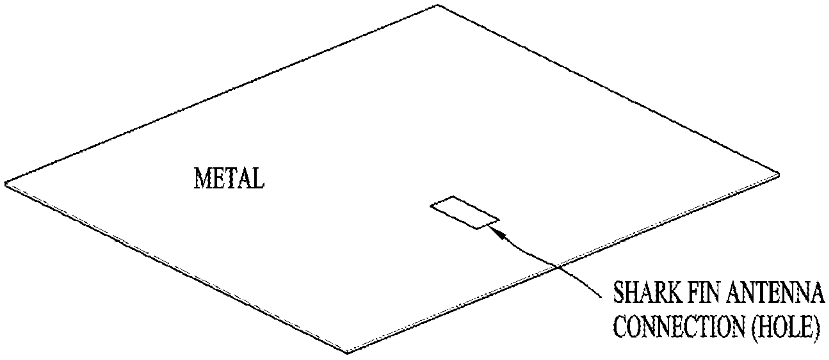
FIG. 12A is a view illustrating a metal structure having a hole (slot) to which a separate antenna structure is to be coupled and a telematics unit disposed below the metal structure.
Figure 12A:
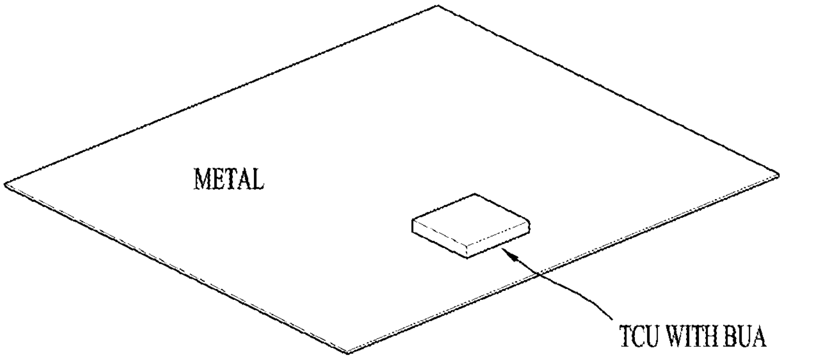
Figure 12B:
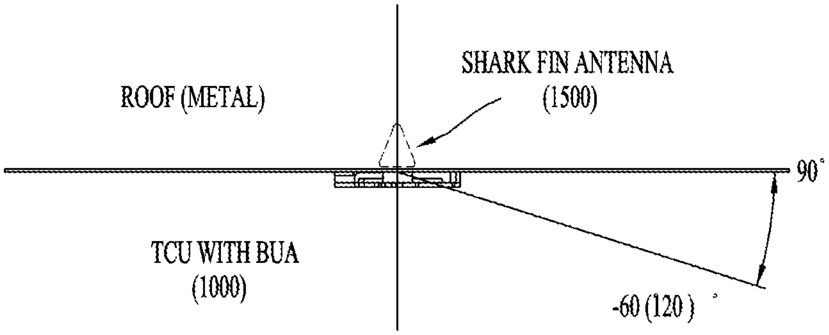
FIG. 12B is a view illustrating a state in which a telematics unit is disposed on a bottom of a roof of a vehicle and a separate antenna structure is installed on a top of the roof.

The antenna structure according to the present disclosure may be disposed on the bottom of the metal structure corresponding to the roof of the vehicle. In addition, a hole structure (slot structure) that can be combined with other antenna structures may be disposed on the top of the metal structure. In this regard, FIG. 12A is a view illustrating a metal structure having a hole (slot), to which a separate antenna structure can be coupled, is formed and a telematics unit disposed beneath the metal structure. FIG. 12B is a view illustrating a shape in which a telematics unit is disposed on a bottom of a roof of a vehicle and a separate antenna structure is installed on a top of the roof.

(a) of FIG. 12A shows a structure having a hole (slot), to which an antenna structure, for example, a shark-fin antenna can be coupled, formed in the roof of the vehicle corresponding to the metal structure. Referring to (b) of FIG. 12A, the telematics unit, that is, the antenna system 1000 may be disposed on the bottom of the roof of the vehicle corresponding to the metal structure.

Referring to (b) of FIG. 12A and FIG. 12B, a TCU body having an e-call backup antenna embedded therein may be attached to the bottom of a metal or carbon roof of a vehicle. Meanwhile, measurement criteria of the antenna radiation pattern by the backup antenna BUA may be evaluated by an antenna gain at 60 to 90 degrees with respect to the bottom of the roof.

Referring to FIGS. 5B to 11A and FIGS. 12A and 12B, the antenna system 1000 may be disposed on the bottom of the roof of the vehicle. The telematics unit 1000 formed by the bottom cover 1310 and the top cover 1320 may be disposed on the bottom of the roof of the vehicle. A radiator may be configured with the antenna element 1210*a*, 1210*b* and the metal plate 1311 on which the slot region SR1, SR2 is formed. Accordingly, the radiator of the ground boosting structure can radiate signals in a horizontal direction and a downward direction with respect to the roof of the vehicle.

Meanwhile, the antenna system may further include an antenna structure 1500 configured such that at least a portion thereof is exposed to the top of the roof of the vehicle. The antenna structure 1500 may be configured to be coupled with the top cover, and a signal received through an antenna in the antenna structure 1500 may be conveyed to the telematics unit 1000 on the bottom of the roof. The signal received through the antenna in the antenna structure 1500 may be transferred to the antenna substrate 1100 or the PCB 1200 in the telematics unit 1000. The signal received through the antenna in the antenna structure 1500 may be transferred to the NAD 1400 disposed on the PCB 1200.

Figure 12C:
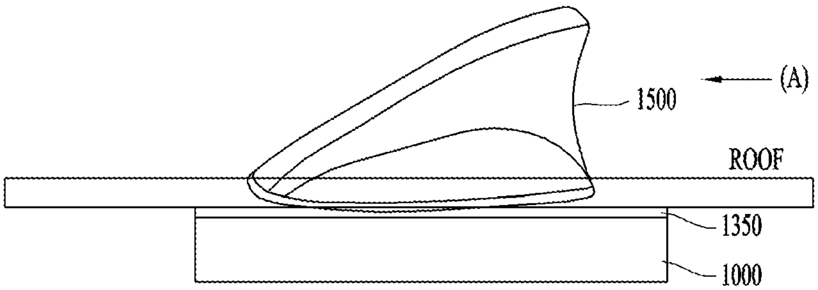
FIG. 12C is a view illustrating a configuration in which a plurality of antenna structures according to the present disclosure are disposed on top and bottom of a roof of a vehicle.
Figure 12C:
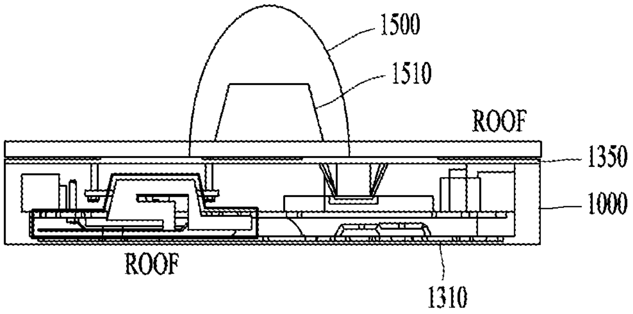

As described above, apart from the antenna system 1000 disposed on the bottom of the roof of the vehicle according to the present disclosure, the antenna structure 1500 may be disposed such that at least a portion thereof protrudes to the top of the roof of the vehicle. In this regard, FIG. 12C is a view illustrating a configuration in which a plurality of antenna structures according to the present disclosure are disposed on top and bottom of a roof of a vehicle. (a) of FIG. 12C is a first side view illustrating the antenna system 1000 disposed on the bottom of the roof of the vehicle and the antenna structure 1500 disposed on the top of the roof of the vehicle. (b) of FIG. 12C is a second side view (rear side view) illustrating the antenna system 1000 disposed on the bottom of the roof of the vehicle and the antenna structure 1500 disposed on the top of the roof of the vehicle. That is, (b) of FIG. 12C is the second side view (rear side view) illustrating the antenna system 1000 and the antenna structure 1500 in a direction A of (a) of FIG. 12C.

Referring to (a) and (b) of FIG. 12C, a metal sheet 1350 may be disposed between the roof of the vehicle and the top cover of the antenna system 1000 to improve antenna efficiency. Referring to (b) of FIG. 12C, the backup antenna (BUA) may be disposed. The backup antenna (BUA) may be configured to perform an emergency call (e-call) and may include the first type or second type antenna element 1210*a*, 1210*b* of FIGS. 6A to 7B. Or, as illustrated in (b) of FIG. 12C, the backup antenna BUA may be configured as an antenna element 1210*c* that is disposed on the side area to be explained in FIGS. 16A and 16B.

Referring to (b) of FIG. 12C, an antenna support part 1510 may be disposed within the antenna structure 1500. The antenna support part 1510 may be formed in a polyhedral shape, and an antenna substrate may be disposed on each side. A plurality of array antennas may be disposed on the antenna substrate disposed on each side to perform beamforming in the mmWave band. In addition, the MIMO operation may be performed by simultaneous beamforming of the plurality of array antennas.

On the other hand, other antennas operating in other bands, such as the LTE band and the 5G SUB6 band, may be disposed on the antenna support part 1510. As another example, the other antennas operating in the other bands may be disposed on at least one of a front area, a rear area, and a side area adjacent to the antenna support part 1510.

Meanwhile, the antenna disposed on the bottom of the roof of the vehicle according to the present disclosure may have a risk of reduction in antenna efficiency due to the roof made of a metallic material. To overcome the antenna efficiency reduction issue, the metal sheet 1350 may be disposed on the bottom of the roof. In this regard, FIG. 13 illustrates a principle that antenna efficiency is reduced by a current induced on a vehicle roof, and a principle that the antenna efficiency is improved by a metal sheet disposed on a bottom of the vehicle roof.

Figure 14:
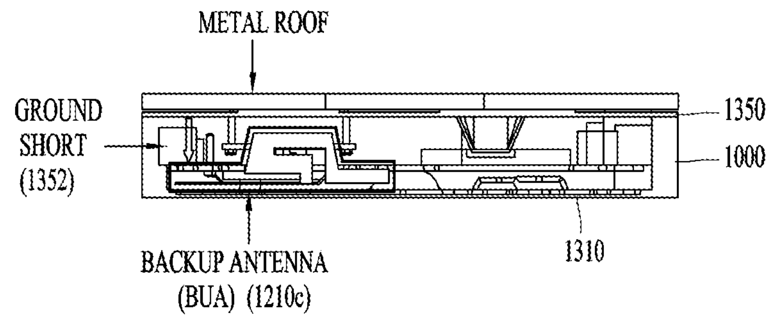
FIG. 14 illustrates lateral and front views of a disposition structure of a metal sheet and a BUA antenna disposed on a bottom of a vehicle roof according to the present disclosure.
Figure 14:
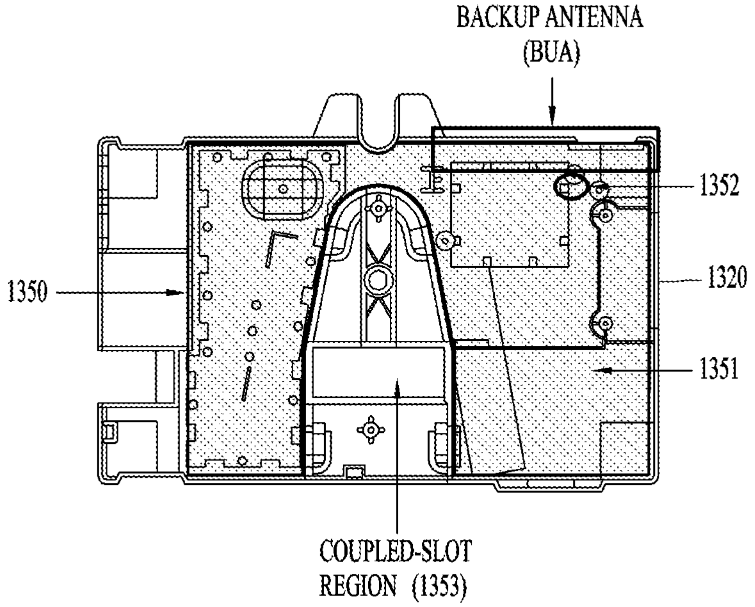

On the other hand, FIG. 14 illustrates lateral and front views of a disposition structure of a metal sheet and a BUA antenna disposed on a bottom of a vehicle roof according to the present disclosure. (a) of FIG. 14 illustrates the lateral view of the disposition structure of the metal sheet and the BUA antenna disposed on the bottom of the vehicle roof. (b) of FIG. 14 illustrates the front view of the disposition structure of the metal sheet and the BUA antenna disposed on the bottom of the vehicle roof.

Figure 13:
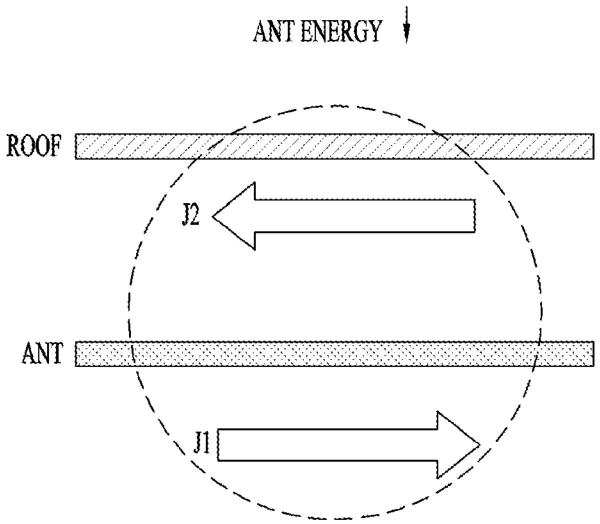
FIG. 13 illustrates a principle that antenna efficiency is reduced by a current induced on a vehicle roof, and a principle that the antenna efficiency is improved by a metal sheet disposed on a bottom of the vehicle roof.
Figure 13:
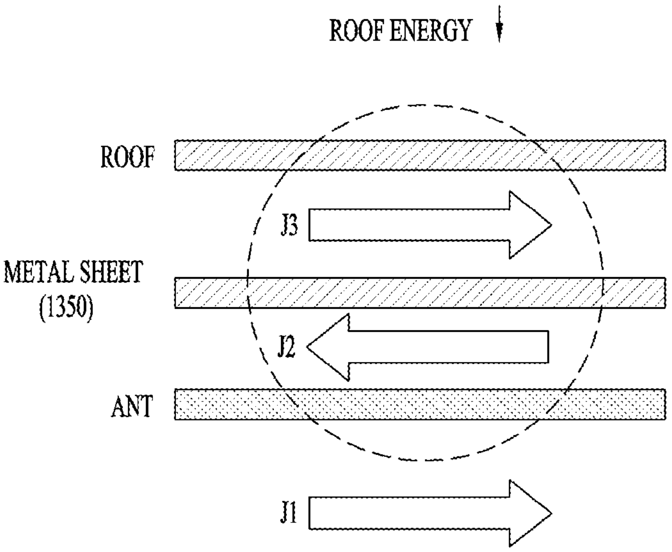

Referring to FIGS. 13 and 14, the present disclosure is to propose a structure for suppressing antenna performance deterioration due to a metal roof when the antenna system (module) 1000 is mounted on the vehicle. In this regard, the backup antenna (BUA) 1210*c* for e-call of the vehicle is configured to make an emergency call in an emergency environment, such as damage of a shark fin antenna, due to an external affection like a collision of the vehicle, and the like. A backup antenna may be disposed in a narrow space inside a TCU, an antenna performance deterioration may severely occur due to an affection by a ground of the metal roof of the vehicle when mounting an antenna system on the vehicle. Therefore, the present disclosure proposes an antenna structure for suppressing an antenna performance deterioration due to an affection by a metal roof. To this end, call performance upon an emergency can be improved by suppressing an antenna performance deterioration by partially changing a ground structure of a TCU through an antenna structure according to an embodiment of the present disclosure.

Figure 15:
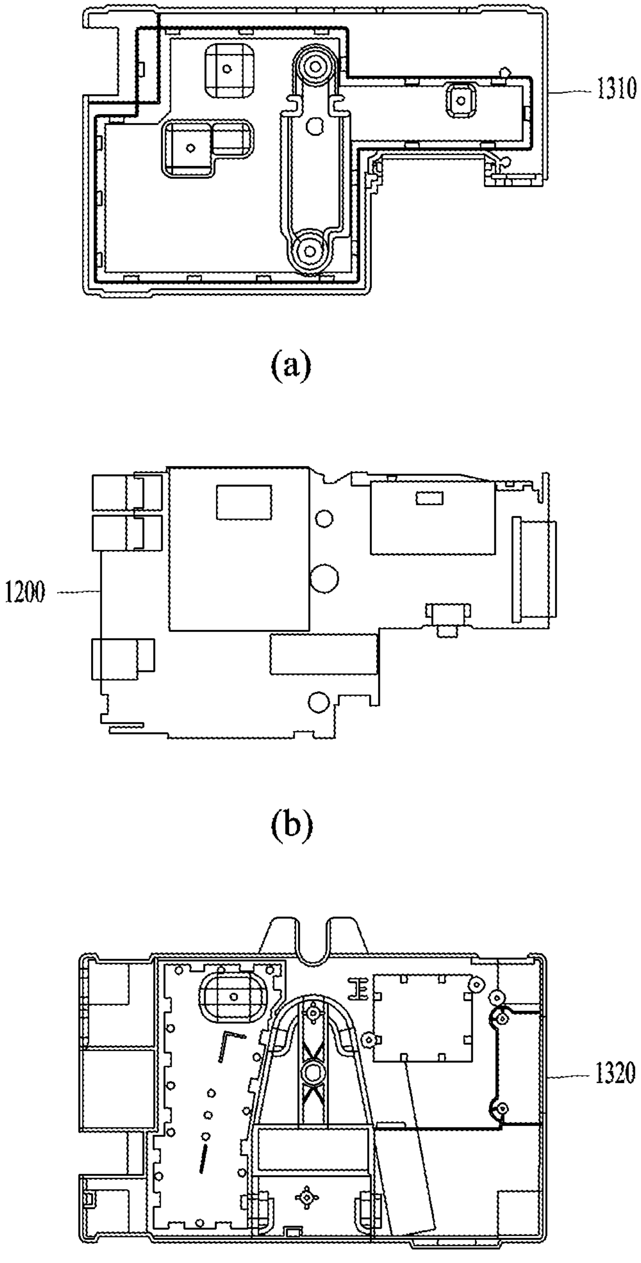
FIG. 15 illustrates each component of the metal sheet antenna structure of FIG. 14.

FIG. 15 illustrates each component of the metal sheet antenna structure of FIG. 14. (a) of FIG. 15 illustrates a metal sheet antenna structure, namely, the bottom cover 1310 of the telematics unit 1000. (b) of FIG. 15 illustrates the PCB 1200 disposed inside the telematics unit 1000. (c) of FIG. 15 illustrates the top cover 1320 to which the metal sheet is to be attached.

The bottom cover 1310 of (a) of FIG. 15 may alternatively be replaced with the bottom cover having the slot region SR1, SR3 of FIGS. 6A and 7B, so as to operate as the ground boosting antenna. Accordingly, the bottom cover 1310 may have the slot region SR1, SR2 in a region corresponding to a region where the antenna element 1210*c* is disposed. Meanwhile, the antenna element 1210*c* and the metal plate 1311 on which the slot region SR1, SR2 is formed may operate as a radiator.

Referring to FIGS. 13 to 15, the antenna system mounted on the vehicle may be implemented as the telematics module 1000. The telematics module 1000 may include the PCB 1200, the bottom cover 1320, the top cover 1350, and the metal sheet 1350.

The PCB 1200 may have electronic components thereon and may be electrically connected to the antenna element 1210*c*. Referring to FIGS. 6A to 12B, the PCB 1200 may be connected to the antenna element 1210*a*, 1210*b* through the feed connection portion and the ground connection portion.

Referring to (b) of FIG. 13, the metal sheet 1350 may be disposed in a space between the vehicle roof and the antenna. In detail, referring to (a) of FIG. 14, the metal sheet 1350 may be attached to an inner surface of the roof of the vehicle. Therefore, the metal sheet 1350 may be attached on a rear surface of a roof structure, which has a front surface made of a metallic material.

Referring to (b) of FIG. 13 and (a) of FIG. 14, a current J1 of a first direction is generated on the antenna element ANT and a current J2 of a second direction opposite to the first direction is generated on the metal sheet 1350. Therefore, the current J2 of the second direction can be canceled with a current J3 of the first direction generated on the front surface of the roof structure.

The metal sheet 1350 according to the present disclosure may be electrically connected to at least one of a ground of a main PCB 1200 or a ground of an auxiliary (sub) PCB 1200*b*. In this regard, the metal sheet 1350 may include a planar portion 1351 and a ground connection portion 1352.

The planar portion 1351 may be attached on the top cover 1320. The ground connection portion 1352 may be connected to the ground of the PCB 1200 (or the sub PCB 1200*b*) at one point of the planar portion 1351. The ground connection portion 1352 may be disposed at an inner side of the PCB 1200 with a predetermined gap from the antenna element 1210*c* disposed at an outer side of the PCB 1200.

Figure 16A:
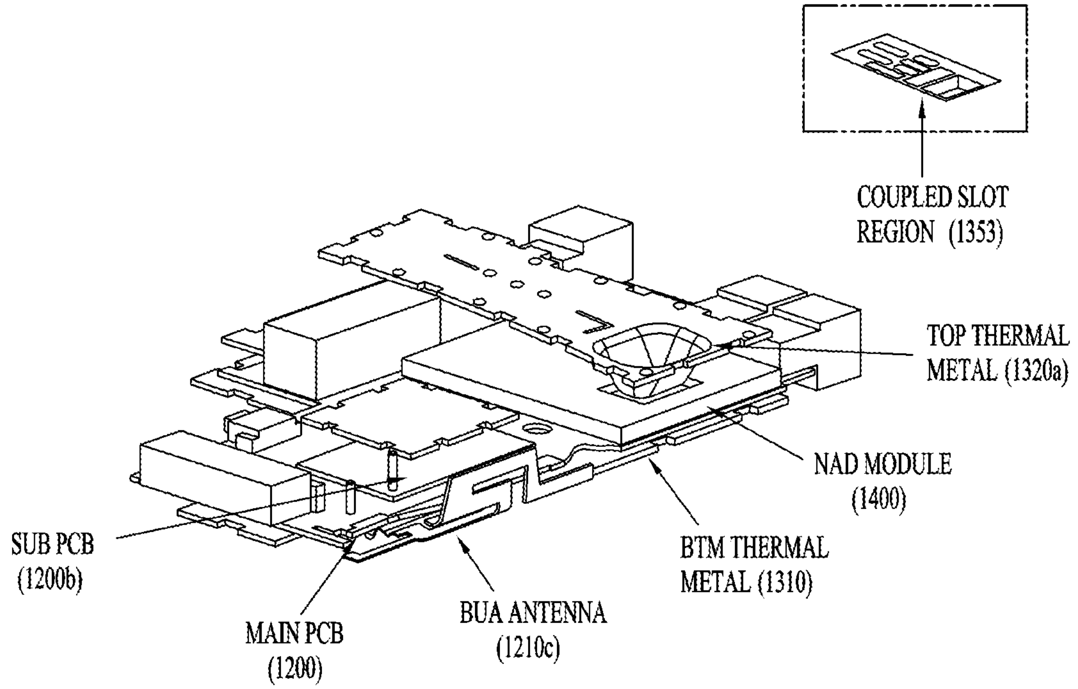
FIGS. 16A and 16B are a lateral perspective view illustrating an internal configuration of a telematics unit having electronic components disposed thereon, and a detailed view illustrating a configuration of an antenna element.
Figure 16B:
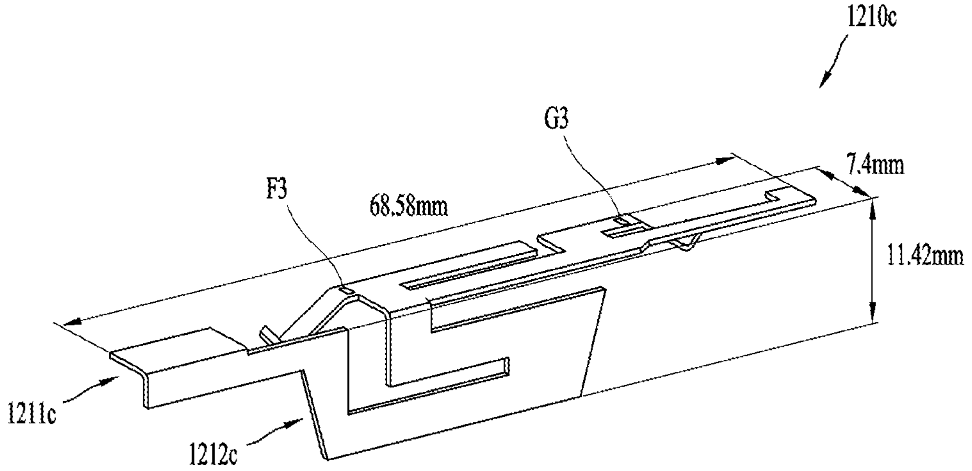

In the meantime, FIGS. 16A and 16B are a lateral perspective view illustrating an internal configuration of a telematics unit having electronic components, and a detailed view illustrating a configuration of an antenna element. Referring to FIG. 16A, the antenna system implemented as the telematics unit 1000 may include the antenna element 1210*c* corresponding to the backup antenna, the main PCB 1200, and the bottom cover 1310. Also, the antenna system implemented as the telematics unit 1000 may further include the sub PCB 1200*b*, the NAD 1400 disposed on the main PCB 1200, and an upper metal structure 1320*a*.

The upper metal structure 1320*a* may be referred to as a top thermal metal structure, and the bottom cover 1310 may be referred to as a bottom thermal metal structure. Heat generated by various components including the NAD 1400 can be effectively discharged to the outside of the telematics unit 1000 by virtue of a heat sink structure constituted by the top thermal metal structure and the bottom thermal metal structure. The heat discharged to the outside of the telematics unit 1000 can be effectively discharged to the outside of the vehicle through the vehicle roof made of the metallic material via the metal sheet 1350.

Referring to FIGS. 13 to 16B, the antenna element 1210*c* may be electrically connected to the PCB 1200 through the planar portion 1211*c*. One point of the planar portion 1211*c* may be configured as a feed connection portion F3, and another point of the planar portion 1211*c* may be configured as a ground connection portion G3. Depending on applications, the positions of the feed connection portion F3 and the ground connection portion G3 may change. The antenna element 1210*c* may be disposed between the PCB 1200 and the metal sheet 1350 attached on the top cover 1320. Also, the antenna element 1210*c* may be disposed to be substantially perpendicular to the PCB 1200, to be configured as a conductive pattern 1212*c* on the side area of the PCB 1200. The antenna element 1210*c* may be configured as a conductive pattern having a bent structure to be disposed in a limited region as illustrated in (a) of FIG. 14.

Figure 17A:
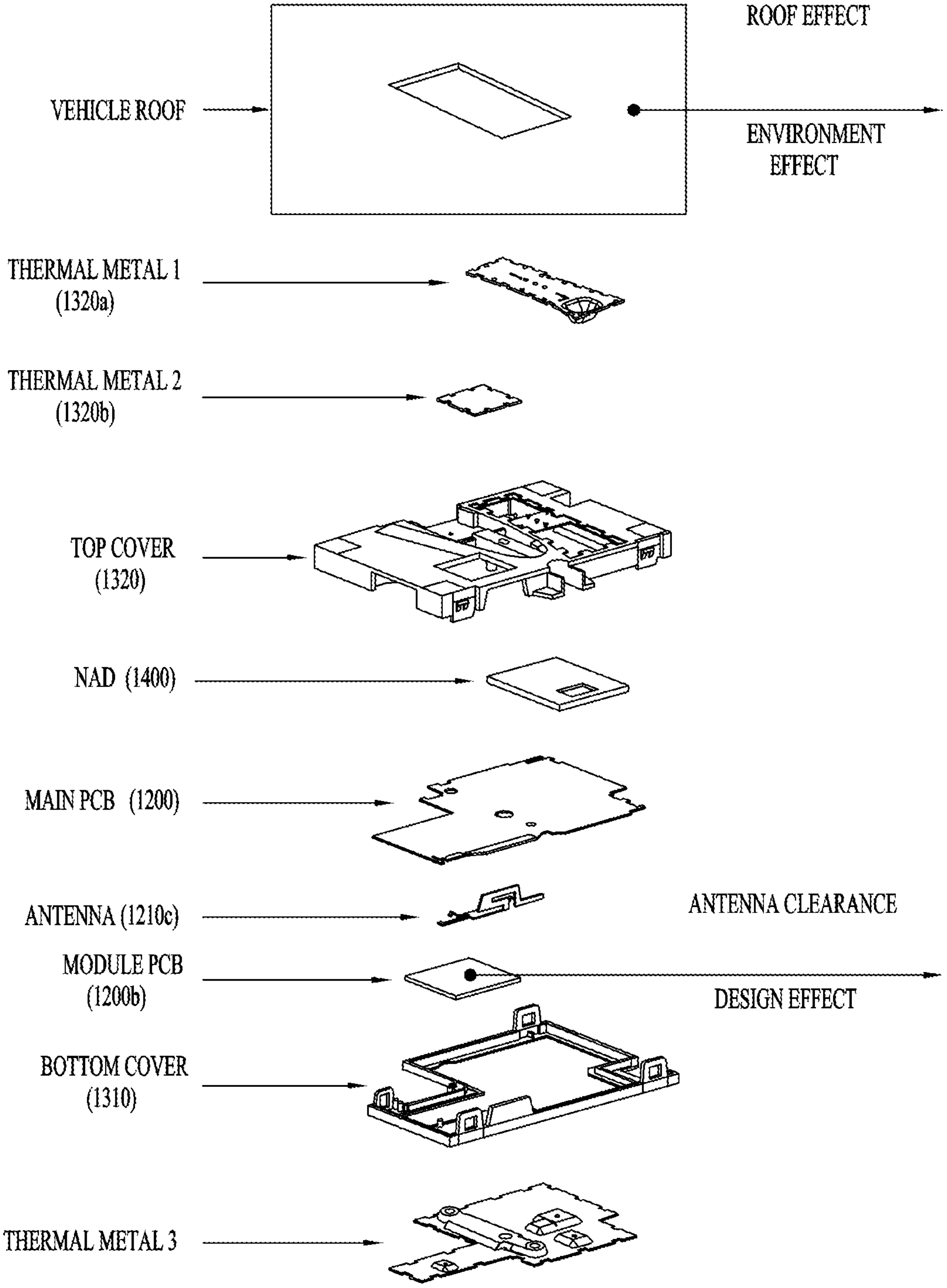
FIG. 17A is an exploded perspective view illustrating each configuration disposed in a telematics unit according to the present disclosure.
Figure 17B:
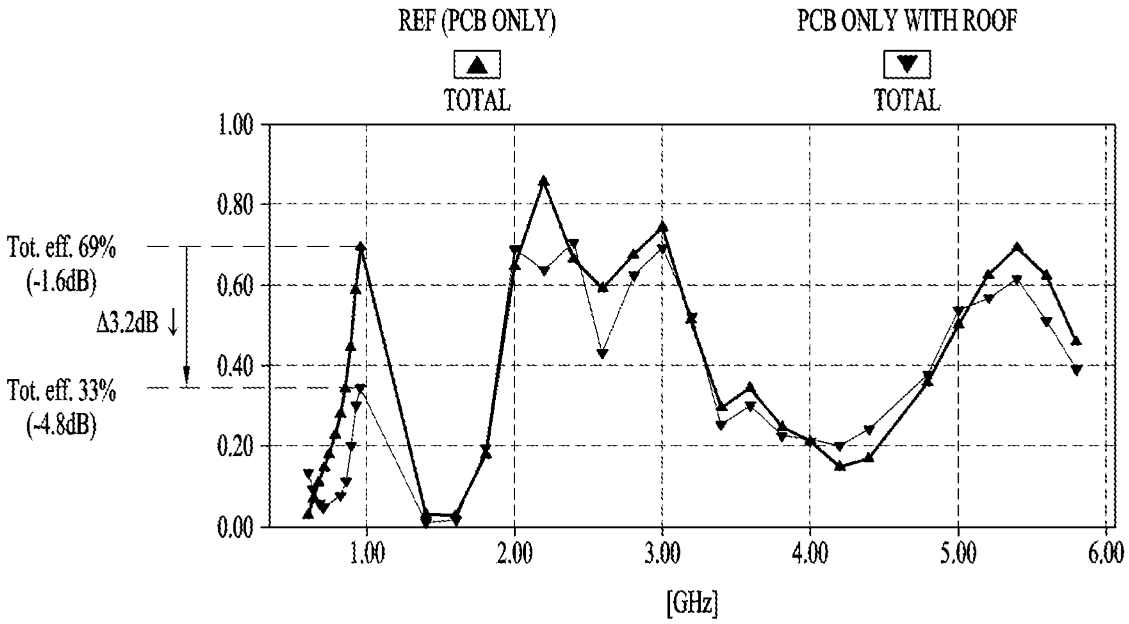
FIG. 17B is a graph showing changes in antenna characteristics according to a vehicle roof and antenna tolerance.
Figure 17B:
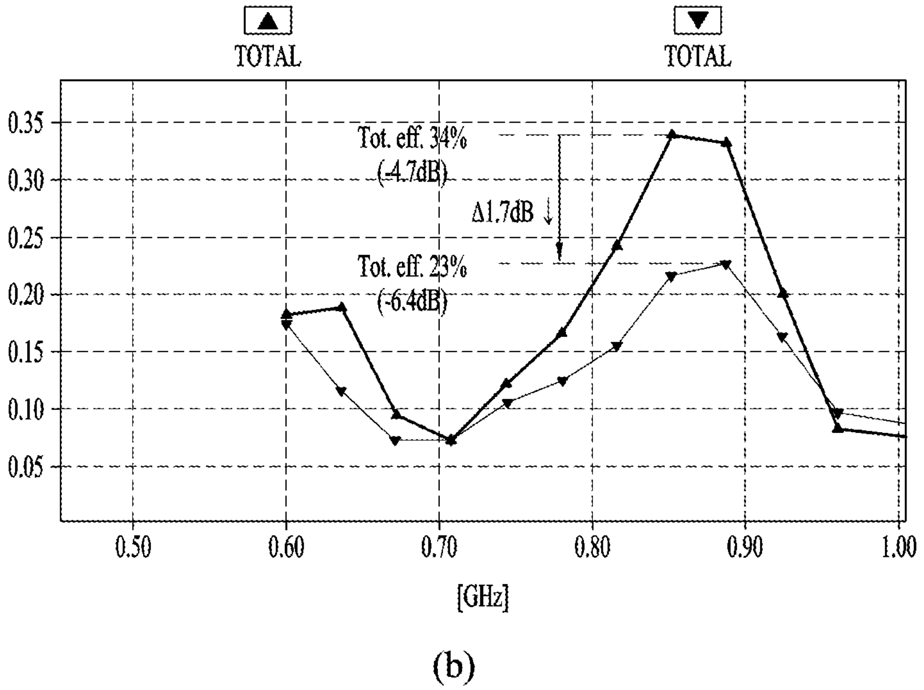

FIG. 17A is an exploded perspective view illustrating each configuration disposed in a telematics unit according to the present disclosure. FIG. 17B is a graph showing changes in antenna characteristics according to a vehicle roof and antenna tolerance.

Referring to FIGS. 13 to 17, the PCB 1200 may have electronic components thereon and may be electrically connected to the antenna element 1210*c*. The antenna element disposed on the PCB 1200 may alternatively be replaced with the antenna element 1210*a*, 1210*b* of FIGS. 6A to 12B. The bottom cover 1310 may be disposed below the PCB 1200 and may be configured as a metal plate. The top cover 1320 may be fastened to the bottom cover 1310 to accommodate the PCB 1200 therein. The metal sheet 1350 may be attached on the top cover 1350 to improve radiation efficiency of a signal radiated from the antenna element 1210*c*. To this end, the metal sheet 1350 may be disposed beneath the roof of the vehicle.

Referring to FIG. 17A, antenna performance of the backup antenna (BUA) for a vehicle may be deteriorated due to the roof of the vehicle made of a metallic material. The antenna performance may also be deteriorated due to antenna clearance according to the disposition of the backup antenna (BUA). In this regard, FIG. 17B illustrates comparison results of antenna efficiencies according to the vehicle roof made of the metallic material and the antenna clearance. (a) of FIG. 17B illustrates antenna efficiencies for each frequency before and after attaching the metallic vehicle roof. On the other hand, (b) of FIG. 17B illustrates antenna efficiencies for each frequency according to an occurrence of antenna clearance.

Referring to FIG. 17B, the antenna efficiency deterioration at LB, e.g., a frequency of about 0.85 GHz will be described as follows. As one example, total efficiency by the metallic roof of the vehicle may be lowered from about 69% (−1.6 dB) down to about 33% (−4.8 dB). Therefore, about 3.2 dB of total efficiency, namely, 50% or more of antenna efficiency can be lowered by the metallic roof of the vehicle. On the other hand, efficiency may be lowered by the antenna clearance from about 34% (−4.7 dB) to about 22.7% (−6.4 dB).

Figures 18A, 18B:
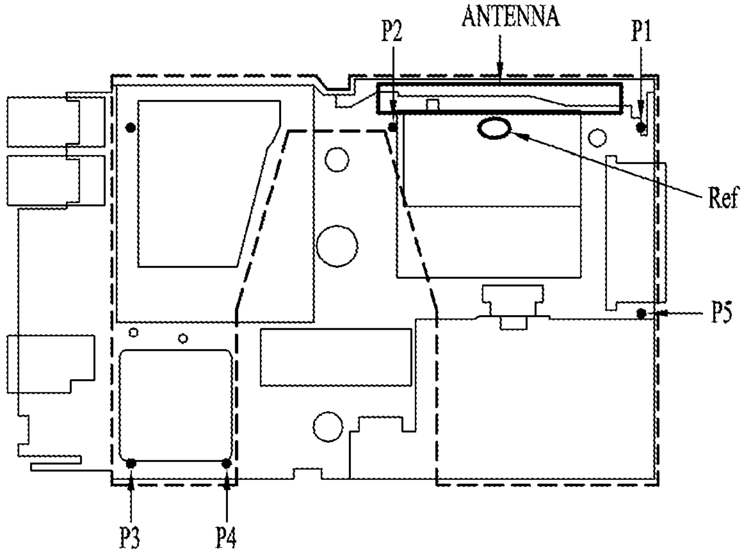
FIG. 18A is a view illustrating positions where ground connection portions are to be disposed. On the other hand, FIG. 18B compares total efficiency according to a change in position of the ground connection portion.

In the antenna system according to the present disclosure, the ground connection portion 1352 of the metal sheet 1350 may be disposed at the inner side of the PCB 1200 with a predetermined gap from the antenna element 1210*c* disposed at the outer side of the PCB 1200. In this regard, FIG. 18A is a view illustrating a position where a ground connection portion is to be disposed. On the other hand, FIG. 18B compares total efficiency according to a change in position of the ground connection portion.

Referring to FIGS. 14 to 18A, one of different points P1 to P5, in addition to a reference point Ref, may be selected as the position of the ground connection portion 1352. The reference point Ref of the ground connection portion 1352 is selected within a predetermined gap inward from the antenna element 1210*c*, which is disposed on the outer side of the PCB 1200. In the meantime, a first point P1 and a second point P2 may be selected as one end portion and another end portion of the antenna element 1210*c*. The third point P3 and the fourth point P4 may be selected as a lower point of an area (left area) of the metal sheet 1350 where the antenna element 1210*c* is not disposed. A fifth point P5 may be selected as a center point of an area (right area) of the metal sheet 1350 where the antenna element 1210*c* is disposed.

Referring to FIG. 18B, the highest antenna efficiency is obtained when the ground connection portion is disposed on the reference point Ref. On the other hand, when the ground connection portion is disposed on one of the points P1 to P5, the antenna efficiency is lowered by about 1.8 to 4.8 dB, compared to the case where the ground connection portion is disposed on the reference point Ref.

Figure 19:
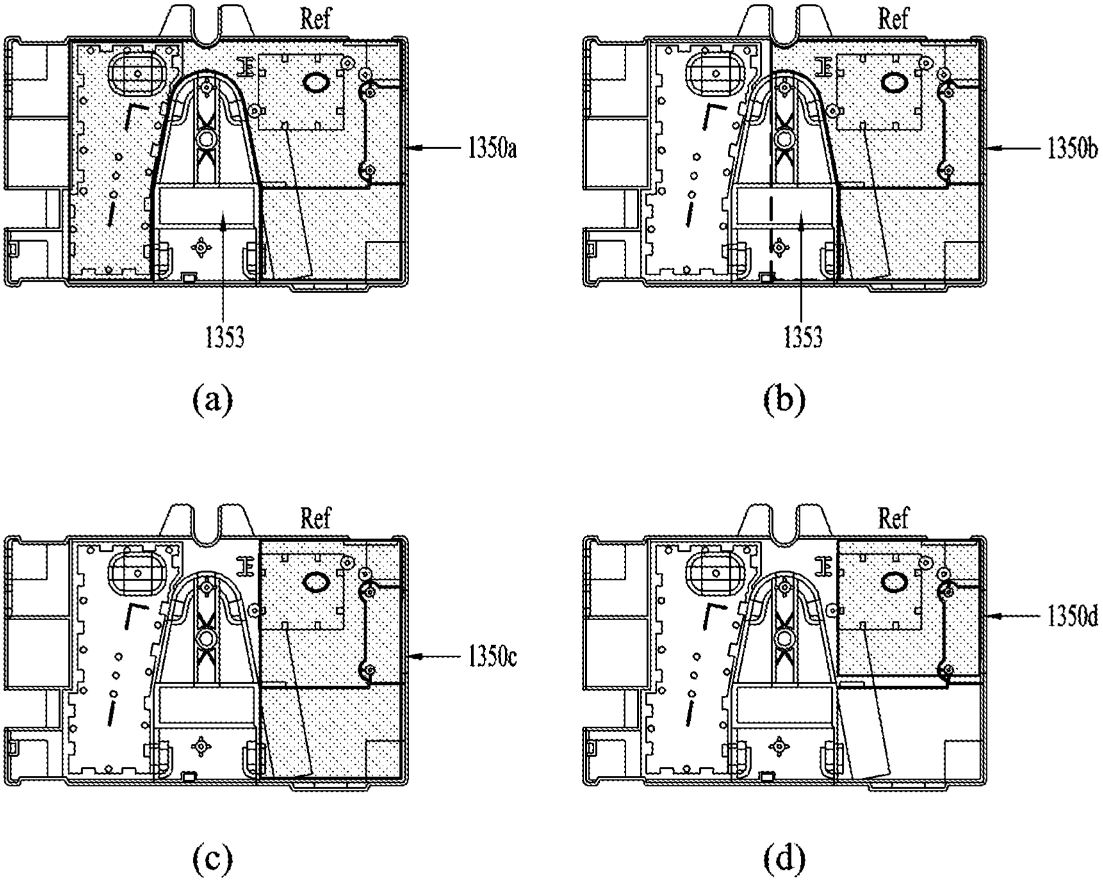
FIG. 19 is an exemplary view illustrating different positions and sizes that the metal sheet is disposed according to various embodiments. On the other hand.
Figure 20:
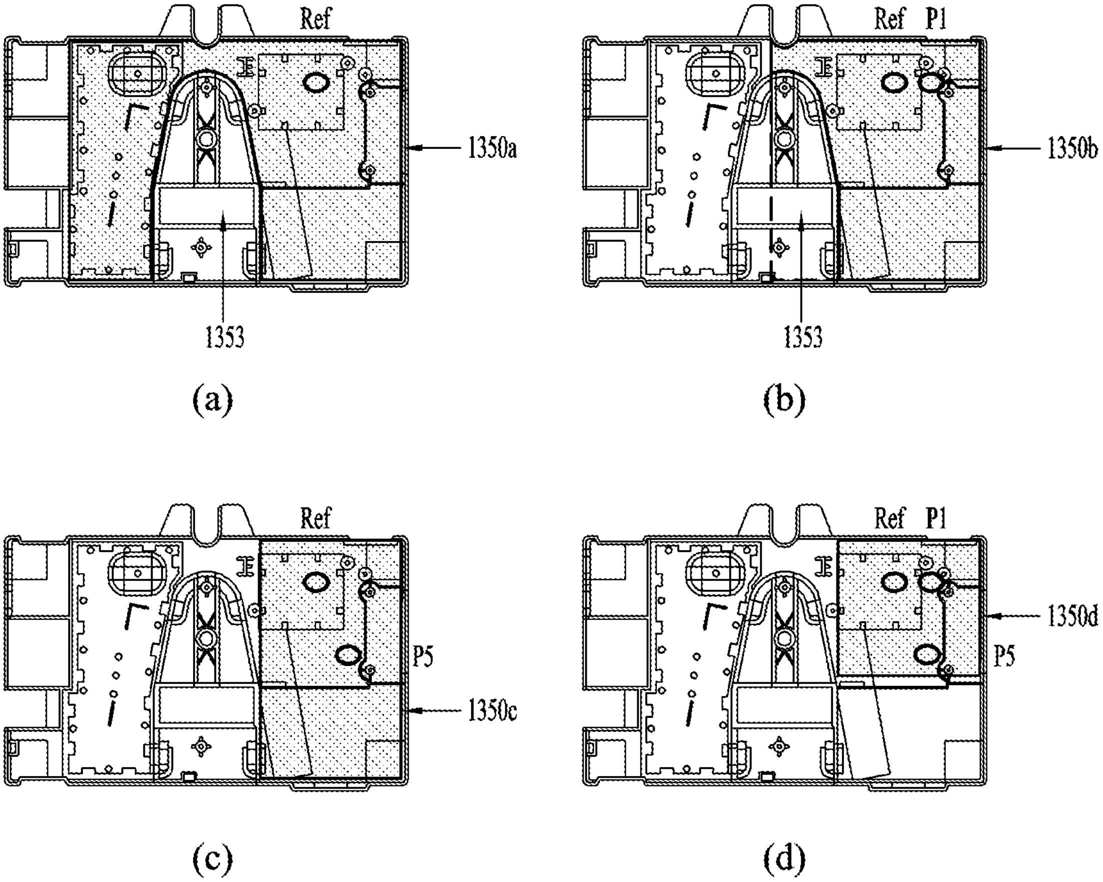
FIG. 20 is an exemplary view illustrating the number of ground connection portions and connection positions according to various embodiments.

The disposition of the metal sheet 1350 in the antenna system according to the present disclosure may vary differently. Also, the disposed position of the ground connection portion 1352 and the number of ground connection portions 1352 in the antenna system according to the present disclosure may vary differently. In this regard, FIG. 19 is an exemplary view illustrating different positions and sizes that the metal sheet is disposed according to various embodiments. On the other hand, FIG. 20 is an exemplary view illustrating the number of ground connection portions and connection positions according to various embodiments.

Hereinafter, the shape and disposition of the metal sheet according to various embodiments will be described with reference to FIGS. 17A, 18A, and 19. (a) of FIG. 19 illustrates that an outer side of the metal sheet 1350 is formed in a rectangular shape to correspond to the shape of the top cover 1320. On the other hand, a coupling slot 1353 may be formed in an inner side of the metal sheet 1350 such that the metal sheet 1350 is coupled to a separate antenna structure. (b) of FIG. 19 illustrates that an outer side of the metal sheet 1350*b* is formed in a rectangular shape to correspond to a shape of one side of the top cover 1320. Therefore, the metal sheet may be configured not to be disposed on another side of the top cover 1320. On the other hand, a coupling slot 1353*b* may be formed in the inner side of the metal sheet 1350*b* such that the metal sheet 1350 is coupled to a separate antenna structure.

(c) and (d) of FIG. 19 illustrates a configuration in which the metal sheet 1350*c*, 1350*d* is disposed on one side of the top cover 1320 and is not disposed in a coupling slot region where a separate antenna structure is disposed. Referring to (c) of FIG. 19, the metal sheet 1350*c* may be disposed to cover upper and lower portions of the one side of the top cover 1320. Referring to (d) of FIG. 19, the metal sheet 1350*c* may be disposed to cover one of the upper and lower portions of the one side of the top cover 1320.

Referring to FIGS. 17A and 18A and (a) to (d) of FIG. 19, the metal sheet 1350 may be disposed such that one side of the planar portion 1351 overlaps the antenna element (BUA) in the length direction of the antenna element (BUA). In the meantime, an antenna structure (the antenna structure 1500 of FIG. 12B) may be disposed on the top of the roof of the vehicle to be coupled to the antenna system. To this end, the metal sheet 1350 has a slot region 1353 from which a metal region is removed.

Referring to FIGS. 17A and 18A and (a) to (d) of FIG. 19, the ground connection portion 1352 may be disposed with being spaced apart a predetermined gap inward from an area, in which the backup antenna is disposed, along a first axial direction. Also, the ground connection portion 1352 may be disposed to be spaced apart a predetermined gap from a center line of an area, in which the backup antenna 1352 is disposed, along a second axial direction. Therefore, when only one ground connection portion 1352 is disposed, the ground connection portion 1352 is disposed on the reference point Ref of FIG. 18A.

Hereinafter, the shape and disposition of the metal sheet according to various embodiments will be described with reference to FIGS. 17A, 18A, 19, and 20. (a) of FIG. 20 illustrates a configuration in which the one ground connection portion is connected at the reference point Ref. (b) of FIG. 20 illustrates that two ground connection portions are connected at the reference point Ref and the first point P1 along a first axis. (b) of FIG. 20 illustrates that two ground connection portions are connected at the reference point Ref and the fifth point P5 along a second axis. (d) of FIG. 20 illustrates that three ground connection portions are connected at the reference point Ref, the first point P1, and the fifth point P5 along the first axis and the second axis.

Referring to FIGS. 17A, 18A, 19, and 20, when the ground connection portion 1352 is connected at the reference point Ref, the change in antenna characteristics may be ignorable even if it is connected at another point. Therefore, even if the one ground connection portion 1352 is disposed on the reference point Ref, the antenna efficiency characteristic can be optimized. However, a plurality of ground connection portions may be disposed for mechanical stability of the antenna system and DC ground characteristics. In this regard, the antenna efficiency and optimized characteristics of a resonance frequency are maintained even if the ground connection portions 1352 are disposed on the first point P1 and/or the fifth point P5 along the first axis and/or the second axis. However, when the ground connection portions 1352 are disposed on different points, for example, P2, P3, and P4, the antenna resonance frequency may change and antenna efficiency characteristic may be lowered at LB and MB.

Figure 21A:
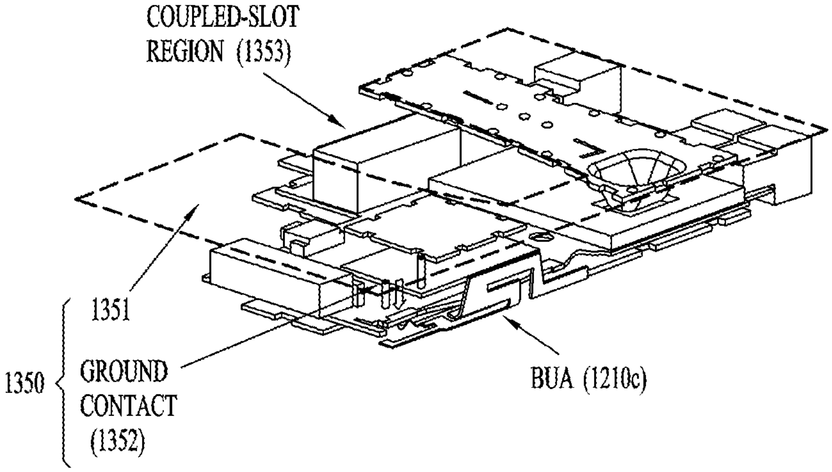
FIG. 21A illustrates a perspective view and a lateral view of a configuration in which a metal sheet 1350 is disposed on an upper portion of an antenna system.
Figure 21A:
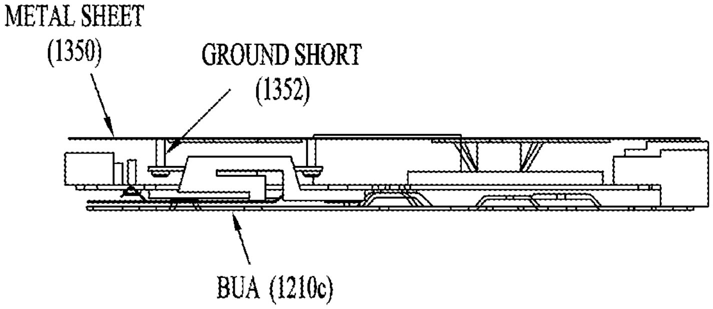
Figure 21B:
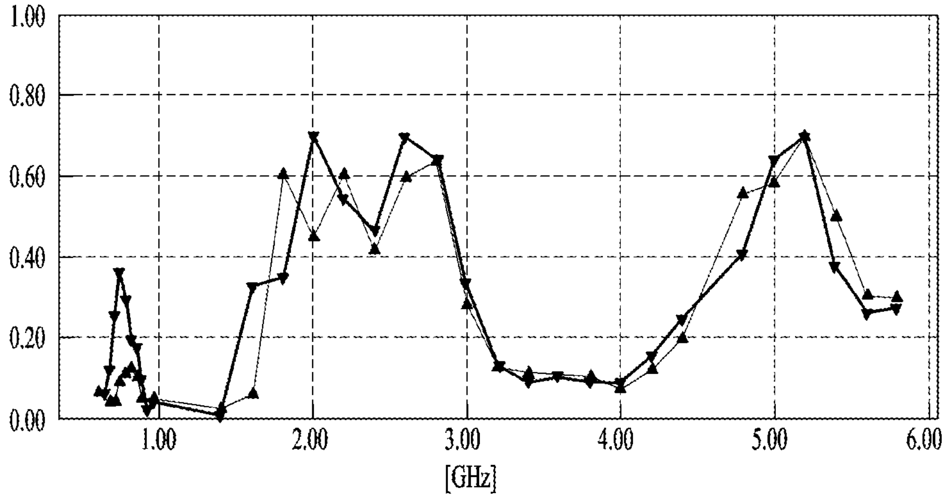
FIG. 21B illustrates antenna efficiencies at a total band and a low band (LB) before and after applying a metal sheet and a ground connection portion.
Figure 21B:
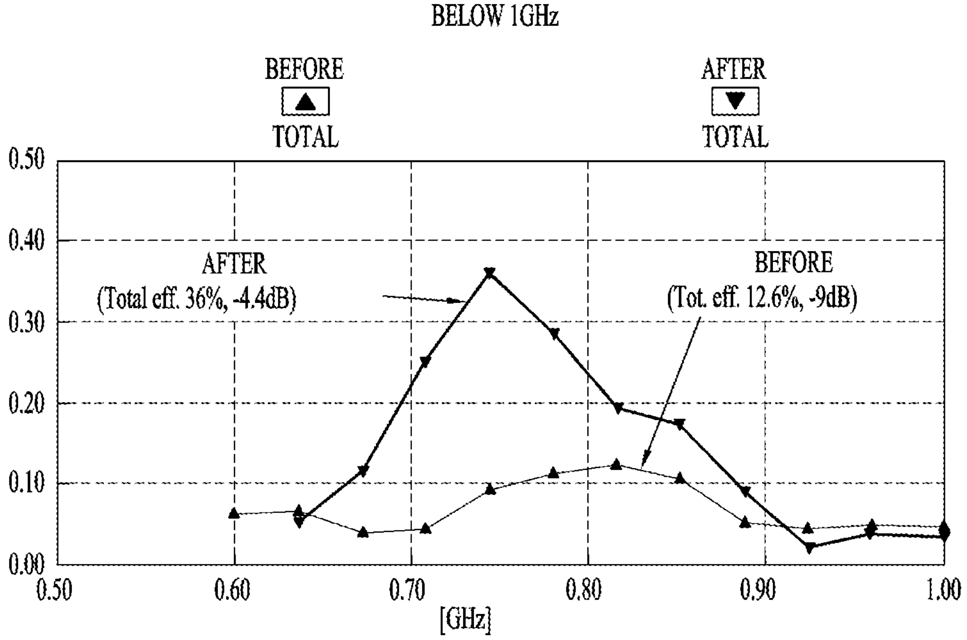

In the antenna system for the vehicle according to the present disclosure, the metal sheet 1350 may be attached and a ground connection may be achieved through the ground connection portion 1352, which can improve antenna efficiency. In this regard, FIG. 21A illustrates a perspective view and a lateral view of a configuration in which the metal sheet 1350 is disposed on an upper portion of the antenna system. FIG. 21B illustrates antenna efficiencies at a total band and a low band (LB) before and after applying the metal sheet and the ground connection portion.

Referring to (a) and (b) of FIG. 21A, the metal sheet 1350 may include a planar portion 1351 and a ground connection portion 1352. The ground connection portion 1352 may be electrically connected to the ground of the sub PCB 1200*b* disposed adjacent to the metal sheet 1350. Referring to (a) and (b) of FIG. 21B, it can be seen that antenna efficiency has been improved by about 4.6 dB at LB after attaching the metal sheet 1350 and connecting the ground connection portion 1352.

Referring to FIGS. 5A to 21A, the backup antenna (BUA) using the antenna element 1210*a*, 1210*b*, 1210*ca* disclosed in the present disclosure may vary in various ways depending on applications. The slot region SR1, SR2 may be formed in the bottom cover 1310 and coupled to the antenna element 1210*a*, 1210*b*, 1210*c*, to operate as a ground boosting antenna. Also, as illustrated in FIG. 8C, the backup antenna (BUA) may operate at the same time with at least one of MIMO antennas ANT1 to ANT4 that operate at LTE/Sub6 band. As another example, the backup antenna (BUA) may operate as an auxiliary antenna when the MIMO antennas ANT1 to ANT4 do not operate. It will be clearly understood by those skilled in the art that various changes and modifications to the aforementioned embodiments related to the antenna system are made without departing from the idea and scope of the present disclosure. Therefore, it should be understood that such various modifications and alternations for the implementations fall within the scope of the appended claims.

Figure 22A:
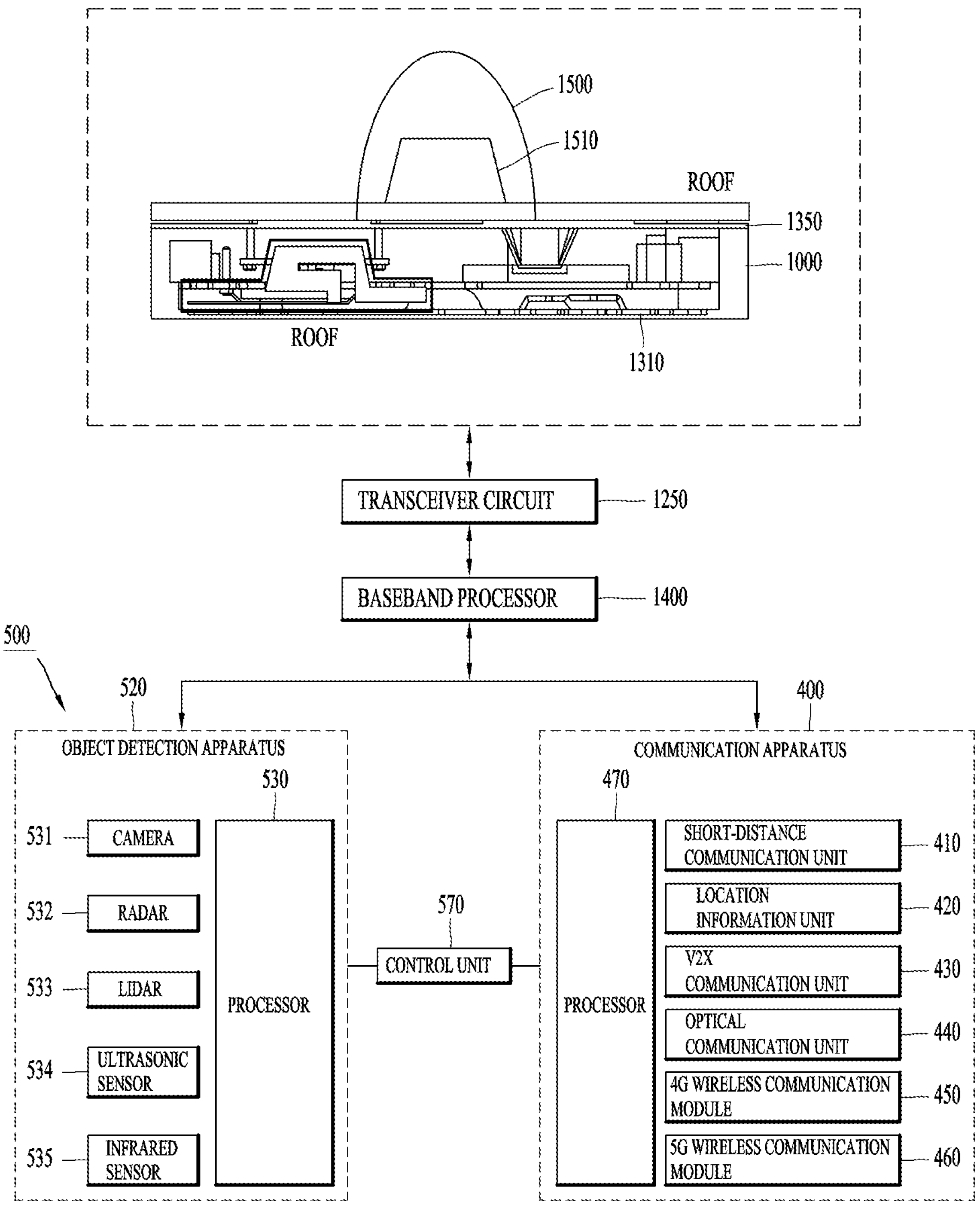
FIGS. 22A and 22B are views illustrating configurations of an antenna system according to an embodiment and a vehicle on which the antenna system is mounted.
Figure 22B:
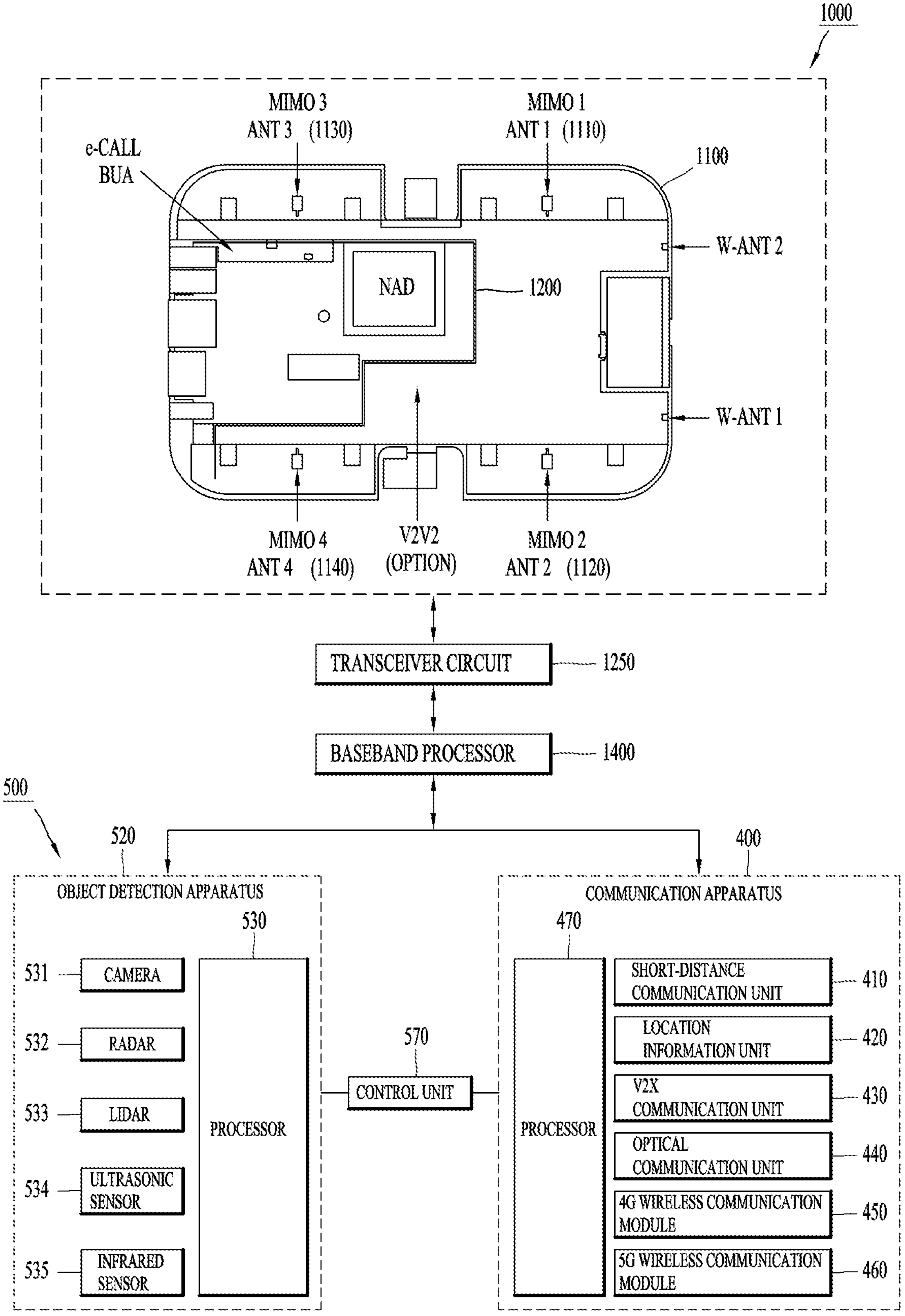

Meanwhile, FIGS. 22A and 22B are views illustrating configurations of an antenna system according to an embodiment and a vehicle on which the antenna system is mounted. FIG. 22A is a diagram illustrating a configuration including an antenna system in which a plurality of antenna structures are disposed on top and bottom of a roof of the vehicle and the vehicle on which the antenna system is mounted. FIG. 22B is a diagram illustrating the vehicle performing communication using antennas disposed inside the antenna system disposed on the bottom of the roof of the vehicle.

Referring to FIGS. 22A and 22B, the broadband antenna system 1000 may be mounted on a vehicle. The antenna system may perform short-range communication, wireless communication, V2X communication, and the like by itself or through the communication apparatus 400. To this end, the baseband processor 1400 may perform control such that a signal is received from or transmitted to the adjacent vehicle, the RSU, and the base station through the antenna system 1000.

Alternatively, the baseband processor 1400 may perform control such that a signal is received from or transmitted to the adjacent vehicle, the RSU, the adjacent object, and the base station through the communication apparatus 400. Here, the information related to adjacent objects may be acquired through the object detecting apparatus such as the camera 531, the radar 532, the LiDar 533, and the sensors 534 and 535 of the vehicle 300. Alternatively, the baseband processor 1400 may control the communication device 400 and the antenna system 1000 such that a signal is received from or transmitted to the adjacent vehicle, the RSU, the adjacent object, and the base station.

Meanwhile, referring to FIGS. 1A to 22B, the vehicle 500 having the antenna system 1000 may include the plurality of antennas 1100, the transceiver circuit 1250, and the baseband processor 1400. The vehicle 500 may further include the object detecting apparatus 520. The vehicle 500 may further include the communication apparatus 400. Here, the communication apparatus 400 may be configured to perform wireless communication through the antenna unit.

In this regard, the vehicle 500 may be provided with the antenna system 1000. Referring to FIG. 23A, the vehicle 500 may include a plurality of antenna systems 1000 and 1500. A first antenna system (module) 1000 may be disposed on the bottom of the roof of the vehicle, and a second antenna system (module) 1500 may be disposed on the top of the roof of the vehicle. Referring to FIG. 23B, the MIMO operation may be performed through the antenna system 1000 corresponding to one antenna system (unit, module).

Referring to FIGS. 1A to 22B, the first antenna system (module) 1000 and the second antenna system (module) 1500 may be referred to as the telematics module 1000 and the antenna structure 1500, respectively. The telematics module 1000 may be disposed on the bottom of the roof of the vehicle, and perform communication with at least one of an adjacent vehicle, a Road Side Unit (RSU), and a base station through the processor. At least a portion of the antenna structure 1500 may be configured to be exposed to the top of the roof of the vehicle.

The telematics module 1000 may include the PCB 1200, 1200*b* the bottom cover 1310, and the top cover 1320. The PCB 1200, 1200*b* may be configured such that the antenna element and electronic components are disposed. The bottom cover 1310 may include a metal plate, which is disposed below the PCB 1200, 1200*b* and has the slot region SR, SR1, SR2 formed in a region corresponding to a region where the antenna element 1210*a*, 1210*b*, 1210*c* is disposed. The top cover 1320 may be fastened to the bottom cover 1310 to accommodate the PCB 1200, 1200*b* therein. In this regard, the antenna element 1210*a*, 1210*b*, 1210*c* and the metal plate 1311 on which the antenna element 1210*a*, 1210*b*, 1210*c* is formed may operate as a radiator.

The bottom cover 1310 may further include a metal structure 1312 that extends from an outer side of the bottom cover 1310 defining the slot region SR, SR1, SR2 and is formed at a predetermined angle with respect to the bottom cover 1310. The antenna element 1210*a*, 1210*b*, 1210*c* disposed inside the metal structure 1312 may feed a signal to the slot region SR, SR1, SR2 through the PCB 1200. Accordingly, a radiator that is configured by the antenna element 1210*a*, 1210*b*, 1210*c* and the metal plate having the slot region SR, SR1, SR2 can radiate a signal in a horizontal direction and a downward direction with respect to the roof of the vehicle.

The antenna element 1210*a*, 1210*b*, 1210*c* may include a feed connection portion F1, F2, F3 vertically formed at one point of a conductive pattern and a ground connection portion G1, G2, G2 vertically formed at another point of the conductive pattern. The feed connection portion F1, F1, F2 may be connected to a feed path of the PCB 1200, and the feed path of the PCB 1200 may be disposed in the slot region SR, SR1, SR2, such that the bottom cover 1310 can operate as a slot antenna.

The transceiver circuit 1250 may be operably coupled to the antenna element 1210*a*, 1210*b*, 1210*c*. The processor 1400 may be operably coupled to the transceiver circuit 1250. The processor 1400 may be a baseband processor corresponding to a modem, but is not limited thereto and may be any processor that controls the transceiver circuit 1250. The processor 1400 of the vehicle may be implemented as a network access device (NAD). The antenna element 1210*a*, 1210*b*, 1210*c* including the feed connection portion F1, F2, F3 and the ground connection portion G1, G2, G3 may operate as a backup antenna (BUA).

The transceiver circuit 1250 may be operably coupled to the backup antenna (BUA) and the MIMO antennas ANT1 to ANT4. The transceiver circuit 1250 may be configured to control signals transmitted to the backup antenna (BUA) through the feed connection portion F1, F2, F3. The transceiver circuit 1250 may include a front end module (FEM) such as a power amplifier or a receiving amplifier. As another example, the front end module (FEM) may be disposed between the transceiver circuit 1250 and the antenna, separately from the transceiver circuit 1250. The transceiver circuit 1250 may control the amplitude and/or phase of signals transmitted to the backup antenna (BUA) and the MIMO antennas ANT1 to ANT4 or control only some antenna modules to operate by adjusting the gain or input or output power of the power amplifier or the receiving amplifier.

The processor 1400 may be operably coupled to the transceiver circuit 1250 and may be configured to control the transceiver circuit 1250. The processor 1400 may control the transceiver circuit 1250 to control the amplitude and/or phase of the signals transmitted to the backup antenna (BUA) and the MIMO antennas ANT1 to ANT4 or to operate only some antenna modules. The processor 1400 may perform communication with at least one of the adjacent vehicle, the RSU, and the base station through the transceiver circuit 1250.

According to an embodiment, when it is determined that other communication systems do not normally operate due to a vehicle accident or component failure, the backup antenna BUA may be configured to perform an e-call function. According to another embodiment, when it is determined that the second antenna system 1500 is not normally operating, the backup antenna BUA may be configured to receive and transmit signals. According to another embodiment, when it is determined that signals are not normally received and transmitted through the MIMO antennas ANT1 to ANT4, the backup antenna BUA may be configured to receive and transmit signals.

In a case where there is a need to simultaneously receive information from various entities such as the adjacent vehicle, the RSU, and the base station for autonomous driving, etc., information may be received and transmitted through MIMO. Accordingly, the vehicle can receive different information from various entities at the same time and thus can improve its communication capacity. Therefore, the communication capacity of the vehicle can be improved through the MIMO without increasing a bandwidth.

Alternatively, the vehicle may simultaneously receive the same information from various entities, so as to improve reliability of surrounding information and decrease latency. Accordingly, Ultra Reliable Low Latency Communication (URLLC) can be performed in the vehicle and the vehicle can operate as a URLLC UE. To this end, a base station that performs scheduling may preferentially allocate a time slot for the vehicle operating as the URLLC UE. For this, some of specific time-frequency resources already allocated to other UEs may be punctured.

As described above, the plurality of antennas ANT1 to ANT4 within the antenna system 1000 may operate in the full band including the low band (LB), the mid band (MB), and the high band (HB). Here, the low band (LB) may be referred to as the first (frequency) band and the mid band (MB) and the high band (HB) may be referred to as the second (frequency) band. As another example, when the antenna system 1000 operates in the mid band (MB) and the high band (HB), the middle band (MB) is referred to as a first (frequency) band and the high band (HB) is referred to as a second (frequency) band. The 5G SUB6 band may be the same band as the LTE band in case of LTE re-farming. When 5G NR operates in a band separate from LTE, it may operate in the high band (HB) or a higher band. The 5G SUB6 band operating in the high band (HB) or higher band may also be referred to as a second (frequency) band.

The baseband processor 1400 can perform MIMO through some of the plurality of antenna elements ANT1 to ANT4 in the first frequency band. Also, the baseband processor 1400 can perform MIMO through some of the plurality of antenna elements ANT1 to ANT4 in the second frequency band. In this regard, the baseband processor 1400 can perform MIMO by using antenna elements that are sufficiently spaced apart from each other and disposed by being rotated at a predetermined angle. This can improve isolation between the first and second signals within the same band.

The baseband processor 1400 may control the transceiver circuit 1250 to receive the second signal of the second frequency band while receiving the first signal of the first frequency band through one of the first to fourth antennas ANT1 to ANT4. In this case, there may be provided an advantage that the baseband processor 1400 can advantageously perform carrier aggregation (CA) through one antenna.

Alternatively, the baseband processor 1400 may control the transceiver circuit 1250 to receive the second signal of the second frequency band through one of the third antenna ANT3 and the fourth antenna ANT4 while receiving the first signal of the first frequency band through one of the first antenna ANT1 and the second antenna ANT2. In this case, there may be provided an advantage that each antenna can be designed to optimally operate in a corresponding band.

Therefore, the baseband processor 1400 can perform carrier aggregation (CA) through a combination of the first frequency band and the second frequency band. When it is necessary to receive a large amount of data for autonomous driving or the like, reception in a broad band can be allowed through the CA.

Accordingly, eMBB (Enhanced Mobile Broad Band) communication can be performed in the vehicle and the vehicle can operate as an eMBB UE. To this end, the base station that performs scheduling may allocate a broadband frequency resource to the vehicle that operates as the eMBB UE. To this end, the CA may be performed on frequency bands that are available, except for frequency resources already allocated to other UEs.

Regard the frequency band, the low band (LB), the mid band (MB), and the high band (HB) may be referred to as the first band, the second band, and the third band, respectively. The antenna system 1000 may operate as a single antenna in the first band, the second band, and the third band corresponding to the low band (LB), the middle band (MB), and the high band (HB). In this regard, the processor 1400 may determine a resource region allocated through a physical downlink control channel (PDCCH). The processor 1400 may control the transceiver circuit 1250 to perform carrier aggregation in two or more of the first to third bands based on the allocated resource region.

The processor 1400 may perform MIMO in an EN-DC state through the first to fourth antennas ANT1 to ANT4. For example, the processor 1400 may perform an EN-DC operation through the first antenna ANT1 and the second antenna ANT2, and MIMO through the third antenna ANT3 and the fourth antenna ANT4.

In this regard, when the EN-DC operation is performed between 4G and 5G communication systems using different bands, the processor 1400 may perform the EN-DC operation through a plurality of antennas in one antenna system. Accordingly, an interference level between MIMO streams using the same band can be reduced. On the other hand, when the EN-DC operation is performed between the 4G and 5G communication systems using the same band, the processor 1400 may perform the EN-DC operation through a plurality of antennas in different antenna systems. In this case, in order to reduce the interference level in the low band (LB), the MIMO operation through the plurality of antennas in the same antenna system may be performed in the mid band (MB) or higher.

It will be clearly understood by those skilled in the art that various modifications and alternations for the aforementioned embodiments related to the antenna system having the plurality of antennas, the vehicle having the antenna system, and the control operations thereof are made without departing from the idea and scope of the present disclosure. Therefore, it should be understood that such various modifications and alternations for the embodiments fall within the scope of the appended claims.

In the above, the antenna system mounted in the vehicle and the vehicle equipped with the antenna system have been described. Hereinafter, a description will be given of an antenna system mounted on a vehicle, a vehicle having the antenna system, and a wireless communication system including a base station. In this regard, FIG. 23 illustrates a block diagram of a wireless communication system that is applicable to methods proposed herein.

Figure 23:
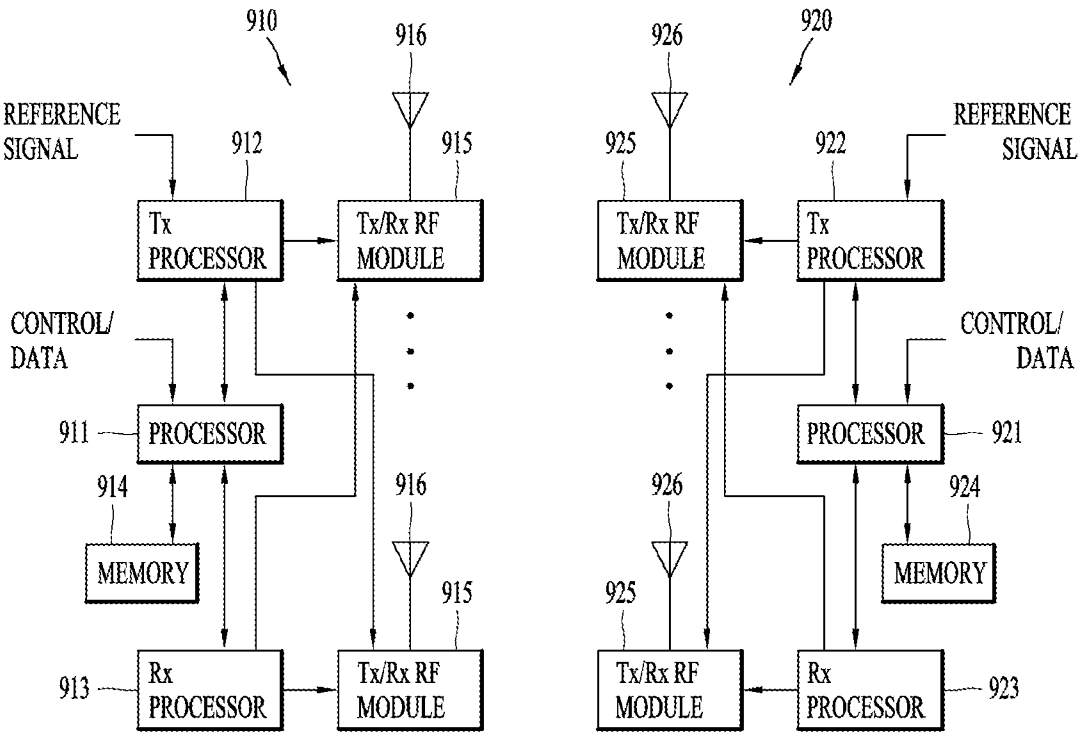
FIG. 23 is an exemplary block diagram of a wireless communication system to which methods proposed herein are applicable.

Referring to FIG. 23, the wireless communication system may include a first communication apparatus 910 and/or a second communication apparatus 920. The term 'A and/or B' may be interpreted as having the same meaning as 'at least one of A and B'. The first communication apparatus may denote a base station and the second communication apparatus may denote a terminal (or the first communication apparatus may denote the terminal or the vehicle and the second communication apparatus may denote the base station).

The base station (BS) may be replaced with a term such as a fixed station, a Node B, an evolved-NodeB (eNB), a next generation NodeB (gNB), a base transceiver system (BTS), an access point (AP), a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication apparatus and the second communication apparatus each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication apparatus to the second communication apparatus), an upper (high-level) layer packet from a core network may be provided to the processor 911. The processor implements the function of an L2 layer. In DL, the processor may provide multiplexing between a logical channel and a transport channel and radio resource allocation to the second communication apparatus 920, and may be in charge of signaling to the second communication apparatus. The Tx processor 912 may implement various signal processing functions for an L1 layer (i.e., a physical layer). The signal processing function may facilitate forward error correction (FEC) in the second communication apparatus, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. The spatial streams may be provided to different antennas 916 via individual Tx/Rx modules (or transceiver) 915, respectively. The Tx/Rx modules may modulate RF carrier waves into the spatial streams for transmission. The second communication apparatus may receive a signal through the antenna 926 of each Tx/Rx module (or transceiver) 925. Each Tx/Rx module may demodulate information modulated to an RF carrier, and provide it to the RX processor 923. The RX processor may implement various signal processing functions of Layer 1. The RX processor may perform spatial processing with respect to the information in order to recover an arbitrary spatial stream destined for the second communication apparatus. When a plurality of spatial streams are destined for the second communication apparatus, the spatial streams may be combined into a single OFDMA symbol stream by a plurality of RX processors. The RX processor may transform the OFDMA symbol stream from a time domain to a frequency domain by using Fast Fourier Transform (FFT). A frequency domain signal may include an individual OFDMA symbol stream on a subcarrier for each OFDM signal. Symbols on each subcarrier and a reference signal may be recovered and demodulated by determining the most probable signal placement points transmitted by the first communication apparatus. These soft decisions may be based on channel estimate values. The soft decisions may be decoded and deinterleaved to recover data and control signal originally transmitted over the physical channel by the first communication apparatus. The corresponding data and control signal may then be provided to the processor 921.

UL (communication from the second communication apparatus to the first communication apparatus) may be processed in the first communication apparatus 910 in a similar manner to that described with respect to the receiver function in the second communication apparatus 920. The Tx/Rx modules 925 may receive signals via the antennas 926, respectively. The Tx/Rx modules may provide RF carriers and information to the RX processor 923, respectively. The processor 921 may operate in conjunction with the memory 924 in which a program code and data are stored. The memory may be referred to as a computer-readable medium.

Meanwhile, when the first communication apparatus is the vehicle, the second communication apparatus may not be limited to the base station. In this regard, referring to FIG. 2A, the second communication apparatus may be another vehicle, and V2V communication may be performed between the first communication apparatus and the second communication apparatus. The second communication apparatus may be a pedestrian, and V2P communication may be performed between the first communication apparatus and the second communication apparatus. Also, the second communication apparatus may be an RSU, and V2I communication may be performed between the first communication apparatus and the second communication apparatus. In addition, the second communication apparatus may be an application server, and V2N communication may be performed between the first communication apparatus and the second communication apparatus.

In this regard, even when the second communication apparatus is another vehicle, pedestrian, RSU, or application server, the base station may allocate resources for communication between the first communication apparatus and the second communication apparatus. Accordingly, a communication apparatus configured to allocate resources for communication between the first communication apparatus and the second communication apparatus may be referred to as a third communication apparatus. Meanwhile, the aforementioned series of communication procedures may also be performed among the first communication apparatus to the third communication apparatus.

In the above, the antenna system mounted on the vehicle and the vehicle equipped with the antenna system have been described. Hereinafter, technical effects of an antenna system mounted on a vehicle and the vehicle equipped with the antenna system will be described.

According to the present disclosure, antenna efficiency can be improved by using the antenna pattern and the slot region of the ground as the radiator.

According to the present disclosure, an antenna can be decreased in size by using the antenna pattern and the slot region of the ground as the radiator.

According to the present disclosure, by disposing a metal sheet on an antenna structure on a bottom of a roof of a vehicle, reduction in antenna efficiency due to the roof made of a metal can be suppressed.

According to the present disclosure, even when an antenna disposed on a top of the roof of the vehicle does not operate, communication can be performed through the antenna in the module disposed on the bottom of the roof of the vehicle.

According to the present disclosure, even when multiple input/multiple output (MIMO) antennas in an antenna module do not normally operate, communication can be performed through the backup antenna.

Further scope of applicability of the present disclosure will become apparent from the foregoing detailed description. It should be understood, however, that the detailed description and specific examples, such as the preferred embodiment of the present disclosure, are given by way of illustration only, since various modifications and alternations within the spirit and scope of the disclosure will be apparent to those skilled in the art.

In relation to the foregoing description, the antenna system mounted in the vehicle and the operation of controlling the same may be implemented by software, firmware, or a combination thereof. Meanwhile, the design of the antenna system mounted in the vehicle and the configuration of controlling the antenna system can be implemented as computer-readable codes in a program-recorded medium. The computer-readable medium may include all types of recording devices each storing data readable by a computer system. Examples of such computer-readable media may include hard disk drive (HDD), solid status disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include a controller of a terminal or vehicle, namely, a processor. Therefore, the detailed description should not be limitedly construed in all of the aspects, and should be understood to be illustrative. The scope of the invention should be determined by reasonable interpretation of the appended claims and all changes that come within the equivalent scope of the invention are included in the scope of the disclosure.

The invention claimed is:

1. An antenna system mounted on a vehicle, the antenna system comprising:

a printed circuit board (PCB) on which an antenna element and electronic components are disposed;

a bottom cover disposed on a bottom of the PCB and configured as a metal plate having a slot region in a region corresponding to a region where the antenna element is disposed; and a top cover fastened to the bottom cover and configured to accommodate the PCB therein, wherein the antenna element and the metal plate having the slot region operate as a radiator, wherein the PCB has a dielectric region, from which a metal pattern is removed such that the antenna element is disposed, a length of a first metal portion formed at an outer side of the PCB, compared to the antenna element, is shorter than or equal to a length of a second metal part formed at an inner side of the PCB, and the dielectric region is defined as a region between the first metal portion and the second metal portion.

2. The antenna system of claim 1, further comprising a metal structure extending from an outer side of the bottom cover forming the slot region, and formed at a predetermined angle with respect to the bottom cover, wherein the antenna element disposed at an inner side of the metal structure feeds a signal to the slot region through the PCB.

3. The antenna system of claim 1, wherein the antenna element comprises a feed connection portion formed perpendicularly on one point of a conductive pattern, and a ground connection portion perpendicularly formed on another point of the conductive pattern.

4. The antenna system of claim 3, wherein the feed connection portion is connected to a feed path of the PCB, and the feed path of the PCB is disposed in the slot region such that the bottom cover operates as a slot antenna.

5. The antenna system of claim 1, wherein a first type component and a second type component are disposed on one side of the PCB, and the antenna element is disposed on another side of the PCB, a length of a first metal portion formed at an outer side of the slot region is longer than or equal to a length of a second metal portion formed at an inner side of the slot region, such that the slot region operates as an open slot antenna in a length direction, and the slot region is defined as a region between the first metal portion and the second metal portion.

6. The antenna system of claim 1, wherein a first type component and a second type component are disposed on one side and another side of the PCB, and the antenna element is disposed between the first and second type components, and the dielectric region is formed in a rectangular shape, and the antenna element is disposed in the dielectric region having the rectangular shape.

7. The antenna system of claim 6, wherein the antenna element comprises:

a ground connection portion connected to a ground of the PCB;

a feed connection portion connected to a signal line of the PCB;

a first conductive pattern having one end portion connected to the ground connection portion and another end portion connected to the feed connection portion; and a second conductive pattern having one end portion connected to the ground connection portion, and another end portion extending to both sides.

8. The antenna system of claim 1, further comprising an antenna substrate operably coupled to the PCB through at least one side area, wherein a plurality of antennas are disposed on different regions of the antenna substrate, which correspond to outer regions of an outer side of the PCB.

9. The antenna system of claim 1, wherein a telematics unit configured by the bottom cover and the top cover is disposed on a bottom of a roof of the vehicle, and a radiator configured by the antenna element and the metal plate having the slot region radiates a signal in a horizontal direction and a downward direction with respect to the roof of the vehicle.

10. The antenna system of claim 1, further comprising an antenna structure configured such that at least a portion thereof is exposed to a top of a roof of the vehicle, wherein the antenna structure is configured to be coupled to the top cover, and configured to transmit a signal received through an antenna disposed therein to a telematics unit on a bottom of the roof.

11. An antenna system mounted on a vehicle, the antenna system comprising:

a printed circuit board (PCB) provided with electronic components disposed therein and electrically connected to an antenna element;

a bottom cover disposed on a bottom of the PCB and configured as a metal plate;

a top cover fastened to the bottom cover to accommodate the PCB therein; and a metal sheet attached on the top cover and disposed on a bottom of a roof of the vehicle, so as to improve radiation efficiency of a signal radiated from the antenna element, wherein the metal sheet comprises:

a planar portion attached onto the top cover; and a ground connection portion connected to a ground of the PCB at one point of the planar portion, and the ground connection portion is disposed within a predetermined gap inward from the antenna element disposed at an outer side of the PCB.

12. The antenna system of claim 11, wherein the metal sheet is configured such that a front surface thereof is attached on a rear surface of a roof structure made of a metallic material, and a current of a first direction is generated on the antenna element, and a current of a second direction opposite to the first direction is generated on the metal sheet to be canceled by a current of the first direction generated on the roof structure.

13. The antenna system of claim 11, wherein the metal sheet is disposed such that one side of the planar portion overlaps the antenna element in a lengthwise direction of the antenna element, and the metal sheet has a coupling slot region, from which a metal region is removed, such that an antenna structure is disposed on a top of the roof to be coupled to the antenna system.

14. The antenna system of claim 11, wherein the bottom cover has a slot region formed in a region corresponding to a region where the antenna element is disposed, and the antenna element and the metal plate having the slot region operate as a radiator.

15. The antenna system of claim 11, wherein the antenna element is disposed in a space between the PCB and the metal sheet attached on the top cover, and is configured as a conductive pattern on a side area of the PCB.

16. A vehicle having an antenna system, the vehicle comprising:

a telematics module disposed on a bottom of a roof of the vehicle, and configured to perform communication with at least one of an adjacent vehicle, a Road Side Unit (RSU), and a base station through a processor; and an antenna structure configured such that at least a portion thereof is exposed to a top of the roof of the vehicle, wherein telematics modules further comprises:

a printed circuit board (PCB) on which an antenna element and electronic components are disposed;

a bottom cover disposed on a bottom of the PCB and configured as a metal plate having a slot region in a region corresponding to a region where the antenna element is disposed; and a top cover fastened to the bottom cover to accommodate the PCB therein, the antenna element and the metal plate having the slot region operate as a radiator, wherein a first type component and a second type component are disposed on one side and another side of the PCB, and the antenna element is disposed between the first and second type components, and the PCB has a dielectric region, from which a metal pattern is removed such that the antenna element is disposed, and the dielectric region is formed in a rectangular shape, and the antenna element is disposed in the dielectric region having the rectangular shape.

17. The vehicle of claim 16, wherein telematics modules further comprises a metal structure extending from an outer side of the bottom cover forming the slot region, and formed at a predetermined angle with respect to the bottom cover, the antenna element disposed at an inner side of the metal structure feeds a signal to the slot region through the PCB, and a radiator configured by the antenna element and the metal plate having the slot region radiates a signal in a horizontal direction and a downward direction with respect to the roof of the vehicle.

* * * * *